(12) United States Patent
Ogishima et al.

(10) Patent No.: US 7,139,055 B2
(45) Date of Patent: Nov. 21, 2006

(54) LIQUID CRYSTAL DISPLAY DEVICE HAVING LIQUID CRYSTAL DOMAINS WITH RADIALLY-INCLINED ORIENTATION

(75) Inventors: Kiyoshi Ogishima, Mie (JP); Masumi Kubo, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/899,146

(22) Filed: Jul. 27, 2004

(65) Prior Publication Data

US 2005/0001947 A1    Jan. 6, 2005

Related U.S. Application Data

(62) Division of application No. 10/119,681, filed on Apr. 11, 2002, now Pat. No. 6,788,375.

(30) Foreign Application Priority Data

| Apr. 11, 2001 | (JP) | ............................. 2001-112705 |
| Sep. 19, 2001 | (JP) | ............................. 2001-285593 |
| Mar. 22, 2002 | (JP) | ............................. 2002-081048 |

(51) Int. Cl.
    *G02F 1/1337*    (2006.01)

(52) U.S. Cl. .................................... 349/129; 349/130

(58) Field of Classification Search ................ 349/130, 349/129, 114, 123, 155, 156, 162
See application file for complete search history.

(56) References Cited

U.S. PATENT DOCUMENTS

| 5,309,264 | A | * | 5/1994 | Lien et al. ...................... 359/87 |
| 5,593,982 | A | * | 1/1997 | Quadri et al. ................. 514/172 |
| 5,673,092 | A | * | 9/1997 | Horie et al. .................... 349/86 |
| 5,686,978 | A | * | 11/1997 | Oh ................................ 349/93 |
| 6,195,140 | B1 | | 2/2001 | Kubo et al. |
| 6,201,592 | B1 | | 3/2001 | Terashita et al. |
| 6,266,122 | B1 | * | 7/2001 | Kishimoto et al. ......... 349/156 |
| 6,330,047 | B1 | | 12/2001 | Kubo et al. |
| 6,335,780 | B1 | | 1/2002 | Kurihara et al. |

(Continued)

FOREIGN PATENT DOCUMENTS

JP          6-301036        * 10/1994

(Continued)

OTHER PUBLICATIONS

U.S. Appl. No. 10/119,681, filed Apr. 11, 2002.

(Continued)

*Primary Examiner*—Andrew Schechter
*Assistant Examiner*—Mike Qi
(74) *Attorney, Agent, or Firm*—Nixon & Vanderhye P.C.

(57) ABSTRACT

The liquid crystal display device of this invention includes a vertical alignment type liquid crystal layer between a first substrate and a second substrate. A picture element region is defined by a first electrode provided on the surface of the first substrate facing the liquid crystal layer and a second electrode provided on the surface of the second substrate facing the liquid crystal layer. The first substrate has at least one first protrusion with an inclined side face on the surface thereof facing the liquid crystal layer in each of the plurality of picture element regions. A portion of the liquid crystal layer included in each of the plurality of picture element regions is in a substantially vertical orientation state under application of no voltage, and includes at least a part of a first liquid crystal domain placed in a radially-inclined orientation state about the first protrusion under voltage application. A display is produced by changing the orientation state of the liquid crystal layer in accordance with an applied voltage.

18 Claims, 56 Drawing Sheets

U.S. PATENT DOCUMENTS

| | | | |
|---|---|---|---|
| 6,341,002 B1 * | 1/2002 | Shimizu et al. | 349/119 |
| 6,407,790 B1 * | 6/2002 | Chen | 349/124 |
| 6,549,257 B1 * | 4/2003 | Liu | 349/129 |
| 6,567,144 B1 * | 5/2003 | Kim et al. | 349/128 |
| 6,573,964 B1 * | 6/2003 | Takizawa et al. | 349/129 |
| 6,593,982 B1 | 7/2003 | Yoon et al. | |
| 6,593,988 B1 * | 7/2003 | Liu et al. | 349/129 |
| 6,600,539 B1 * | 7/2003 | Song | 349/130 |
| 6,611,308 B1 * | 8/2003 | Wu et al. | 349/129 |
| 6,614,497 B1 | 9/2003 | Yamada | |
| 6,661,485 B1 * | 12/2003 | Moon | 349/113 |
| 6,924,876 B1 * | 8/2005 | Kubo et al. | 349/193 |
| 6,930,739 B1 * | 8/2005 | Takeda et al. | 349/129 |
| 6,977,704 B1 * | 12/2005 | Kataoka | 349/130 |
| 2002/0060764 A1 | 5/2002 | Taniguchi et al. | |
| 2002/0063834 A1 * | 5/2002 | Sawasaki et al. | 349/130 |
| 2002/0075436 A1 * | 6/2002 | Kubo et al. | 349/129 |
| 2002/0159012 A1 * | 10/2002 | Yamada | 349/122 |
| 2002/0171792 A1 * | 11/2002 | Kubota et al. | 349/114 |
| 2004/0021810 A1 * | 2/2004 | Kawaguri et al. | 349/113 |

FOREIGN PATENT DOCUMENTS

| | | |
|---|---|---|
| JP | 11-174481 | 7/1999 |
| JP | 2000-029030 | 1/2000 |
| JP | 2000-47217 | 2/2000 |
| JP | 2000-284290 | 10/2000 |
| JP | 2000-305110 | 11/2000 |
| JP | 2000-314886 | 11/2000 |

OTHER PUBLICATIONS

Jisaki et al, "Development of transflective LCD for high contrast and wide viewing angle by using homeotropic alignment", Asia Display/IDW '01, pp. 133-136.
U.S. Appl. No. 09/790,802, filed Feb. 23, 2001, with Filing Receipt.
U.S. Appl. No. 09/923,344, filed Aug. 8, 2001, with Filing Receipt.
U.S. Appl. No. 09/983,665, filed Oct. 25, 2001, with Filing Receipt.
U.S. Appl. No. 09/357,814, filed Jul. 20, 1999, with Filing Receipt.

* cited by examiner

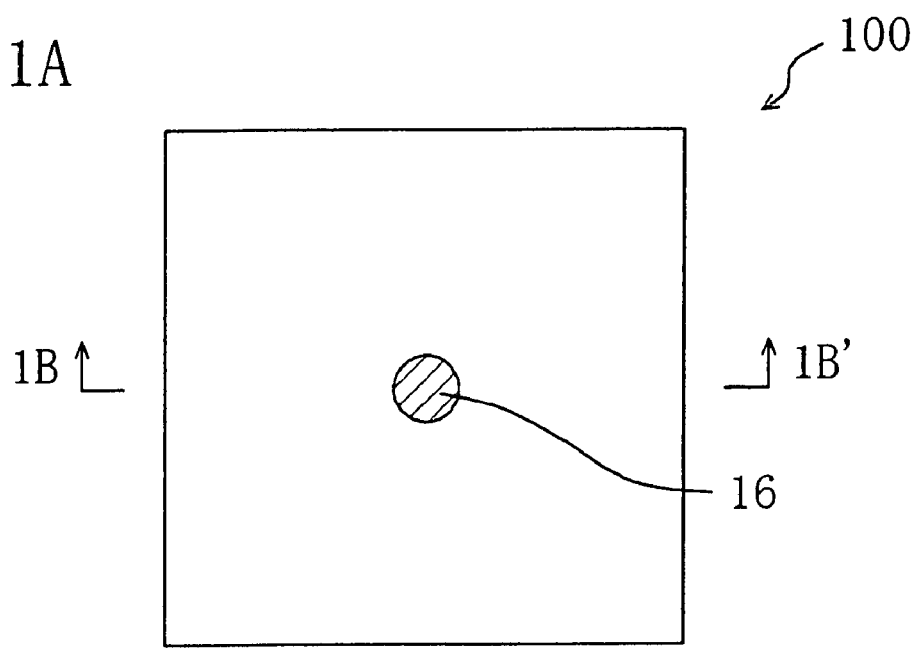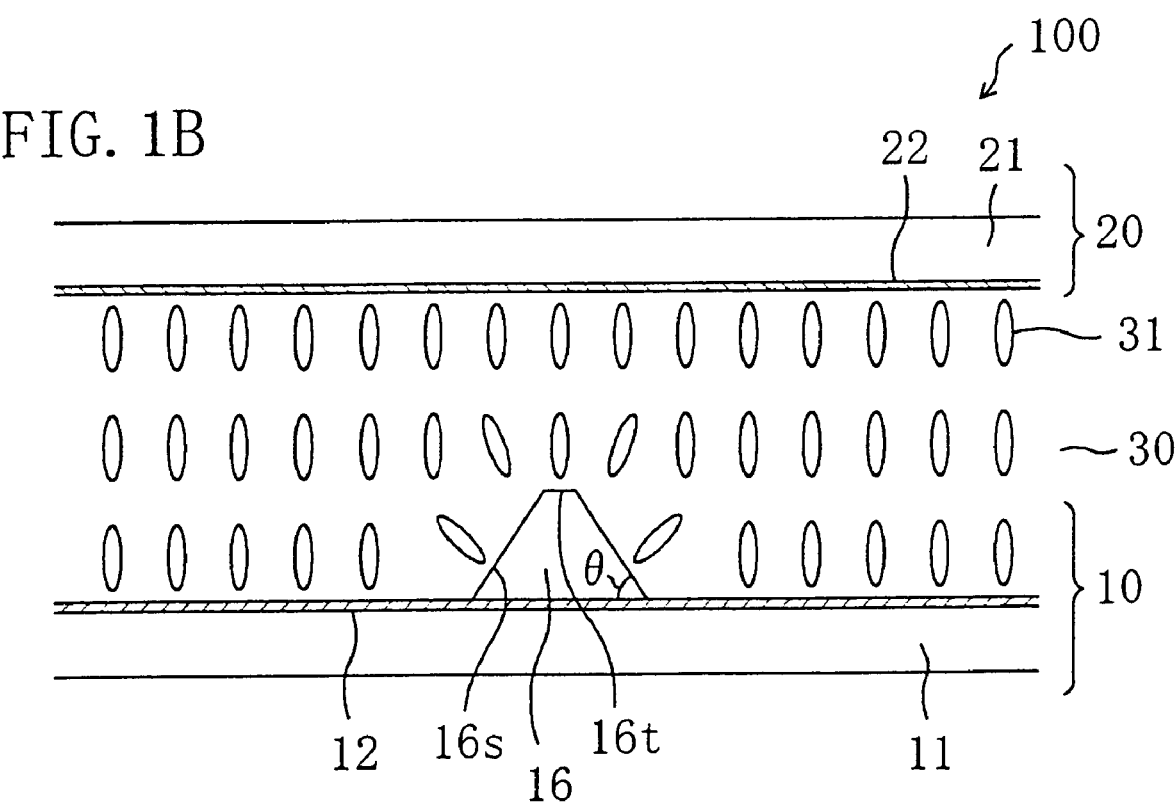

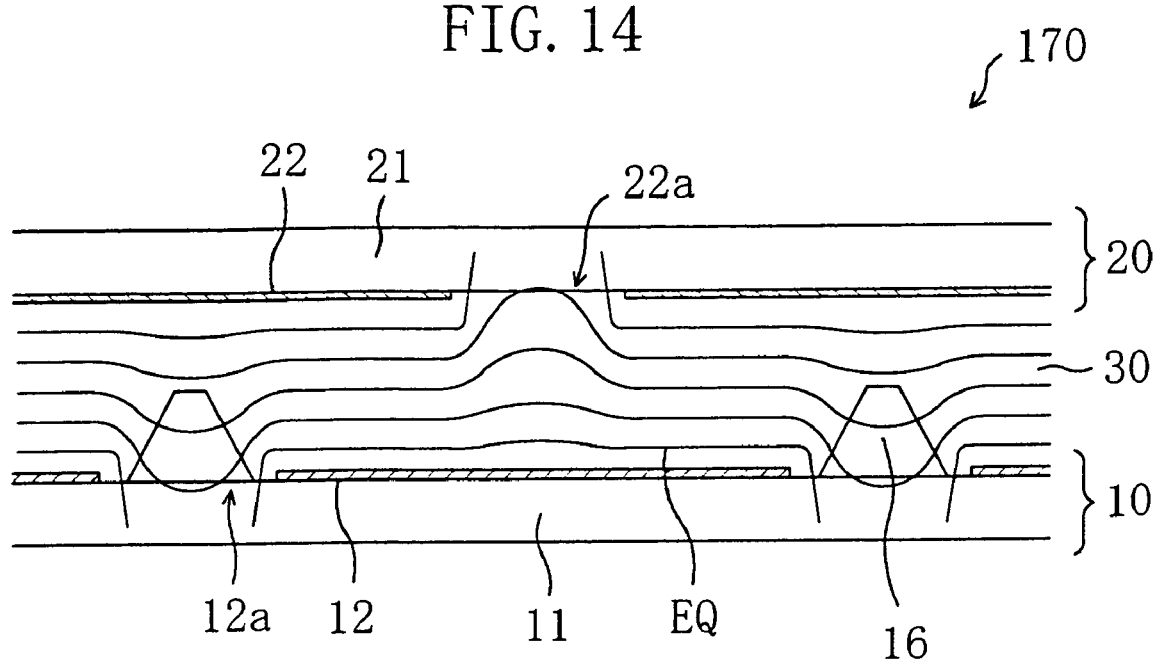

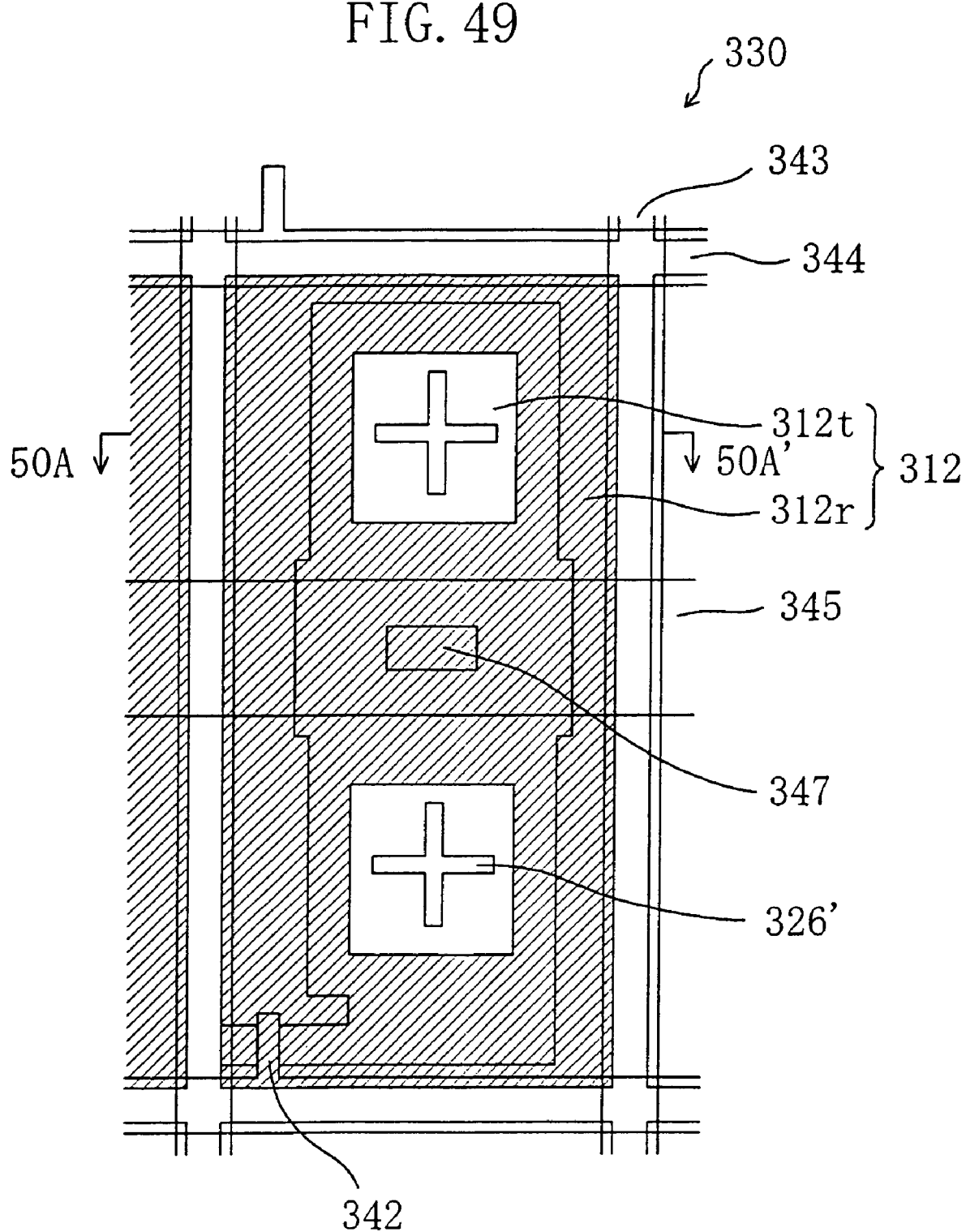

LIQUID CRYSTAL DISPLAY DEVICE HAVING LIQUID CRYSTAL DOMAINS WITH RADIALLY-INCLINED ORIENTATION

This application is a Divisional of application Ser. No. 10/119,681 filed Apr. 11, 2002 now U.S. Pat. No. 6,788,375, the entire content of which is hereby incorporated herein by reference in this application.

BACKGROUND OF THE INVENTION

The present invention relates to a liquid crystal display device, and more particularly, it relates to a liquid crystal display device having a wide viewing angle characteristic and high display quality.

Recently, a thin and light liquid crystal display device is used as a display device for a display of a personal computer or a display unit of portable information terminal equipment. Conventional twist nematic (TN) or super twist nematic (STN) liquid crystal display devices have, however, a disadvantage of a narrow viewing angle, and a variety of techniques have been developed for overcoming this disadvantage.

A typical technique to improve the viewing angle characteristic of a TN or STN liquid crystal display device is a method of additionally providing an optical compensator. Another technique is a lateral field method of applying, through a liquid crystal layer, an electric field in a lateral direction to the substrate surface. Liquid crystal display devices of the lateral field method are recently mass-produced and regarded as promising devices. A still another technique is DAP (deformation of vertical aligned phase) in which a nematic liquid crystal material with negative dielectric anisotropy is used as a liquid crystal material and a vertical alignment film is used as an alignment film. The DAP is a kind of an electrically control birefringence (ECB) method, in which the transmittance is controlled by utilizing the birefringent property of the liquid crystal molecules.

Although the lateral field method is one of the effective methods for attaining a wide viewing angle, the production margin is very small in the production process as compared with that of a general TN liquid crystal display device, and hence, there is a difficulty in stable production of this type of liquid crystal display devices. This is because gap irregularity between substrates and shift of the transmission axis of a polarizing plate (polarization axis) from the orientation axis of a liquid crystal molecule largely affect the luminance and the contrast ratio of display. In order to stably produce the liquid crystal display devices of the lateral field method by highly precisely controlling these factors, the technique should be further highly developed.

Furthermore, in order to produce an even display free from display unevenness by a liquid crystal display device of the DAP method, it is necessary to control orientation. For controlling the orientation, an alignment treatment is carried out by rubbing the surface of an alignment film. When the surface of a vertical alignment film is subjected to a rubbing treatment, however, rubbing streaks are easily caused in a displayed image. Therefore, this treatment is not suitable to mass-production.

On the other hand, for controlling the orientation without the rubbing treatment, a method for controlling the orientation directions of liquid crystal molecules by an inclined electric field generated by forming a slit (opening) in an electrode has been proposed (as described in, for example, Japanese Laid-Open Patent Publication Nos. 6-301036 and 2000-47217). However, the present inventors have found the following as a result of examination: The orientation state of a portion of a liquid crystal layer corresponding to the opening of the electrode is not specified in the methods disclosed in these publications, and the continuity of the orientation of the liquid crystal molecules is not sufficient. Therefore, it is difficult to obtain a stable orientation state over an entire picture element, and hence, a displayed image becomes disadvantageously uneven.

SUMMARY OF THE INVENTION

The present invention was devised to overcome the aforementioned disadvantages, and an object of the invention is providing a liquid crystal display device having a wide viewing angle characteristic and high display quality.

The liquid crystal display device of this invention includes a first substrate; a second substrate; a liquid crystal layer disposed between the first substrate and the second substrate; and a plurality of picture element regions each defined by a first electrode provided on a surface of the first substrate facing the liquid crystal layer and a second electrode provided on a surface of the second substrate facing the liquid crystal layer, and the first substrate has, on the surface thereof facing the liquid crystal layer, at least one first protrusion with an inclined side face correspondingly to each of the plurality of picture element regions, and a portion of the liquid crystal layer included in each of the plurality of picture element regions is in a substantially vertical orientation state under application of no voltage, and includes at least a part of a first liquid crystal domain placed in a radially-inclined orientation state about the at least one first protrusion under voltage application, for producing a display by changing an orientation state of the liquid crystal layer in accordance with an applied voltage. Thus, the aforementioned object can be achieved.

The at least one first protrusion may be formed within each of the plurality of picture element regions.

The at least one first protrusion may be plural in number, and the portion of the liquid crystal layer included in each of the plurality of picture element regions may include a plurality of first liquid crystal domains all placed in the radially-inclined orientation state under voltage application.

The first electrode may include at least one first opening, and the at least one first protrusion may be formed within the at least one first opening.

Preferably, the second substrate has, on the surface thereof facing the liquid crystal layer, at least one second protrusion with an inclined side face correspondingly to each of the plurality of picture element regions, and the portion of the liquid crystal layer included in each of the plurality of picture element regions includes, under voltage application, at least a part of a second liquid crystal domain placed in a radially-inclined orientation state about the at least one second protrusion, so that inclination directions of liquid crystal molecules in the first liquid crystal domain can be continuous with inclination directions of liquid crystal molecules in the second liquid crystal domain.

The second electrode may have at least one second opening, the portion of the liquid crystal layer included in each of the plurality of picture element regions may include, under voltage application, a second liquid crystal domain placed in a radially-inclined orientation state about the at least one second opening, so that inclination directions of liquid crystal molecules in the first liquid crystal domain can be continuous with inclination directions of liquid crystal molecules in the second liquid crystal domain.

The second electrode may have at least one second opening, and the at least one second protrusion may be formed within the at least one second opening.

The at least one second protrusion may include a plurality of second protrusions formed out of each of the plurality of picture element regions.

A cross-section, taken along a surface of the first substrate, of the at least one first protrusion is preferably in a shape having rotational symmetry.

Alternatively, the cross-section, taken along the surface of the first substrate, of the at least one first protrusion may be in a substantially circular shape.

Alternatively, the cross-section, taken along the surface of the first substrate, of the at least one first protrusion may be in a substantially cross shape consisting of crossing lines extending along a first direction and a second direction crossing each other at substantially right angles.

The liquid crystal display device may further include a pair of polarizing plates respectively provided on outer surfaces of the first substrate and the second substrate, so that the pair of polarizing plates may be disposed in such a manner that a polarization axis of one of the pair of polarizing plates is parallel to the first direction and a polarization axis of the other of the pair of polarizing plates is parallel to the second direction.

A shape of the at least one first opening seen from a normal direction of the first substrate preferably has rotational symmetry.

A cross-section, taken along a surface of the second substrate, of the at least one second protrusion is preferably in a shape having rotational symmetry.

A shape of the at least one second opening seen from a normal direction of the second substrate preferably has rotational symmetry.

Preferably, the at least one first protrusion is plural in number, and at least some of the plural first protrusions are arranged so as to have rotational symmetry.

Preferably, the at least one first opening is plural in number, and at least some of the plural first openings are arranged so as to have rotational symmetry.

Preferably, the at least one second protrusion is plural in number, and at least some of the plural second protrusions are arranged so as to have rotational symmetry.

Preferably, the at least one second opening is plural in number, and at least some of the plural second openings are arranged so as to have rotational symmetry.

The inclined side face of the first protrusion and/or the second protrusion is inclined at an angle of preferably 5 degrees through 85 degrees and more preferably 50 degrees or less against the surface of the first substrate and/or the surface of the second substrate.

Each of the plurality of picture element regions may have a plurality of portions having different thicknesses of the liquid crystal layer, at least one of the first substrate and the second substrate may have level differences between the plurality of portions, and the level differences may be covered with the first electrode or the second electrode. In this case, at least some of the at least one first protrusion is preferably surrounded with the level differences.

This structure is effectively employed particularly in a liquid crystal display device in which the first electrode includes a transparent electrode and a reflecting electrode, each of the plurality of picture element regions includes a transmission region for producing a display in a transmission mode and a reflection region for producing a display in a reflection mode, and the liquid crystal layer has a larger thickness in the transmission region than in the reflection region.

The first substrate may further include an active element provided correspondingly to each of the plurality of picture element regions, the first electrode may correspond to picture element electrodes respectively provided in the plurality of picture element regions to be switched by the active element, and the second electrode may correspond to at least one counter electrode opposing the picture element electrodes. The counter electrode is typically formed as a single electrode extending over an entire display region.

The second substrate may further include an active element provided correspondingly to each of the plurality of picture element regions, the second electrode may correspond to picture element electrodes respectively provided in the plurality of picture element regions to be switched by the active element, and the first electrode may correspond to at least one counter electrode opposing the picture element electrodes.

The functions of the invention are as follows:

The liquid crystal display device of the invention is a liquid crystal display device of a vertical orientation mode in which the liquid crystal layer is substantially in a vertical orientation state under application of no voltage. The vertical alignment type liquid crystal layer is obtained typically by orienting a nematic liquid crystal material having negative dielectric anisotropy with a vertical alignment film. A plurality of protrusions each having an inclined side face are provided on one of the pair of substrates disposed so as to sandwich the liquid crystal layer (for example, a TFT substrate). Since liquid crystal molecules are oriented vertically to the inclined side face (typically covered with a vertical alignment film) of the protrusion, liquid crystal molecules present around the protrusion are inclined radially about the protrusion. Most liquid crystal molecules other than those present in the vicinity of the inclined side face of the protrusion are in the vertical orientation state.

When a voltage is applied through the liquid crystal layer, liquid crystal molecules are inclined in directions matching with the orientation directions of the liquid crystal molecules inclined due to the influence (orientation-regulating force or the so-called anchoring effect) of the inclined side face of the protrusion. The extent of the inclination of the liquid crystal molecule (i.e., the inclination angle) depends upon the strength of the electric field, and as the electric field is stronger, the liquid crystal molecule is more largely inclined to be oriented in a direction closer to the horizontal direction. The inclination direction of the liquid crystal molecule accords with the inclination direction of the liquid crystal molecule inclined radially about the protrusion by the anchoring effect of the inclined side face of the protrusion. Therefore, under voltage application, a liquid crystal domain in a radially-inclined orientation state is formed in the liquid crystal layer. In the liquid crystal domain placed in the radially-inclined orientation state, the liquid crystal molecules are oriented along all the azimuth directions. As a result, the viewing angle characteristic of the liquid crystal display device can be improved in all the azimuth directions.

The plurality of protrusions are provided correspondingly to picture element regions, so that domains with the radially-inclined orientation can be formed in the respective picture element regions in the liquid crystal layer. For example, at least one protrusion is provided in each picture element region so as to form a domain with the radially-inclined orientation about the protrusion in the picture element region in the liquid crystal layer. Alternatively, a plurality of protrusions are provided in the periphery of the picture element region (for example, a portion corresponding to a source line, a gate line or the like), so that the picture element region in the liquid crystal layer can include a set of parts of a plurality of domains with the radially-inclined orientation respectively formed about the protrusions. Needless to say, these two structures may be combined.

In the liquid crystal display device of this invention, the domain with the radially-inclined orientation is formed by utilizing the orientation-regulating force of the inclined side face of the protrusion. Since the orientation-regulating force caused by the inclined side face works also under application of no voltage, even if the orientation of the liquid crystal layer is disturbed, for example, due to impact against the liquid crystal display device, the radially-inclined orientation about the protrusion can be restored when external force applied to the liquid crystal material is removed. Accordingly, the liquid crystal display device of this invention is advantageous to a conventional liquid crystal display device in which the radially-inclined orientation is formed by utilizing an inclined electric field generated by an electrode having an opening (slit).

The display characteristic of a liquid crystal display device exhibits azimuth angle dependency derived from the orientation state (optical anisotropy) of liquid crystal molecules. In order to reduce the azimuth angle dependency of the display characteristic, the liquid crystal molecules are preferably oriented along the respective azimuth directions in equivalent probabilities. Furthermore, the liquid crystal molecules within each picture element region are preferably oriented along the respective azimuth directions in equivalent probabilities. Accordingly, the protrusion preferably has such a shape that the liquid crystal domains can be formed so as to orient the liquid crystal molecules in each picture element region along the respective azimuth directions in equivalent probabilities.

When the cross-section, taken along the substrate surface, of the protrusion has rotational symmetry, the viewing angle characteristic can be made uniform along all the azimuth directions. The cross-sectional shape preferably has highly rotational symmetry with a two-fold rotation axis or more preferably with a rotation axis of four or more folds (as in, for example, a square and a circle).

Furthermore, as the area of the inclined side face of the protrusion is larger, the orientation-regulating force against the liquid crystal molecules is larger. For example, when the protrusion has a substantially cross-shaped cross-section, the area of the inclined side face can be comparatively increased, so as to comparatively increase the orientation-regulating force against the liquid crystal molecules. Therefore, the radially-inclined orientation can be further stabilized and the response speed can be increased. Moreover, when the protrusion has a substantially cross-shaped cross-section, the transmittance and the contrast ratio can be also improved by allowing the polarization axis directions of a pair of polarizing plates disposed in a crossed Nicols state to accord with the directions of the crossing lines of the cross (i.e., directions crossing each other at substantially right angles).

When a plurality of protrusions are provided, the liquid crystal domains with the radially-inclined orientation can be uniformly formed by disposing the plurality of protrusions in rotationally symmetrical arrangement (for example, in square lattice arrangement).

The orientation of the liquid crystal molecules can be further stabilized by utilizing, in addition to the anchoring effect of the inclined side face of the protrusion, orientation-regulating force caused by an inclined electric field generated by an electrode having an opening. When the protrusion is formed within the opening of the electrode, the direction of the orientation-regulating force caused by the inclined electric field can accord with the direction of the orientation-regulating force caused by the inclined side face, and hence, the liquid crystal molecules can be stably placed in the radially-inclined orientation state. The shape of the opening seen from the normal direction also preferably has rotational symmetry and is preferably the same as (similar to) the cross-sectional shape of the protrusion. Needless to say, the opening may be disposed in a position different from the protrusion. However, in the case where a plurality of openings are provided, they are preferably disposed so as to have rotational symmetry. Also, the protrusion and the opening are preferably disposed in one arrangement having complementary rotational symmetry. For example, assuming that the opening is replaced with the protrusion, they are preferably disposed so that a plurality of protrusions including the replaced protrusion can have rotational symmetry.

In the case where a plurality of protrusions and/or openings are provided in one picture element region, it is not always necessary to arrange them so as to have rotational symmetry over the entire picture element region. For example, when a square lattice (symmetrical with a four-fold rotation axis) is used as a minimum unit so as to form a picture element region from the combination of the square lattices, the liquid crystal molecules can be oriented along all the azimuth directions in substantially equivalent probabilities all over the picture element region. In other words, a portion of the liquid crystal layer included in each picture element region may be formed as a set of liquid crystal domains arranged so as to have rotational symmetry (or axial symmetry) (for example, a plurality of liquid crystal domains in square lattice arrangement).

In the liquid crystal display device of this invention, the orientation of the liquid crystal molecules can be further stabilized by providing protrusions and/or openings also on a second substrate (for example, a counter substrate or a color filter substrate) opposing a first substrate on which the protrusions and/or openings are provided. Owing to orientation-regulating force caused by the protrusions/or openings provided on the surface of the second substrate facing the liquid crystal layer, liquid crystal domains with the radially-inclined orientation are formed under voltage application.

The radially-inclined orientation about each protrusion and/or opening of the second substrate is preferably formed so as to be continuous with the radially-inclined orientation about each protrusion and/or opening of the first substrate. For this purpose, when seen from a vertical direction to the substrate, the protrusions and/or openings provided on the first substrate are preferably arranged so as not to overlap the protrusions and/or openings provided on the second substrate. The respective protrusions and/or openings are preferably arranged so as to have rotational symmetry as described above. Accordingly, when they are disposed in square lattice arrangement, the protrusions and/or openings provided on the respective substrates are disposed so that the lattice points of the square lattices formed by the protrusions and/or openings of the second substrate are respectively positioned at the centers of the square lattices formed by the protrusions and/or openings of the first substrate. Needless to say, the first substrate and the second substrate may be replaced with each other.

Since light leakage may be caused in a portion corresponding to the protrusion, the protrusion is preferably provided in the periphery of the picture element region (for example, in a portion corresponding to a scanning line or a signal line) or in a region corresponding to an element not transmitting light such as an storage capacitance line included in the picture element region. When the protrusions are disposed in such portions, degradation of the display quality can be suppressed.

In the liquid crystal display device of this invention, the protrusion is formed at least on one of the substrates (for example, a TFT substrate or a color substrate), and hence, a stable liquid crystal domain placed in the radially-inclined orientation state under voltage application can be formed in the vertical alignment type liquid crystal layer.

In particular, in a liquid crystal display device of the so-called multi-gap system having different thicknesses of the liquid crystal layer within one picture element region, such as a transmission/reflection combination type liquid crystal display device having a transmission region and a reflection region in each picture element region (as disclosed in, for example, Japanese Laid-Open Patent Publication No. 11-101992), the orientation of the liquid crystal molecules is easily disturbed due to the influence of a level difference. Therefore, in such a liquid crystal display device, a liquid crystal domain with sufficiently stable radially-inclined orientation is difficult to form merely by using the orientation-regulating force caused by an inclined electric field. According to the invention, however, discontinuity in the orientation of the liquid crystal molecules owing to the level difference is suppressed by an electric field generated by an electrode covering the level difference, and the protrusion with an appropriate inclined side face is provided so as to form the center of the radially-inclined orientation by using the orientation-regulating force caused by the inclined side face. As a result, stable radially-inclined orientation can be realized. In particular, when the protrusion is surrounded with the level differences covered with the electrode, the discontinuity in the orientation of the liquid crystal molecules owing to the level differences can be effectively suppressed.

In this manner, the viewing angle characteristic of a liquid crystal display device can be improved by the present invention. Therefore, when the invention is applied to an active matrix liquid crystal display device in particular, a display with very high quality can be produced.

BRIEF DESCRIPTION OF THE DRAWINGS

FIG. 1A is a schematic top view for showing the structure of one picture element region of a liquid crystal display device 100 according to Embodiment 1 of the invention, and FIG. 1B is a cross-sectional view thereof taken along line 1B–1B' of FIG. 1A;

FIG. 9A shows that under application of no voltage and FIG. 9B shows that under application of a voltage;

FIG. 14 is a diagram for showing an electric field generated by applying a voltage through a liquid crystal layer 30 of FIG. 13B expressed by using an equipotential line EQ;

FIG. 17A is a top view of the combination type liquid crystal display device 200, FIG. 17B is a top view of the combination type liquid crystal display device 200' and FIG. 17C is a cross-sectional view taken along line 17C–17C' of FIGS. 17A and 17B;

FIG. 44A is a top view of the orientation obtained when a protrusion having a substantially cross-shaped cross-section is provided, FIG. 44B is a top view of the orientation obtained when a protrusion having a substantially circular cross-section is provided and FIG. 44C is a cross-sectional view taken along line 44C–44C' of FIGS. 44A and 44B;

FIG. 45A is a top view of the orientation obtained when a protrusion having a substantially circular cross-section is provided and FIG. 45B is a top view of the orientation obtained when a protrusion having a substantially cross-shaped cross-section is provided;

FIG. 49 is a top view for schematically showing the structure of one picture element region of still another combination type liquid crystal display device 330 of Embodiment 2;

DETAILED DESCRIPTION OF PREFERRED EMBODIMENTS

Figure 2A:
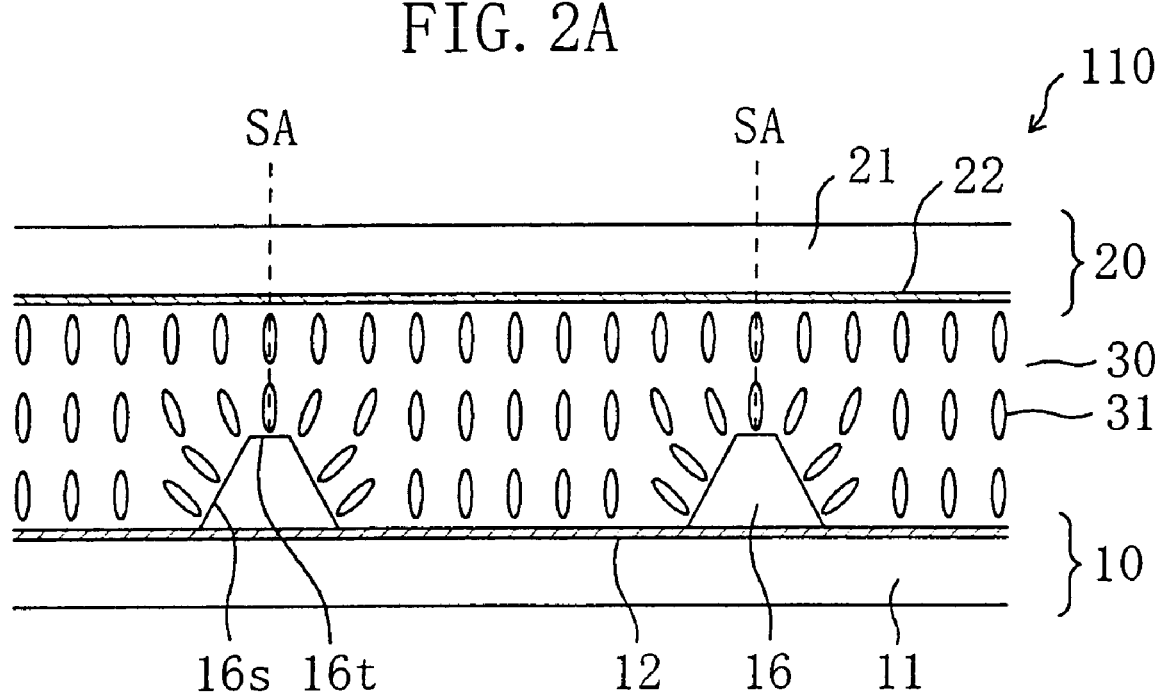
FIGS. 2A and 2B are partial cross-sectional views of another liquid crystal display device 110 according to Embodiment 1, and specifically FIG. 1A schematically shows an orientation state of liquid crystal molecules 31 under application of no voltage and FIG. 1B schematically shows that under application of a voltage (an intermediate gray scale voltage)

Preferred embodiments of the invention will now be described with reference to the accompanying drawings.

Embodiment 1

The liquid crystal display device of this invention is suitably used in an active matrix liquid crystal display device owing to its excellent display characteristic. Active matrix liquid crystal display devices using thin film transistors (TFTs) will be exemplified in the following preferred embodiments, which does not limit the invention. The invention is also applicable to an active matrix liquid crystal display device using MIMs and a passive matrix liquid crystal display device. Also, in the following embodiments, a transmission type liquid crystal display device and a transmission/reflection combination type liquid crystal display device are exemplified, which does not limit the invention. The invention is also applicable to a reflection type liquid crystal display device.

Herein, a region of a liquid crystal display device corresponding to a "picture element", that is, a minimum unit of display, is designated as a "picture element region". In a color liquid crystal display device, three "picture elements" of R, G and B together correspond to one "pixel". In an active matrix liquid crystal display device, one picture element region is defined by a picture element electrode and a counter electrode opposing the picture element electrode. Alternatively, in a passive matrix liquid crystal display device, each intersection region between column electrodes in a stripe shape and row electrodes provided perpendicularly to the column electrodes is defined as a picture element region. In a structure employing a black matrix, strictly speaking, a region corresponding to an opening of the black matrix in the entire region to which a voltage is applied in accordance with a state to be displayed corresponds to a picture element region.

Now, the structure of one picture element region of a liquid crystal display device 100 according to Embodiment 1 will be described with reference to FIGS. 1A and 1B. In the following description, a color filter and a black matrix are omitted for simplification. FIG. 1A is a top view seen from the substrate normal direction and FIG. 1B is a cross-sectional view taken along line 1B–1B' of FIG. 1A, whereas FIG. 1B shows a state where no voltage is applied through a liquid crystal layer.

The liquid crystal display device 100 includes an active matrix substrate (hereinafter referred to as the "TFT substrate") 10, a counter substrate (also designated as the "color filter substrate") 20 and a liquid crystal layer 30 disposed between the TFT substrate 10 and the counter substrate 20. Liquid crystal molecules 31 of the liquid crystal layer 30 have negative dielectric anisotropy, and owing to vertical alignment films (not shown) provided on the surfaces of the TFT substrate 10 and the counter substrate 20 facing the liquid crystal layer 30, the liquid crystal molecules 31 are oriented vertically to the surfaces of the vertical alignment films as shown in FIG. 1B when no voltage is applied through the liquid crystal layer 30. Such a state of the liquid crystal layer 30 is designated as a vertical orientation state. However, depending upon the kinds of vertical alignment film and liquid crystal material, the liquid crystal molecules 31 of the liquid crystal layer 30 in the vertical orientation state may be slightly inclined against the normal line of the surface of the vertical alignment film (substrate surface). In general, a state where a liquid crystal molecule is oriented with the liquid crystal molecular axis (also designated as the "axial direction") inclined at an angle of approximately 85 degrees or more against the surface of a vertical alignment film is designated as the vertical orientation state.

The TFT substrate 10 of the liquid crystal display device 100 includes a transparent substrate (such as a glass substrate) 11 and a picture element electrode 12 formed thereon. The counter substrate 20 includes a transparent substrate (such as a glass substrate) 21 and a counter electrode 22 formed thereon. In accordance with a voltage applied to each pair of picture element electrode 12 and counter electrode 22 opposing each other via the liquid crystal layer 30 sandwiched therebetween, the orientation state of the liquid crystal layer 30 in each picture element region is changed. A display is produced by utilizing a phenomenon that the polarizing state and the quantity of light transmitting the liquid crystal layer 30 are changed in accordance with the change of the orientation state of the liquid crystal layer 30.

A protrusion 16 is formed at the center of the picture element electrode 12 of the liquid crystal display device 100. The protrusion 16 is in the shape of a truncated cone having an inclined side face 16s and a top face 16t. The inclined side face 16s is inclined against the surface of the picture element electrode 12 (parallel to the surface of the substrate 11) at an angle of θ. The protrusion 16 may be in the shape of a cone having no top face 16t.

The surface of the protrusion 16 has a vertical alignment property (typically owing to a vertical alignment film (not shown) covering the protrusion 16), and the liquid crystal molecules 31 are oriented vertically to the inclined side face 16s and the top face 16t due to an anchoring effect of these faces. Since the protrusion 16 has a circular cross-section taken along the surface of the substrate 11 (as shown in FIG. 1A), the liquid crystal molecules positioned around the protrusion 16 are radially orientated about the protrusion 16. The other most liquid crystal molecules 31 are in the vertical orientation state.

When a voltage is applied through the liquid crystal layer 30 in such a state, the liquid crystal molecules 31 are inclined so as to match with the radially-inclined orientation formed due to the anchoring effect of the inclined side face 16s of the protrusion 16. As a result, a liquid crystal domain in a radially-inclined orientation state is formed. This will be described with reference to FIGS. 2A and 2B. At this point, the liquid crystal molecules 31 are oriented to be radially inclined under voltage application. Therefore, such an orientation state is herein designated as the "radially-inclined orientation state". Also, a portion of a liquid crystal layer in which liquid crystal molecules are in the radially-inclined orientation state about one center is herein designated as a liquid crystal domain.

Figure 2B:
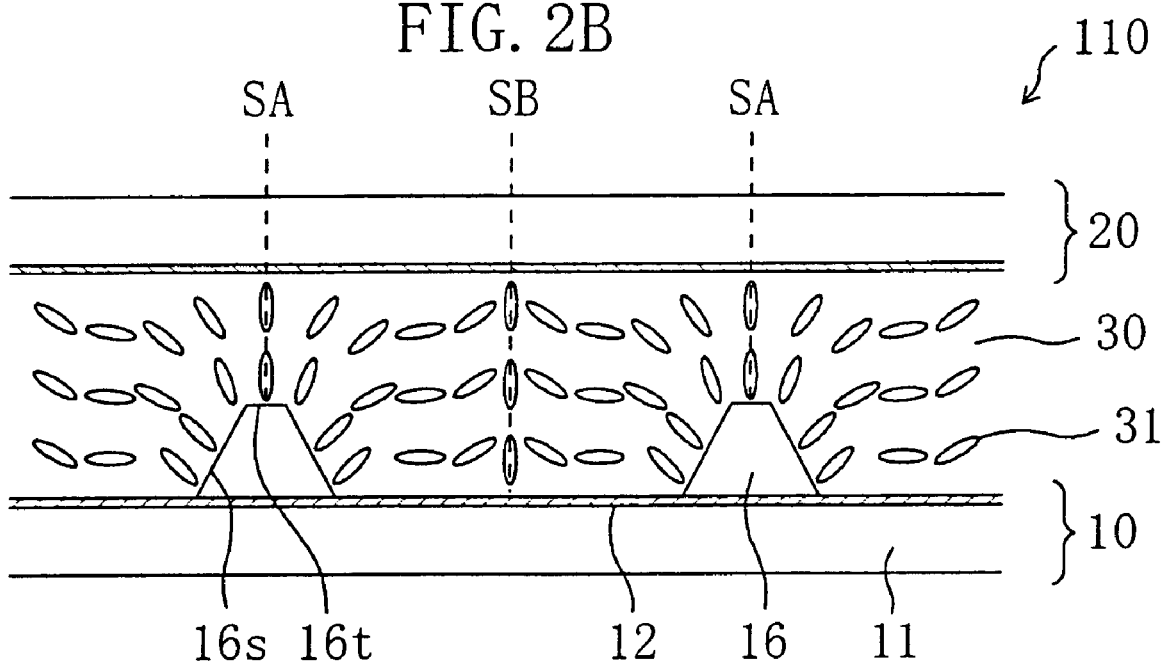

FIGS. 2A and 2B are partial cross-sectional views of a liquid crystal display device 110 having a plurality of protrusions 16 in one picture element region. FIG. 2A schematically shows an orientation state of the liquid crystal molecules 31 under application of no voltage, and FIG. 2B schematically shows that under application of a voltage (an intermediate gray scale voltage).

As shown in FIG. 2A, when no voltage is applied, merely the liquid crystal molecules 31 positioned in the vicinity of each protrusion 16 are oriented to be radially inclined about a symmetry axis SA corresponding to the center of the protrusion 16. When a voltage is applied through the liquid crystal layer 30, as shown in FIG. 2B, the other liquid crystal molecules included in the picture element region are oriented so as to match with the radially-inclined orientation about the protrusion 16, so as to form liquid crystal domains. In FIG. 2B, two liquid crystal domains respectively having the centers of the two protrusions 16 as symmetry axes SA and one liquid crystal domain having a symmetry axis SB at the center of the two protrusions 16 are formed. In order to stably form the liquid crystal domain having the symmetry axis SB at the center of the adjacent protrusions 16, a plurality of protrusions 16 are preferably arranged so as to have rotational symmetry. For example, when four protrusions 16 are arranged so as to form a square lattice, a liquid crystal domain with the radially-inclined orientation having the symmetry axis SB at the center of the four protrusions 16 can be stably formed. In this manner, the orientations of the liquid crystal molecules 31 are continuous between the liquid crystal domains placed in the radially-inclined orientation state in the liquid crystal layer of the liquid crystal display device of the invention. As a result, very stable radially-inclined orientation can be realized.

Although the protrusion 16 is in the shape of a truncated cone in the above description, the cross-section of the protrusion 16 taken along the face of the substrate 11 is not limited to the circular shape. However, in order to form liquid crystal domains with the stable radially-inclined orientation, the cross-section of the protrusion is preferably in a rotationally symmetrical shape and more preferably in a highly rotationally symmetrical shape preferably with a two-fold rotation axis or more preferably with a rotation axis of four or more folds.

The inclination angle θ of the inclined side face 16s of the protrusion 16 is preferably in a range between 5 degrees and 85 degrees for attaining stable inclined orientation of the liquid crystal molecules 31. Under application of no voltage, light leakage may be caused due to the birefringent effect of the liquid crystal molecules 31 oriented to be inclined by the anchoring effect of the inclined side face 16s, which may degrade the contrast ratio. In consideration of this, the inclination angle θ of the inclined side face 16s of the protrusion 16 is preferably 50 degrees or less.

The protrusion 16 having the inclined side face may be made from a dielectric substance with high transparency. Alternatively, when the protrusion 16 is made from an opaque dielectric substance, light leakage derived from retardation of the liquid crystal molecules 31 oriented to be inclined owing to the anchoring effect of the inclined side face 16s of the protrusion 16 can be advantageously prevented. It can be determined depending upon the application of the liquid crystal display device which type of dielectric substance is used. In either case, when the dielectric substance is a photosensitive resin, a step of patterning the dielectric substance in accordance with the pattern of an opening 12a described later can be advantageously simplified. In order to attain sufficient orientation-regulating force, the height of the protrusion 16 having the inclined side face is preferably within a range between approximately 0.5 μm and approximately 3 μm when the liquid crystal layer 30 has a thickness of approximately 3 μm. In general, the height of the protrusion 16 having the inclined side face is preferably smaller than the thickness of the liquid crystal layer 30 and larger than approximately ⅙ thereof.

Figure 3A:
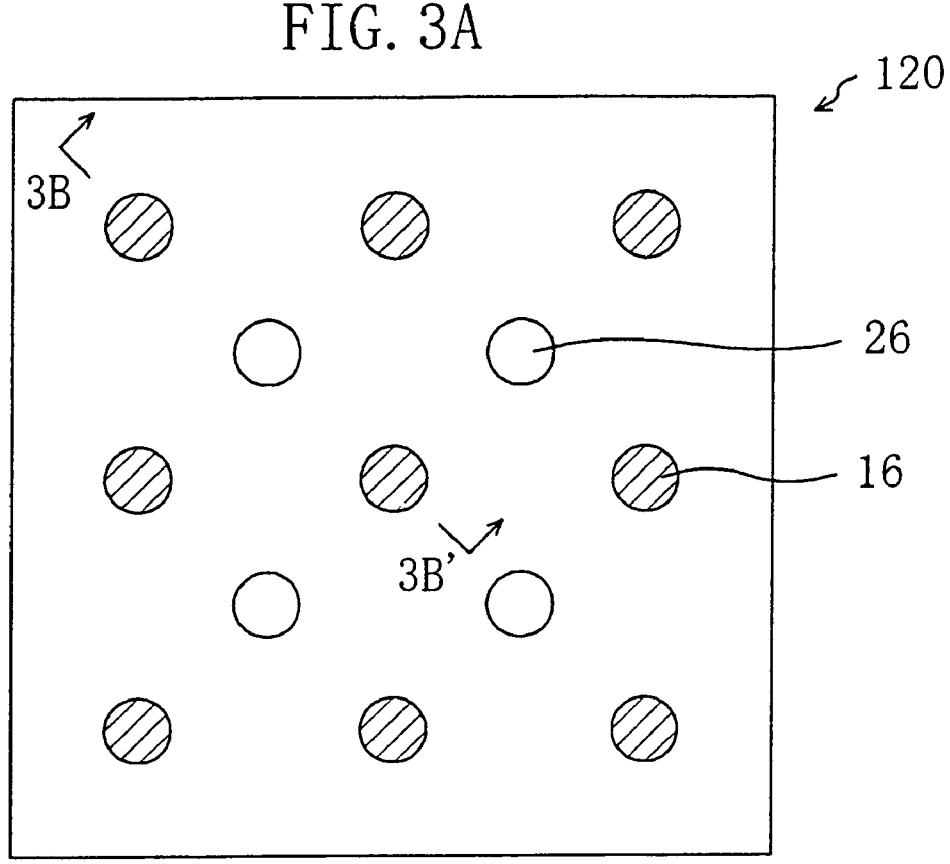
FIG. 3A is a schematic top view for showing the structure of one picture element region of still another liquid crystal display device 120 of Embodiment 1 and FIG. 3B is a cross-sectional view thereof taken along line 3B–3B' of FIG. 3A.
Figure 3B:
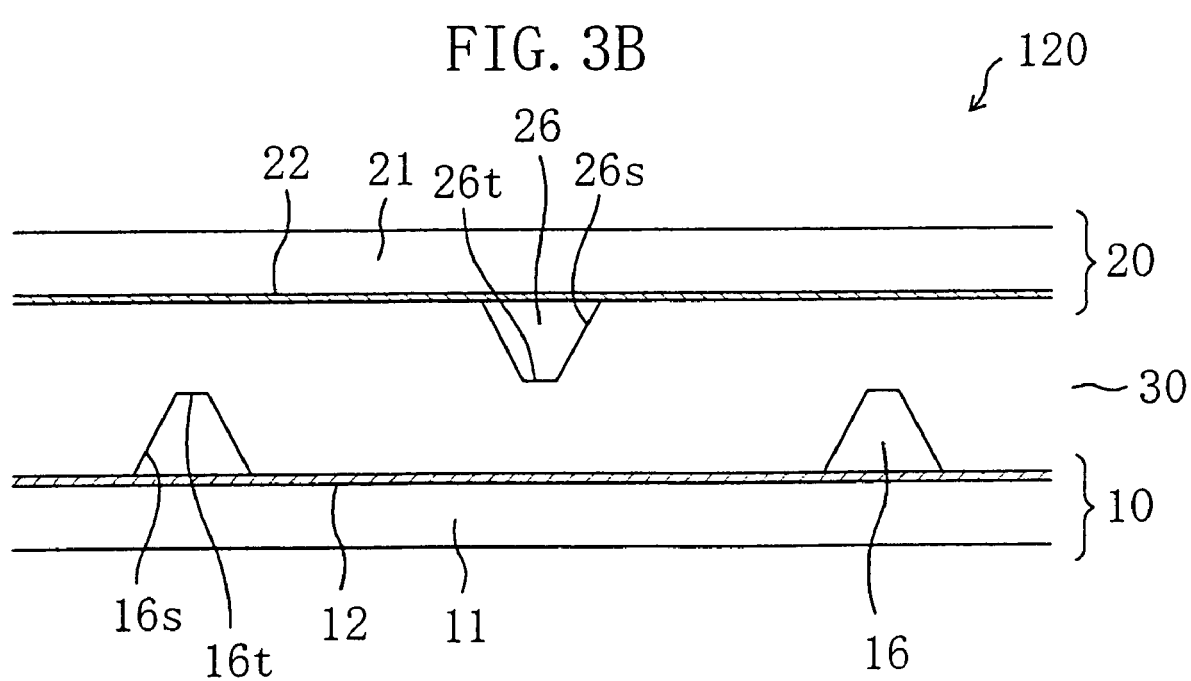

Next, the structure of one picture element region of another liquid crystal display device 120 of Embodiment 1 will be described with reference to FIGS. 3A and 3B. FIG. 3A is a top view seen from the substrate normal direction and FIG. 3B is a cross-sectional view taken along line 3B–3B' of FIG. 3A.

The liquid crystal display device 120 includes, in addition to a plurality of first protrusions 16 formed on the surface of the TFT substrate 10 facing the liquid crystal layer 30, a plurality of second protrusions 26 formed on the surface of the counter substrate 20 facing the liquid crystal layer 30. The first protrusion 16 is substantially the same as the protrusion 16 of the liquid crystal display device 100, and the second protrusion 26 is substantially the same as the first protrusion 16.

As shown in FIG. 3A, the nine first protrusions 16 are arranged so as to form four square lattices, and the second protrusions 26 are disposed at the centers of the respective four square lattices. The four second protrusions 26 also together form a square lattice. When the first protrusions 16 and the second protrusions 26 are thus arranged, the radially-inclined orientation of liquid crystal domains formed in the liquid crystal layer 30 under voltage application can be further stabilized.

Although the second protrusion 26 has substantially the same height and the same shape as the first protrusion 16 in this embodiment, the height and the shape can be appropriately modified. However, the second protrusion 26 also preferably satisfies the conditions of the inclination angle, the cross-sectional shape, the height and the arrangement described above with respect to the first protrusion 16.

Figure 4A:
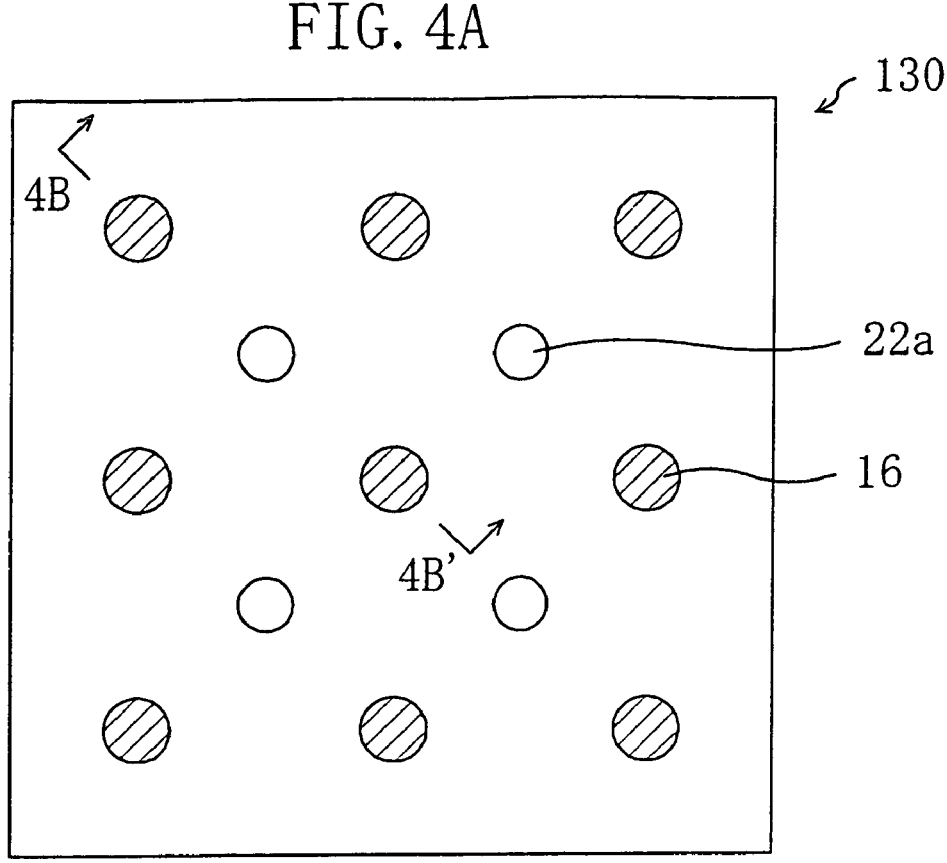
FIG. 4A is a schematic top view for showing the structure of one picture element region of still another liquid crystal display device 130 of Embodiment 1 and FIG. 4B is a cross-sectional view thereof taken along line 4B–4B' of FIG. 4A.
Figure 4B:
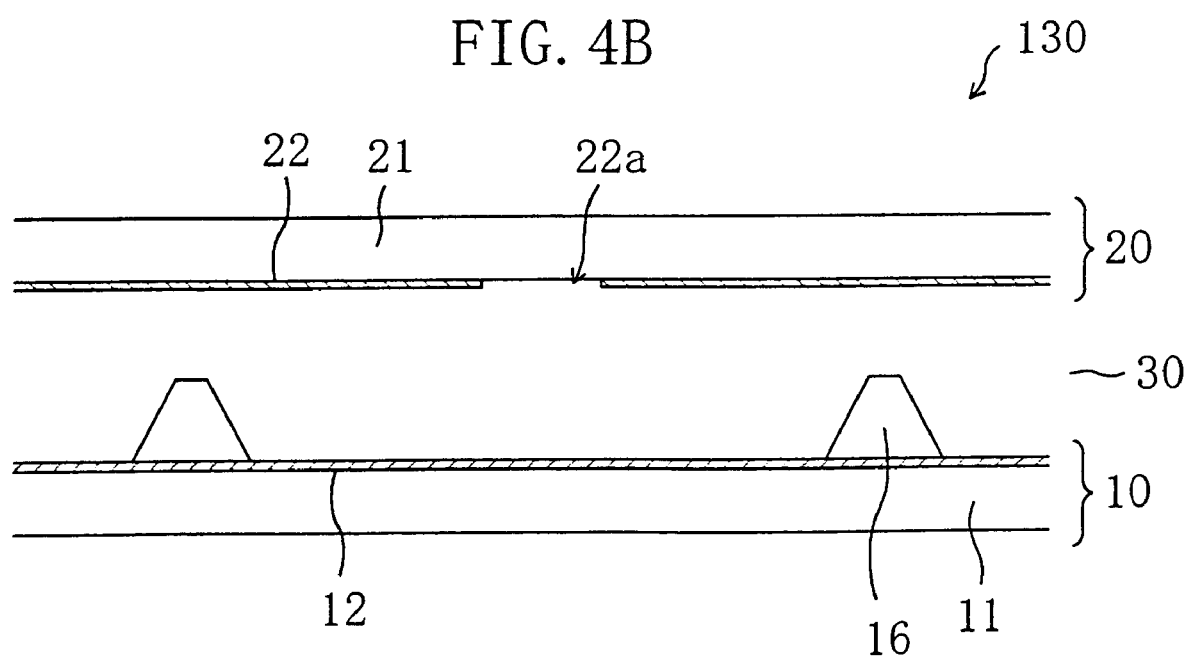

Next, the structure of one picture element region of still another liquid crystal display device 130 of Embodiment 1 will be described with reference to FIGS. 4A and 4B. FIG. 4A is a top view seen from the substrate normal direction and FIG. 4B is a cross-sectional view taken along line 4B–4B' of FIG. 4A.

The liquid crystal display device 130 includes, in addition to a plurality of first protrusions 16 formed on the surface of the TFT substrate 10 facing the liquid crystal layer 30, a plurality of openings 22a formed in the counter electrode 22 of the counter substrate 20. The opening 22a corresponds to a portion of the counter electrode 22 made from a conducting film (such as an ITO film) in which the conducting film is removed. The first protrusion 16 is substantially the same as the protrusion 16 of the liquid crystal display device 100. The opening 22a works to stabilize the radially-inclined orientation similarly to the second protrusion 26 of the liquid crystal display device 120 but works merely under voltage application differently from the second protrusion 26. The shape and the arrangement of the openings 22a preferably satisfy the conditions for the second protrusion 26. The size of the opening 22a is not particularly specified. Also, both the second protrusion 26 and the opening 22a may be used together.

Figure 5A:
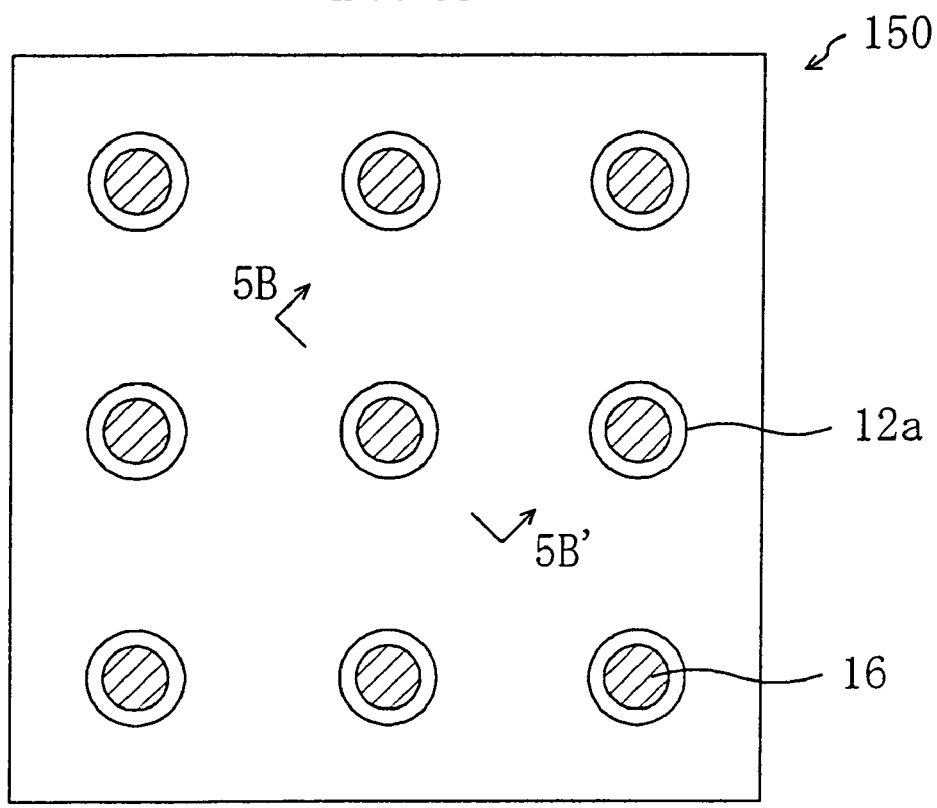
FIG. 5A is a schematic top view for showing the structure of one picture element region of still another liquid crystal display device 150 of Embodiment 1 and FIG. 5B is a cross-sectional view thereof taken along line 5B–5B' of FIG. 5A.

Next, the structure of one picture element region of still another liquid crystal display device 150 of Embodiment 1 will be described with reference to FIGS. 5A and 5B. FIG. 5A is a top view seen from the substrate normal direction and FIG. 5B is a cross-sectional view taken along line 5B–5B' of FIG. 5A.

The liquid crystal display device 150 has no element for attaining orientation-regulating force for forming the radially-inclined orientation on the counter substrate 20 similarly to the liquid crystal display devices 100 and 200, but has an opening 12a formed in the picture element electrode 12 in addition to the protrusion 16 on the TFT substrate 10.

As shown in FIG. 5A, nine openings 12a are arranged so as to form four square lattices, and one protrusion 16 is formed within each opening 12a. The opening 12a is in the shape of a circle when seen from the substrate normal direction and the protrusion 16 is also in the shape of a circle in its cross-section taken along a direction parallel to the substrate surface. Also, the center of the opening 12a accords with the center of the protrusion 16.

Figure 5B:
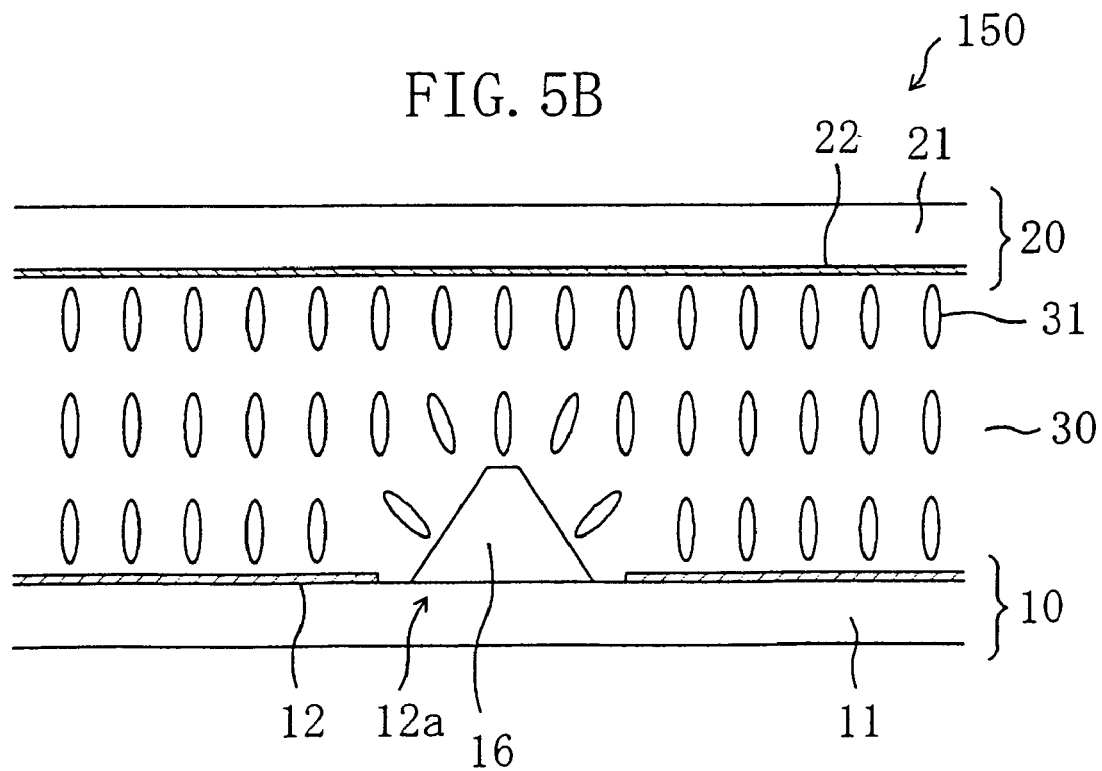

When no electric field is applied through the liquid crystal layer 30, merely the liquid crystal molecules positioned around the protrusion 16 are in the radially-inclined orientation state (which corresponds to an anchoring layer) as shown in FIG. 5B. This state is the same as the state of FIG. 1B in which the protrusion 16 is formed on the picture element electrode 12 having no opening 12a. When a voltage is applied between the picture element electrode 12 and the counter electrode 22, an inclined electric field is generated around the edge of the opening 12a, thereby stabilizing the radially-inclined orientation of the liquid crystal molecules 31. The function of this inclined electric field will now be described with reference to FIGS. 6, 7A through 7D, 8A and 8B.

Figure 6:
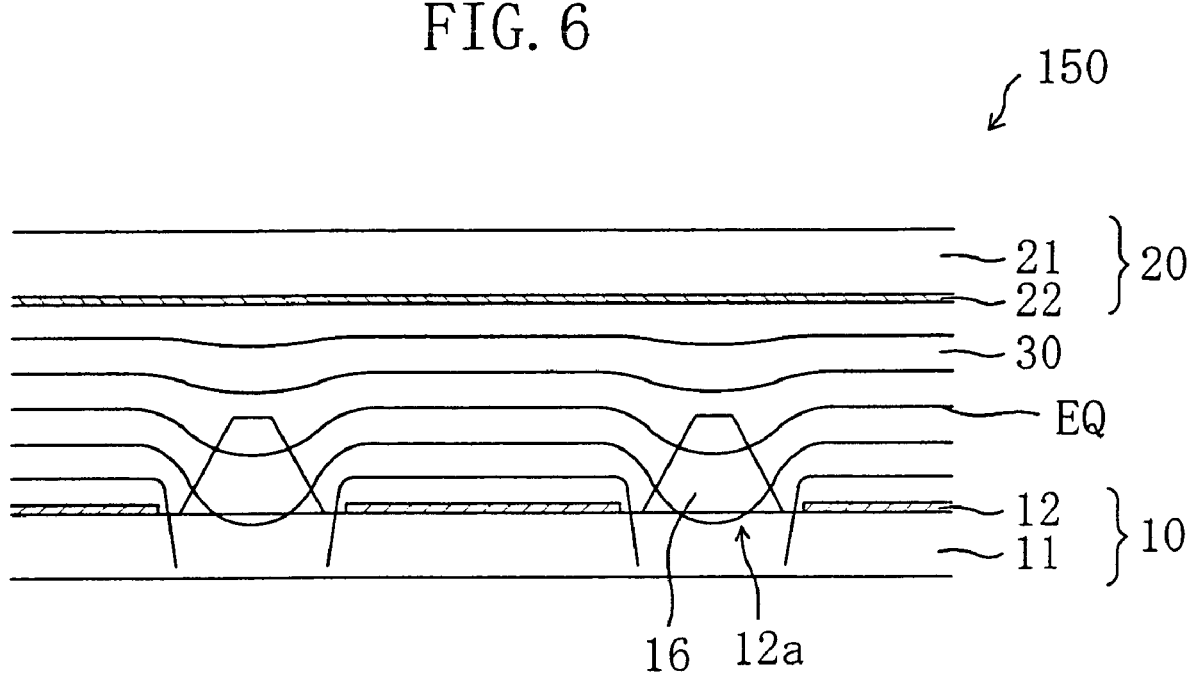
FIG. 6 is a diagram for showing an electric field generated by applying a voltage through a liquid crystal layer 30 of FIG. 5B expressed by using an equipotential line EQ.

FIG. 6 shows an electric field generated by applying a voltage through the liquid crystal layer 30 of FIG. 5B expressed by using an equipotential line EQ. The equipotential line EQ is parallel to the surfaces of the picture element electrode 12 and the counter electrode 22 within a portion of the liquid crystal layer positioned between the picture element electrode 12 and the counter electrode 22. Also, the equipotential line EQ drops in a portion corresponding to the opening 12a of the picture element electrode 12, and an inclined electric field expressed by an inclined portion of the equipotential line EQ is formed in a portion of the liquid crystal layer 30 on the edge portion of the opening 12a (that is, the inside periphery of the opening 12a including the boundary thereof). To the liquid crystal molecules 31 having the negative dielectric anisotropy, torque for orienting the axial directions of the liquid crystal molecules 31 to be parallel to the equipotential line EQ (vertical to the line of electric force) is applied. Accordingly, the liquid crystal molecules 31 disposed on the edge portion of the opening 12a are inclined (rotated) in the clockwise direction at the edge portion on the right hand side of the opening 12a and in the counterclockwise direction at the edge portion on the left hand side, so as to orient to be parallel to the equipotential line EQ.

Figure 7A:
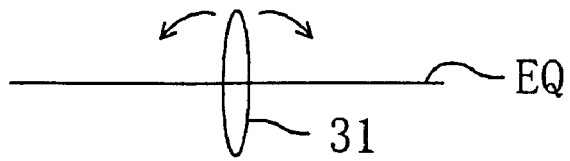
FIGS. 7A, 7B, 7C and 7D are schematic diagrams for explaining orientation-regulating force applied to liquid crystal molecules 31 by the electric field.

Now, the change of the orientation of the liquid crystal molecules 31 will be described in detail with reference to FIGS. 7A through 7D. When an electric field is generated in the liquid crystal layer 30, torque for orienting the axial directions of the liquid crystal molecules 31 to be parallel to the equipotential line EQ is applied to the liquid crystal molecules 31 having the negative dielectric anisotropy. As shown in FIG. 7A, when an electric field expressed by an equipotential line EQ vertical to the axial direction of a liquid crystal molecule 31 is generated, torque is applied to the liquid crystal molecule 31 for inclining it in the clockwise direction or in the counterclockwise direction in the same probability. Accordingly, in a portion of the liquid crystal layer 30 disposed between parallel plate electrodes opposing each other, the torque is applied in the clockwise direction to some liquid crystal molecules 31 and in the counterclockwise direction to other liquid crystal molecules 31. As a result, the orientation sometimes may not be smoothly changed in accordance with a voltage applied through the liquid crystal layer 30.

Figure 7B:
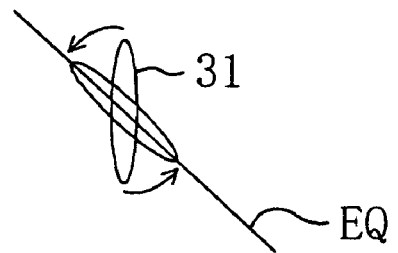
Figure 7C:
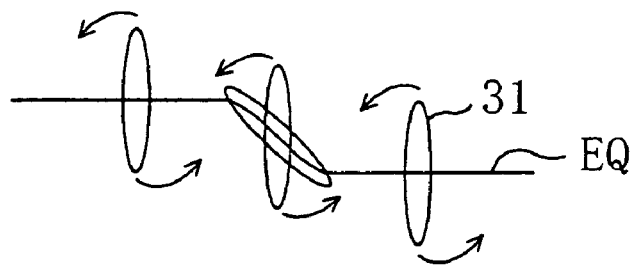

When the electric field inclined against the axial directions of the liquid crystal molecules 31 as expressed by the equipotential line EQ (namely, the inclined electric field) is generated at the edge portion of the opening 12a of the liquid crystal display device 150 as shown in FIG. 6, a liquid crystal molecule 31 is inclined, as shown in FIG. 7B, in a direction for orienting to be parallel to the equipotential line EQ with smaller inclination (in the counterclockwise direction in the drawing). Furthermore, a liquid crystal molecule 31 positioned in a portion where an electric field expressed by an equipotential line EQ vertical to the axial direction is generated is inclined, as shown in FIG. 7C, in the same direction as another liquid crystal molecule 31 positioned on the inclined portion of the equipotential line EQ, so as to make continuous (match) their orientations.

Figure 7D:
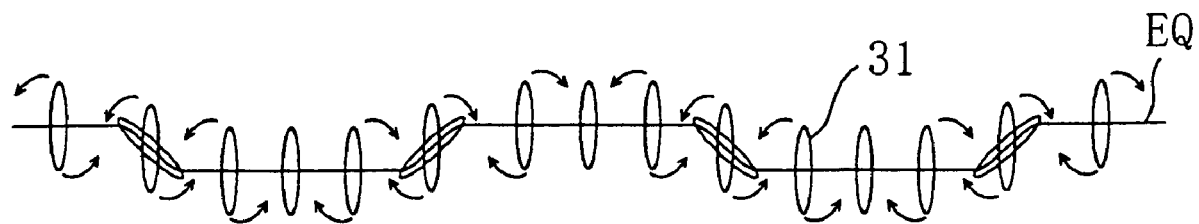

When an electric field expressed by an equipotential line EQ with continuous irregularities as shown in FIG. 7D is applied, liquid crystal molecules 31 positioned on a flat portion of the equipotential line EQ are oriented in a direction matching with the orientation direction regulated by other liquid crystal molecules 31 positioned on inclined portions of the equipotential line EQ. Herein, "to be positioned on an equipotential line EQ" means "to be positioned within an electric field expressed by an equipotential line EQ".

Figure 8A:
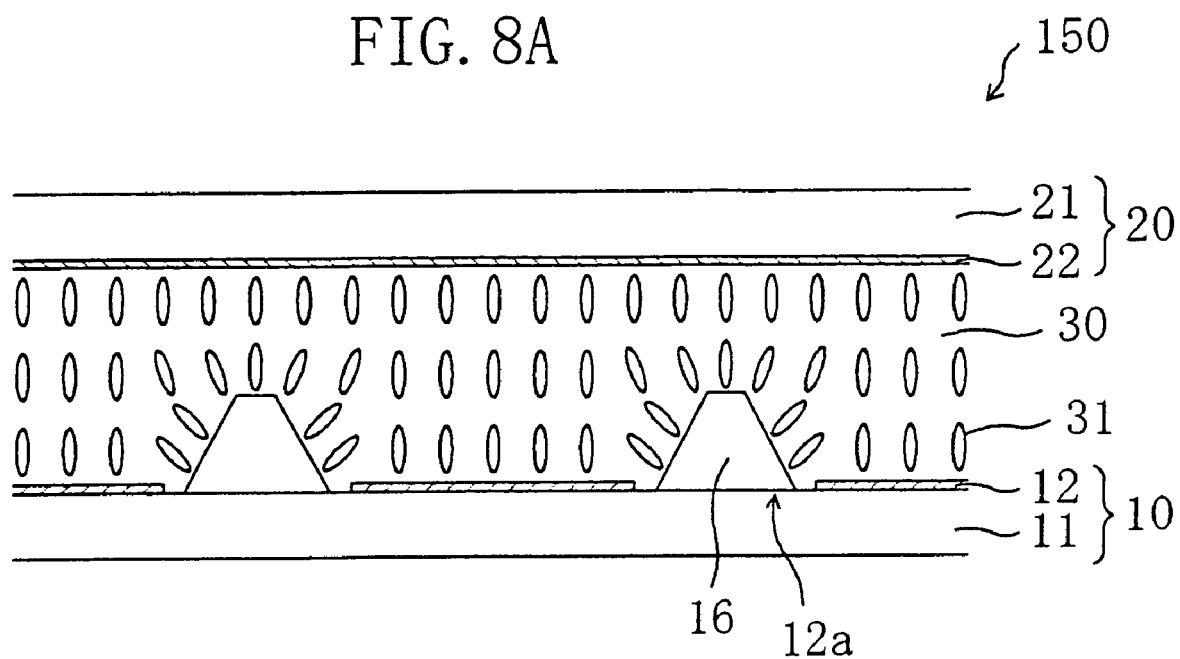
FIGS. 8A and 8B are partial cross-sectional views of the liquid crystal display device 150, and specifically FIG. 8A schematically shows the orientation state of the liquid crystal molecules 31 under application of no voltage and FIG. 8B schematically shows that under application of a voltage (an intermediate gray scale voltage)

Since the liquid crystal display device 150 has the protrusion 16 formed within the opening 12a, when no voltage is applied, some liquid crystal molecules 31 are oriented vertically to the inclined side face and other liquid crystal molecules 31 are oriented vertical to the horizontal surfaces as shown in FIG. 8A.

When a voltage is applied through the liquid crystal layer 30, the electric field expressed by the equipotential line EQ of FIG. 6 is generated in the liquid crystal layer 30, and hence, the liquid crystal molecules 31 positioned at the edge portion of the opening 12a of the picture element electrode 12 are inclined due to the influence of the inclined electric field. While merely a few liquid crystal molecules 31 are oriented to be inclined owing to the anchoring effect of the inclined side face of the protrusion 16, the range influenced by the inclined electric filed is comparatively large, and even liquid crystal molecules 31 substantially vertically oriented under application of no voltage are inclined due to the influence of the inclined electric field. The inclination direction of a liquid crystal molecule 31 inclined by the inclined electric field generated at the edge portion of the opening 12a matches with the inclination direction of the liquid crystal molecule 31 inclined by the anchoring effect of the inclined side face of the protrusion 16 formed within the opening 12a. Accordingly, the radially-inclined orientation of FIG. 8B is more stable than the radially-inclined orientation of FIG. 2B (although the difference is not shown because FIGS. 2B and 8B are schematic diagrams).

Figure 8B:
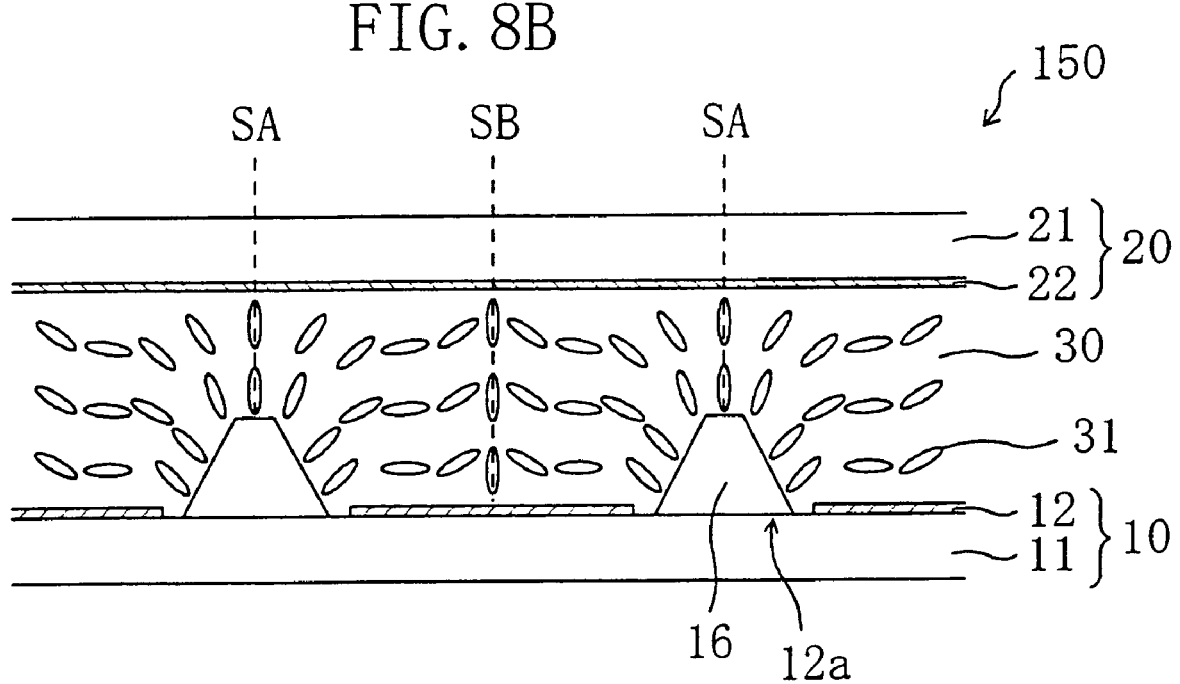
Figure 9A:
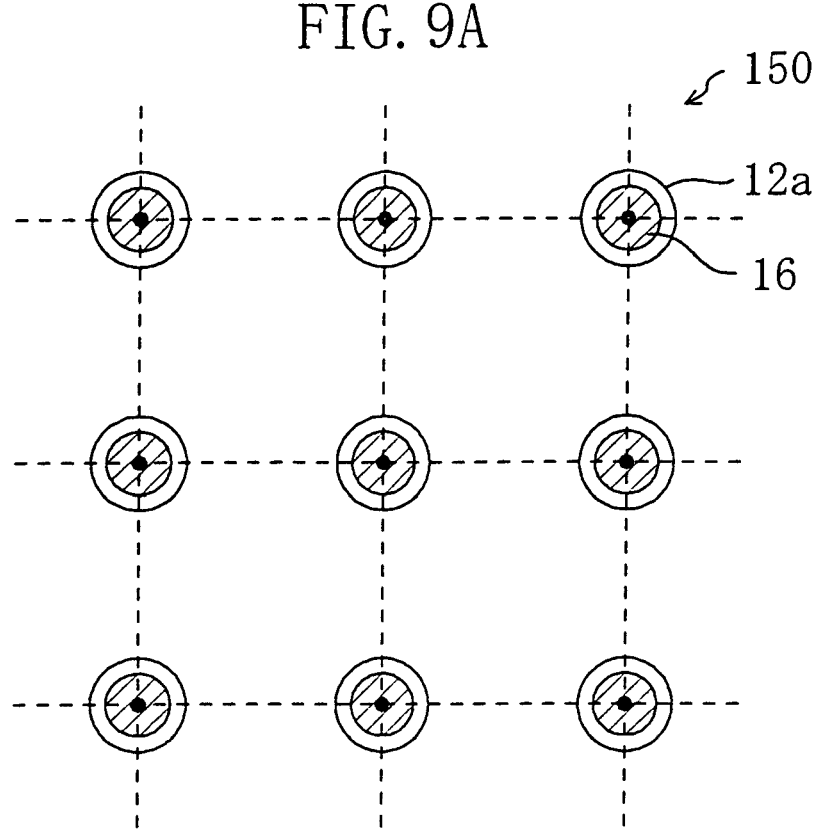
FIGS. 9A and 9B are schematic diagrams for showing the orientation state of the liquid crystal molecules 31 seen from the top face of a substrate of the liquid crystal display device 150, and specifically
Figure 9B:
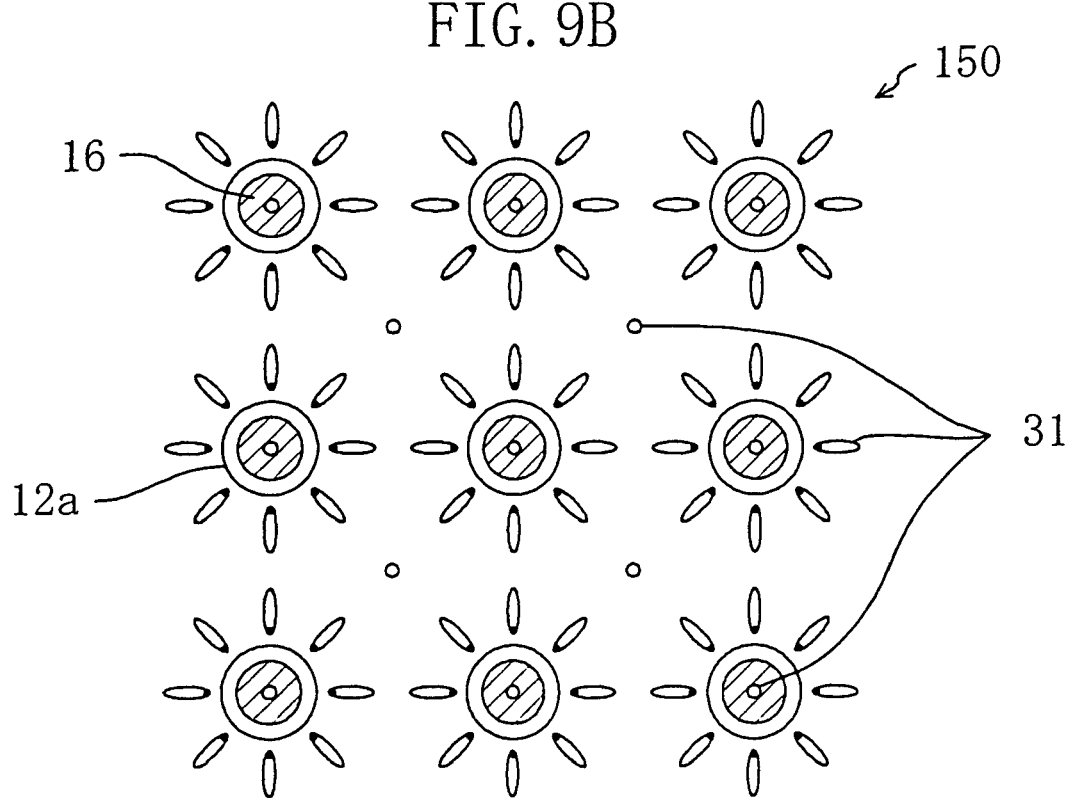

The orientation states of the liquid crystal molecules 31 shown in FIGS. 8A and 8B seen from the substrate normal direction of the counter substrate 20 are shown in FIGS. 9A and 9B.

Under application of no voltage as shown in FIG. 9A, merely a few liquid crystal molecules positioned in the vicinity of the periphery of the protrusion 16 are oriented to be inclined and other liquid crystal molecules positioned in the remaining portion are oriented substantially vertically to the drawing surface. In FIG. 9A, no liquid crystal molecules are shown for simplification.

Under application of a voltage, the liquid crystal molecules 31 are radially oriented about the protrusion 16 as shown in FIG. 9B. A black end of each liquid crystal molecule 31 drawn in the shape of an ellipse means that the liquid crystal molecule 31 is inclined so that the black end be closer to the substrate 10 where the picture element electrode 12 having the opening 12a is formed than the other end. This also applies to other drawings mentioned below.

As is obvious from FIG. 9B, under application of a voltage, nine liquid crystal domains respectively having nine protrusions 16 as their symmetry axes and four liquid crystal domains respectively having the centers of four square lattices formed by the nine protrusions 16 as the symmetry axes are formed in one picture element region of the liquid crystal display device 150. The orientations of the liquid crystal molecules 31 are continuous (match) on the boundaries between these thirteen liquid crystal domains.

The orientation-regulating force caused by the inclined electric field naturally works merely under application of a voltage, and its strength depends upon the strength of the electric field (namely, the amplitude of the applied voltage). Accordingly, when the electric field is weak (namely, the applied voltage is low), the orientation-regulating force caused by the inclined electric field is weak. Therefore, when external force is applied to the liquid crystal panel, the radially-inclined orientation may be destroyed due to the floating of the liquid crystal material. When the radially-inclined orientation is destroyed once, it cannot be restored until a voltage for generating an inclined electric field capable of exhibiting sufficiently strong orientation-regulating force is applied. In contrast, the orientation-regulating force caused by the inclined side face of the protrusion 16 works regardless of the applied voltage and is very strong as is known as the anchoring effect of an alignment film. Accordingly, even when the radially-inclined orientation is once destroyed due to the floating of the liquid crystal material, the liquid crystal molecules 31 positioned in the vicinity of the inclined side face of the protrusion 16 keep their orientation directions the same as those in the radially-inclined orientation. Therefore, the radially-inclined orientation can be easily restored when the floating of the liquid crystal material is stopped.

In the liquid crystal display device 150 of Embodiment 1, the radially-inclined orientation is more stabilized owing to the inclined electric field generated by the picture element electrode 12 having the opening 12a than in the case where the protrusion 16 alone is formed (for example, as in the liquid crystal display device 120 of FIG. 2).

So far, the picture element electrode 12 in a square shape is exemplified, but the shape of the picture element electrode 12 is not limited to the square. The general shape of the picture element electrode 12 is approximated to a rectangle (including a square), and hence, the openings 12a can be regularly disposed in square lattice arrangement. The effect of the invention can be attained even when the picture element electrode 12 is in a shape other than the rectangular shape as far as the openings 12a are disposed regularly (for example, in the square lattice arrangement as described above) so as to form liquid crystal domains over the entire picture element region.

Figure 10A:
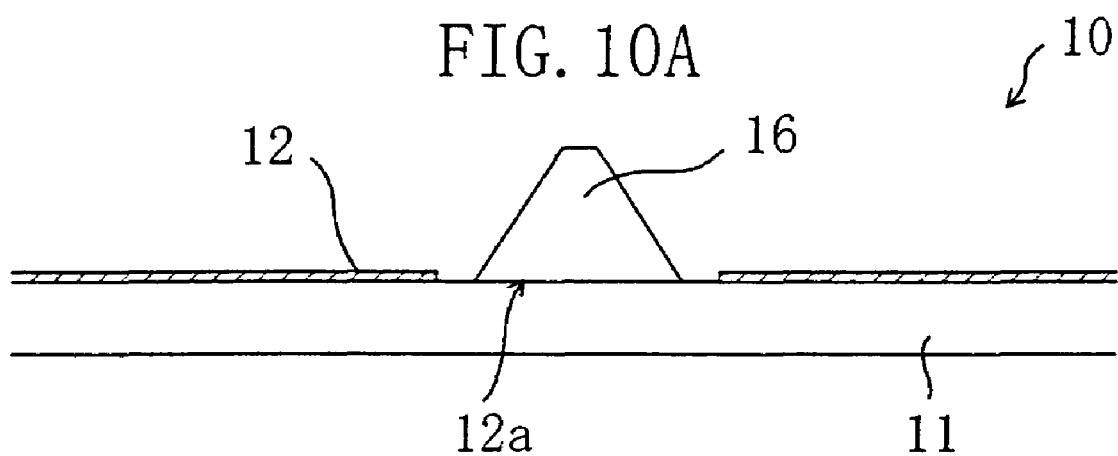
FIGS. 10A, 10B and 10C are diagrams for explaining the positional relationship between a protrusion 16 and an opening 12a used in the liquid crystal display device of this invention.
Figure 10B:
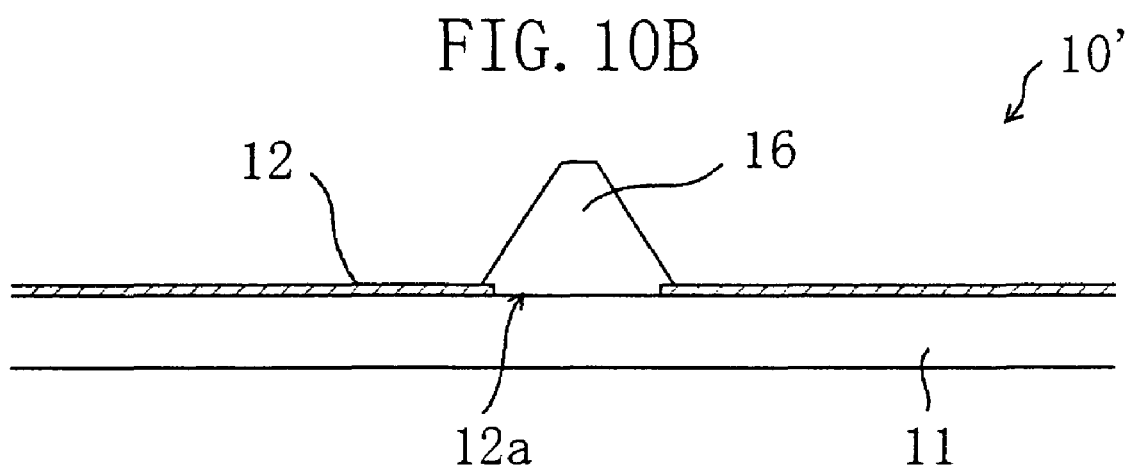
Figure 10C:
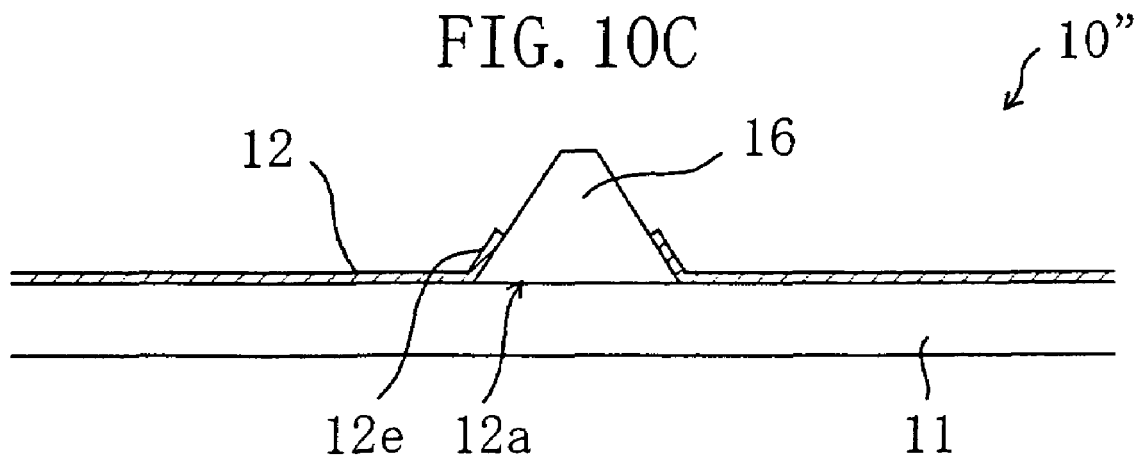

The protrusion 16 having the inclined side face is preferably formed within the opening 12a as shown in FIG. 10A and may be formed so that the periphery of the protrusion 16 covers the edge portion of the opening 12a as shown in FIG. 10B. However, it is not preferred that an edge 12e of the picture element electrode 12 close to the opening 12a is formed on the inclined side face of the protrusion 16 as shown in FIG. 10C. When the edge 12e of the picture element electrode 12 is formed on the inclined side face of the protrusion 16, the orientation-regulating force caused by the electric field generated in this portion works in a reverse direction to the orientation-regulating force caused by the inclined side face of the protrusion 16, resulting in disturbing the radially-inclined orientation of the liquid crystal molecules.

The radially-inclined orientation of the liquid crystal molecules 31 is more stable when it is clockwise or counterclockwise spiral radially-inclined orientation than when it is simple radially-inclined orientation as shown in FIG. 9B. The spiral orientation herein means the orientation state of liquid crystal molecules taken on a plane of the liquid crystal layer (i.e., on a plane of the substrate). In spiral orientation exhibited by adding a small amount of chiral agent to a liquid crystal material, the orientation directions of the liquid crystal molecules 31 are minimally spirally changed along the thickness direction of the liquid crystal layer 30 differently from the general twist orientation but the orientation directions of the liquid crystal molecules 31 are minimally changed along the thickness direction of the liquid crystal layer 30 when seen in a small region. Specifically, in a cross-section taken in any position along the thickness direction of the liquid crystal layer 30 (i.e., in any cross-section taken along a plane parallel to the layer face), the liquid crystal molecules are in the same orientation state, and twist change along the thickness direction of the liquid crystal layer 30 is minimally caused. However, in the entire liquid crystal domain, the twist change is caused to some extent.

When a chiral agent is added to a nematic liquid crystal material having the negative dielectric anisotropy, liquid crystal domains in each of which the liquid crystal molecules 31 are in the counterclockwise or clockwise spiral radially-inclined orientation state about the opening 12a are formed under application of a voltage. The spiral direction depends upon the kind of chiral agent to be used. Accordingly, by forming liquid crystal domains placed in the spiral radially-inclined orientation state under voltage application, the spiral direction of the radially inclined liquid crystal molecules 31 around the liquid crystal molecules 31 oriented vertically to the substrate surface can be made the same in all the liquid crystal domains, resulting in realizing even display free from unevenness. Furthermore, since the spiral direction around the liquid crystal molecules 31 oriented vertically to the substrate surface is thus determined, the response speed in applying a voltage through the liquid crystal layer 30 can be improved.

Furthermore, when a large amount of chiral agent is added, also in a liquid crystal layer in the spiral orientation state, the orientation of the liquid crystal molecules 31 is spirally changed along the thickness direction of the liquid crystal layer 30 when seen in a small region as in the general twist orientation.

In the orientation state where the orientation of the liquid crystal molecules 31 is not spirally changed along the thickness direction of the liquid crystal layer 30, liquid crystal molecules 31 oriented vertically or in parallel to the polarization axis of a polarizing plate do not cause a phase difference in incident light, and hence, incident light passing through a portion in such an orientation state makes no contribution to the transmittance. For example, when a picture element region in a white display state of a liquid crystal display device including polarizing plates disposed in a crossed Nicols state is observed, a cross-shaped quenching pattern can be clearly seen at the center of a liquid crystal domain in the radially-inclined orientation state.

In contrast, in the orientation state where the orientation of the liquid crystal molecules 31 is spirally changed along the thickness direction of the liquid crystal layer 30, the liquid crystal molecules 31 oriented vertically or in parallel to the polarization axis of the polarizing plate also cause a phase difference in incident light, and the optical activity of the light can be utilized. Accordingly, the incident light passing through a portion in such an orientation state can make contribution to the transmittance, resulting in realizing a liquid crystal display device capable of bright display. For example, when a picture element region in a white display state of a liquid crystal display device including polarizing plates disposed in a crossed Nicols state is observed, a cross-shaped quenching pattern is unclear at the center of the liquid crystal domain in the radially-inclined orientation state and the display is bright as a whole. In order to efficiently improve light utilization by the optical activity, the twist angle of the liquid crystal layer is preferably approximately 90 degrees.

The spiral radially-inclined orientation is preferred not only in the case where the opening 12a is formed but also in the case where the radially-inclined orientation is formed by using the protrusion 16 and/or the protrusion 26 without forming the opening 12a.

Figure 11A:
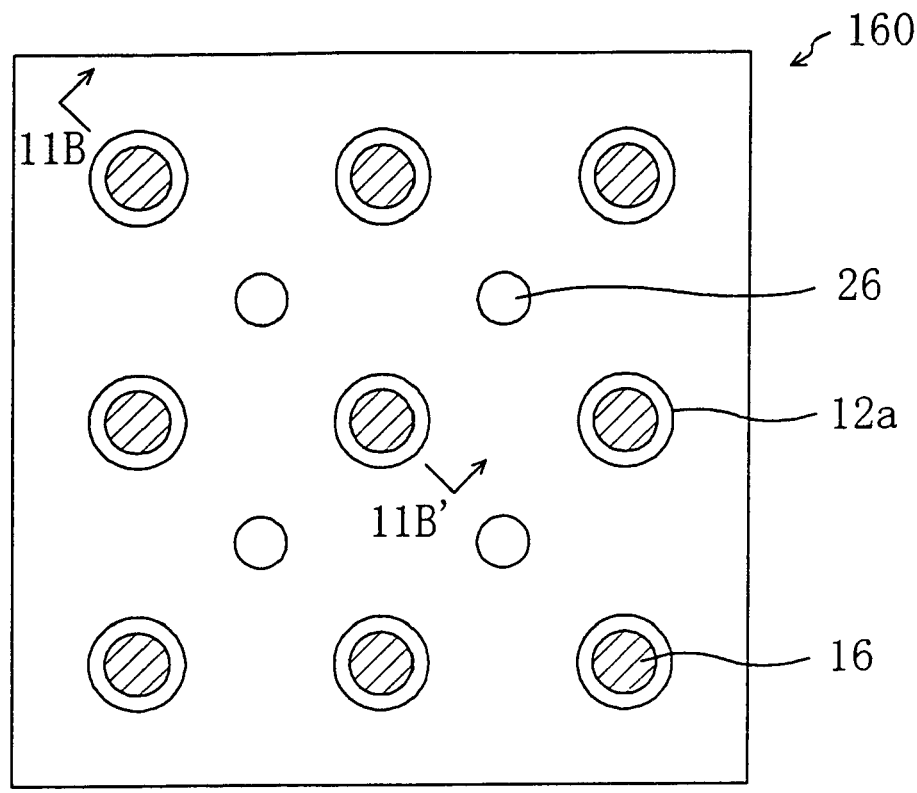
FIG. 11A is a top view for schematically showing the structure of one picture element region of still another liquid crystal display device 160 of Embodiment 1 and FIG. 11B is a cross-sectional view thereof taken along line 11B–11B' of FIG. 11A.
Figure 11B:
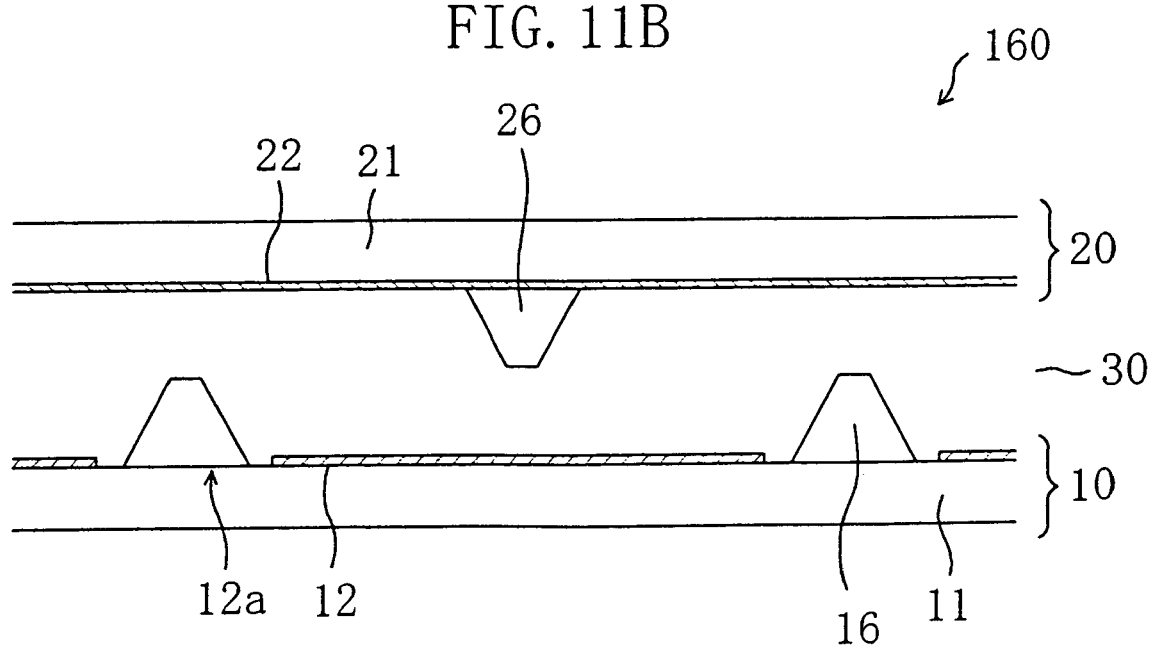

Next, the structure of one picture element region of still another liquid crystal display device 160 of Embodiment 1 will be described with reference to FIGS. 11A and 11B. FIG. 11A is a top view seen from the substrate normal direction and FIG. 11B is a cross-sectional view taken along line 11B–11B' of FIG. 11A.

The liquid crystal display device 160 corresponds to a device obtained by replacing the TFT substrate 10 of the liquid crystal display device 120 with the TFT substrate 10 of the liquid crystal display device 150, and hence includes a TFT substrate 10 having substantially the same structure as the TFT substrate 10 of the liquid crystal display device 150 and a counter substrate 20 having substantially the same structure as the counter substrate 20 of the liquid crystal display device 120.

A plurality of openings 12a are disposed in the lattice square arrangement in the picture element electrode 12 of the TFT substrate 10, and one first protrusion 16 is formed within each opening 12a. A plurality of second protrusions 26 are formed on the surface of the counter substrate 20 facing the liquid crystal layer 30, so as to be respectively disposed at the centers of the square lattices formed by the first protrusions 16 (and the openings 12a) of the TFT substrate 10.

Figure 12:
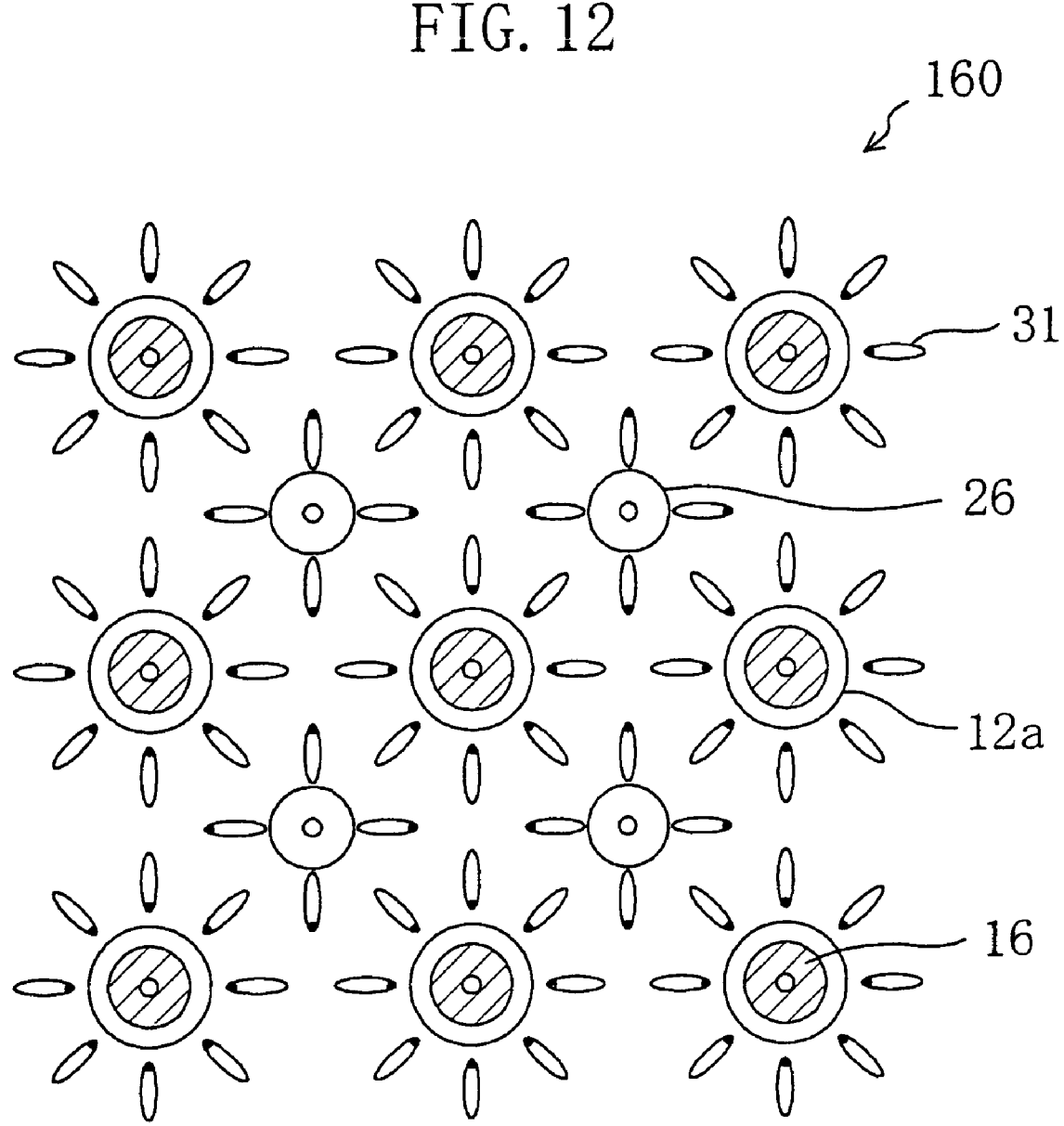
FIG. 12 is a schematic diagram for showing the orientation state of the liquid crystal molecules 31 seen from the top face of a substrate under application of a voltage through a liquid crystal layer 30 of the liquid crystal display device 160.

FIG. 12 shows the orientation state of the liquid crystal molecules 31 observed from the substrate normal direction of the counter substrate 20 under voltage application in the liquid crystal display device 160. As is obvious from FIG. 12, nine liquid crystal domains respectively having nine first protrusions 16 (and the openings 12a) as the symmetry axes and four liquid crystal domains respectively having the centers of the second protrusions 26 respectively disposed at the centers of the four square lattices formed by the nine first protrusions 16 are formed in one picture element region under voltage application in the liquid crystal display device 160. The orientations of the liquid crystal molecules 31 are continuous (match) on the boundaries between these thirteen liquid crystal domains.

Since the TFT substrate 10 of the liquid crystal display device 160 has not only the first protrusions 16 but also the openings 12a, the radially-inclined orientation is furthermore stable than in the liquid crystal display device 120 of FIG. 3, and the response speed can be also improved.

Figure 13A:
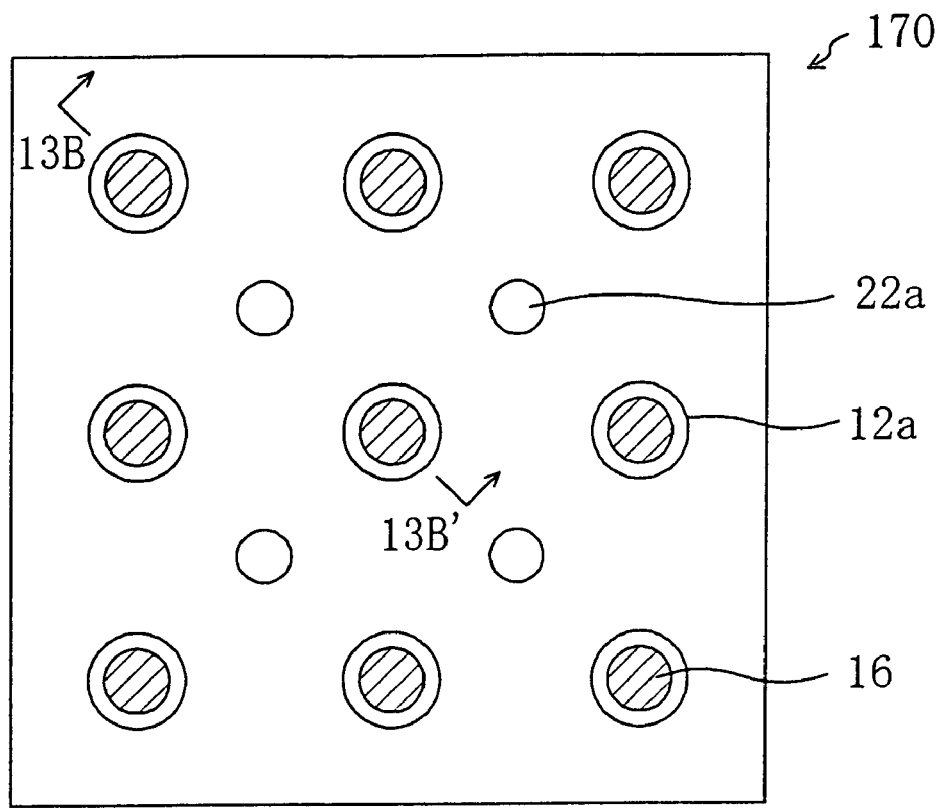
FIG. 13A is a top view for schematically showing the structure of one picture element region of still another liquid crystal display device 170 of Embodiment 1 and FIG. 13B is a cross-sectional view thereof taken along line 13B–13B' of FIG. 13A.

Next, the structure of one picture element region of still another liquid crystal display device 170 of Embodiment 1 will be described with reference to FIGS. 13A and 13B. FIG. 13A is a top view seen from the substrate normal direction and FIG. 13B is a cross-sectional view taken along line 13B–13B' of FIG. 13A.

The liquid crystal display device 170 includes openings 22a formed in the counter electrode 22 instead of the second protrusions 26 of the liquid crystal display device 160. The openings 22a work so as to stabilize the radially-inclined orientation similarly to the second protrusions 26 of the liquid crystal display device 160 as described with reference to FIGS. 4A and 4B. This will be described with reference to FIG. 14.

Figure 13B:
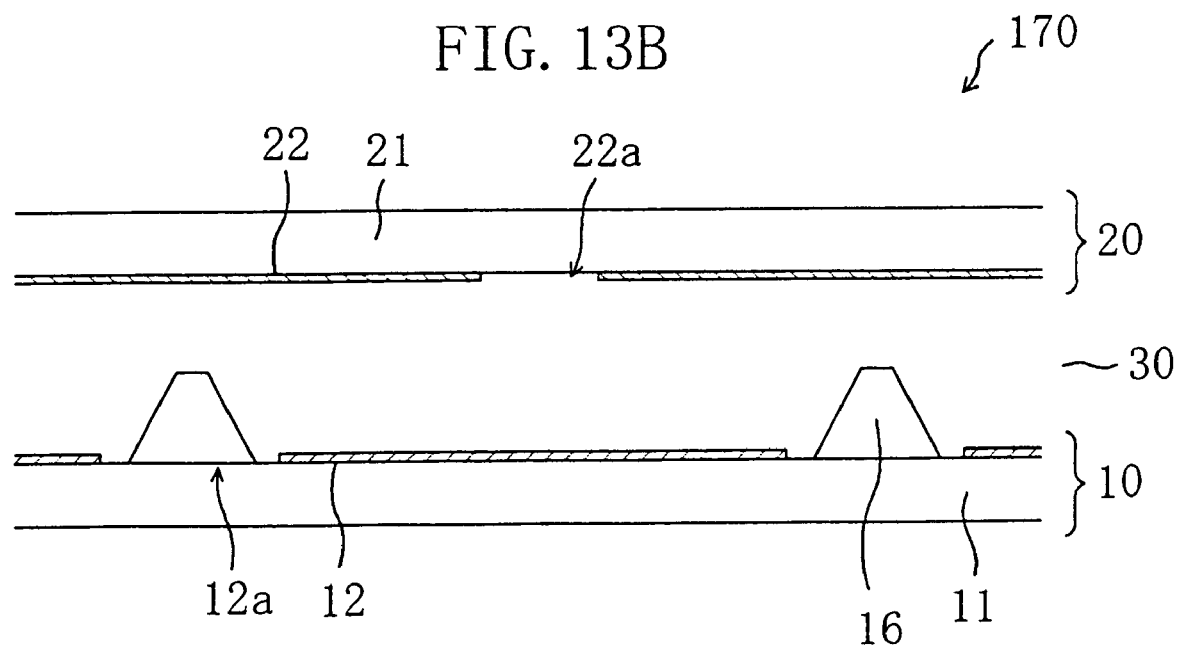

FIG. 14 shows an electric field generated by applying a voltage through the liquid crystal layer 30 of FIG. 13B expressed by using an equipotential line EQ. As is obvious from FIG. 14, an inclined electric field is generated on edge portions of both the openings 12a and the openings 22a. The direction of the orientation-regulating force caused by the electric field generated at the edge portion of the opening 22a is the same as the direction of the orientation-regulating force caused by the inclined side face of the protrusion 26, and this orientation-regulating force works so as to stabilize the radially-inclined orientation similarly to the protrusion 26. However, the orientation-regulating force caused by the electric field works merely under voltage application differently from that caused by the inclined side face of the protrusion 26. The shape, the size and the arrangement of the openings 22a preferably satisfy the same conditions as those for the second protrusions 26. Also, the second protrusions 26 and the openings 22a may be used together.

Figure 15:
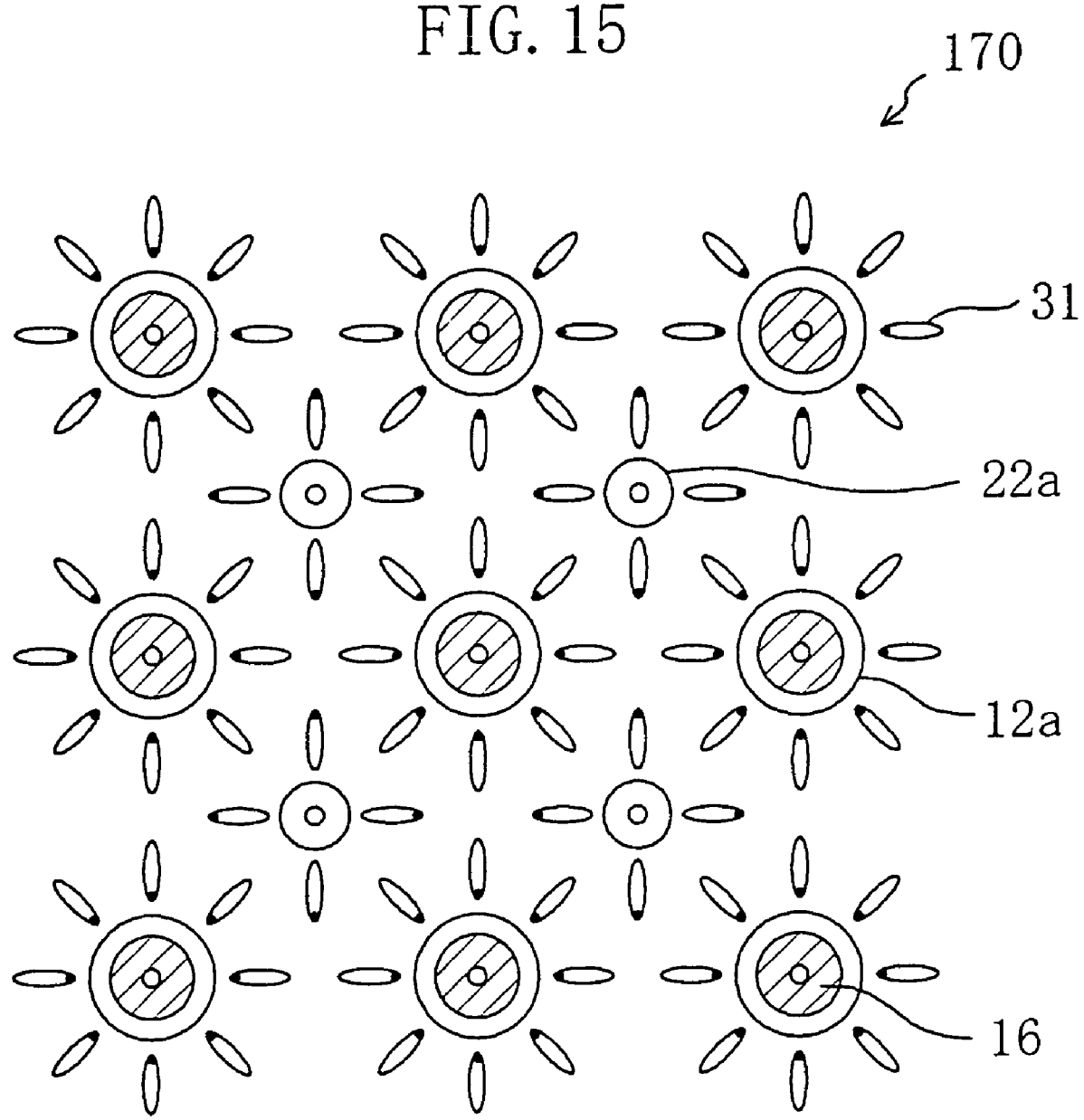
FIG. 15 is a schematic diagram for showing an orientation state of the liquid crystal molecules 31 seen from the top face of a substrate under application of a voltage through the liquid crystal layer 30 of the liquid crystal display device 170.

FIG. 15 shows the orientation state of the liquid crystal molecules 31 seen from the substrate normal direction of the counter substrate 20 under voltage application in the liquid crystal display device 170. As is obvious from FIG. 15, nine liquid crystal domains respectively having nine first protrusions 16 (and the openings 12a) as the symmetry axes and four liquid crystal domains respectively having the centers of the openings 22a disposed at the centers of four square lattices formed by the nine first protrusions 16 are formed in one picture element region under voltage application in the liquid crystal display device 170. The orientations of the liquid crystal molecules 31 are continuous (match) on the boundaries between these thirteen liquid crystal domains.

Figure 16A:
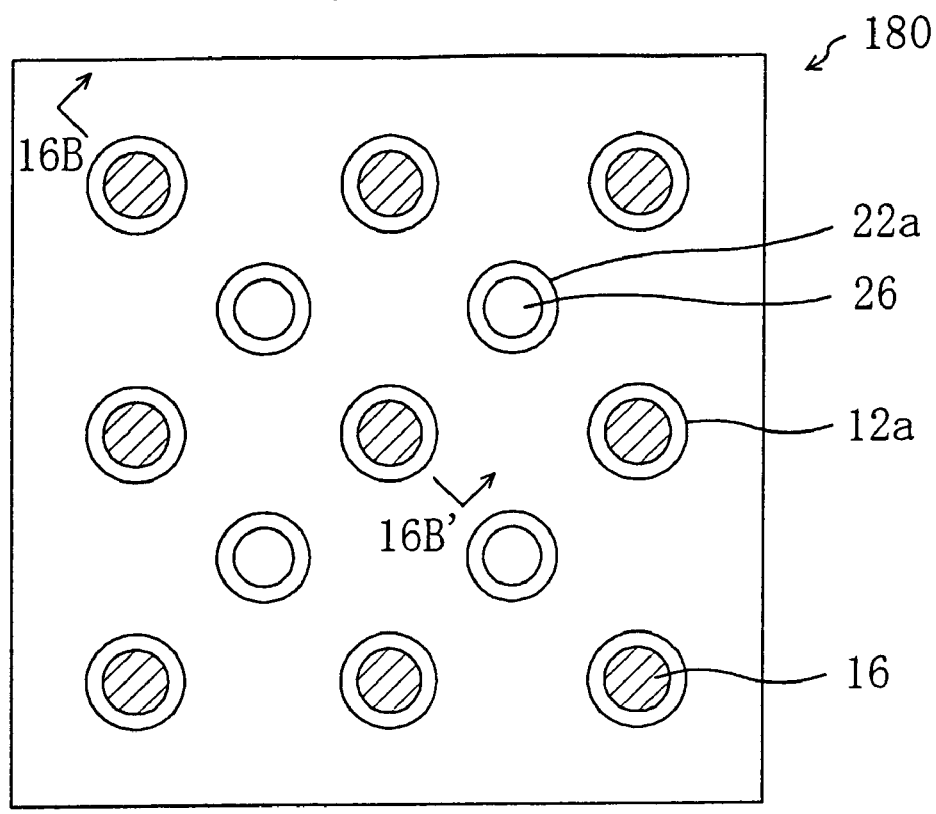
FIG. 16A is a top view for schematically showing the structure of one picture element region of still another liquid crystal display device 180 of Embodiment 1 and FIG. 16B is a cross-sectional view thereof taken along line 16B–16B' of FIG. 16A.
Figure 16B:
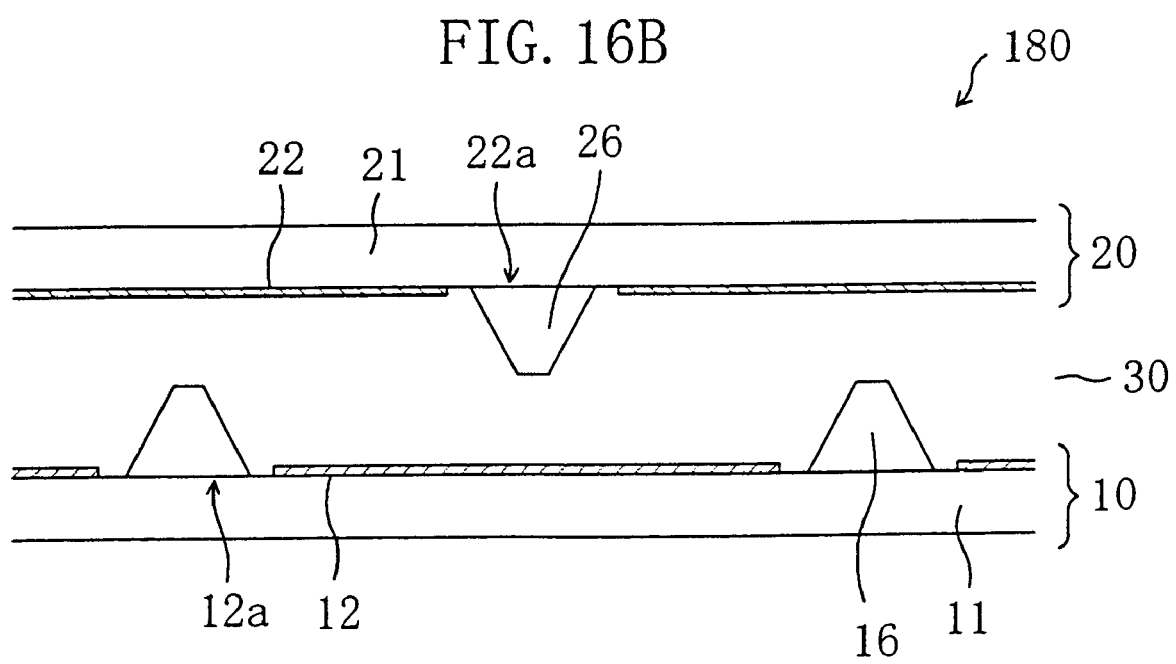

Furthermore, in order to increase the orientation-regulating force on the counter substrate 20, openings 22a may be formed in the counter electrode 22 with second protrusions 26 formed within the openings 22a as in a liquid crystal display device 180 shown in FIGS. 16A and 16B.

Embodiment 2

The stability of the radially-inclined orientation of liquid crystal molecules can be improved according to the invention, and therefore, when the invention is applied to a liquid crystal display device having a structure in which the orientation of liquid crystal molecules easily becomes unstable, the advantage can be remarkably exhibited. For example, in a liquid crystal display device of the so-called multi-gap system including a liquid crystal layer having different thicknesses in one picture element region, such as a transmission/reflection combination type liquid crystal display device having a transmission region and a reflection region in each picture element region, the orientation of liquid crystal molecules are easily disturbed due to a level difference, and hence, it is difficult to obtain stable radially-inclined orientation. For example, it has been found, as a result of examination made by the present inventors, that even when an opening is formed in the electrode for generating an inclined electric field, it is difficult to obtain sufficiently stable radially-inclined orientation in such a liquid crystal display device.

In Embodiment 2, the present invention is applied to a transmission/reflection combination type (hereinafter referred to as "the combination type") liquid crystal display device.

The structure of a combination type liquid crystal display device of Embodiment 2 will now be described with reference to FIGS. 17A, 17B and 17C.

Figure 17A:
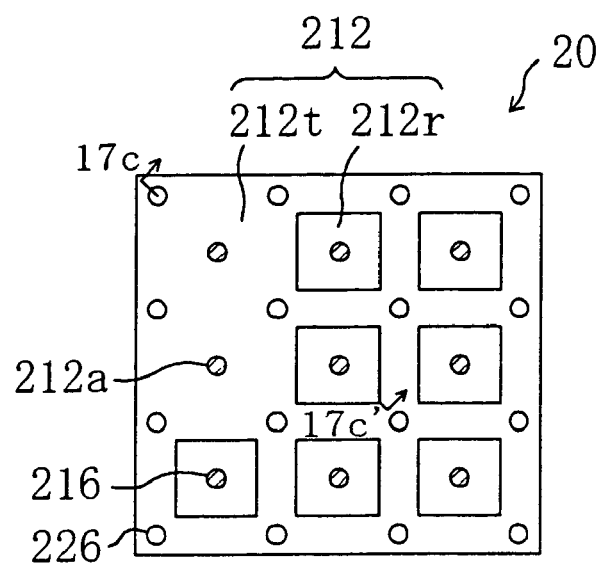
FIGS. 17A, 17B and 17C are schematic diagrams for showing the structure of one picture element region of combination type liquid crystal display devices 200 and 200' according to Embodiment 2, and specifically
Figure 17B:
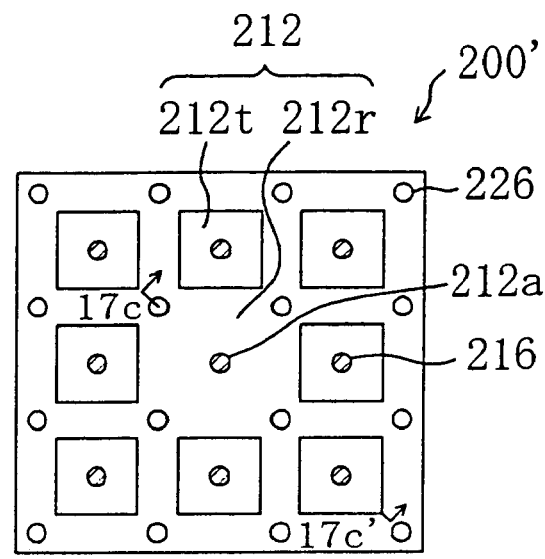
Figure 17C:
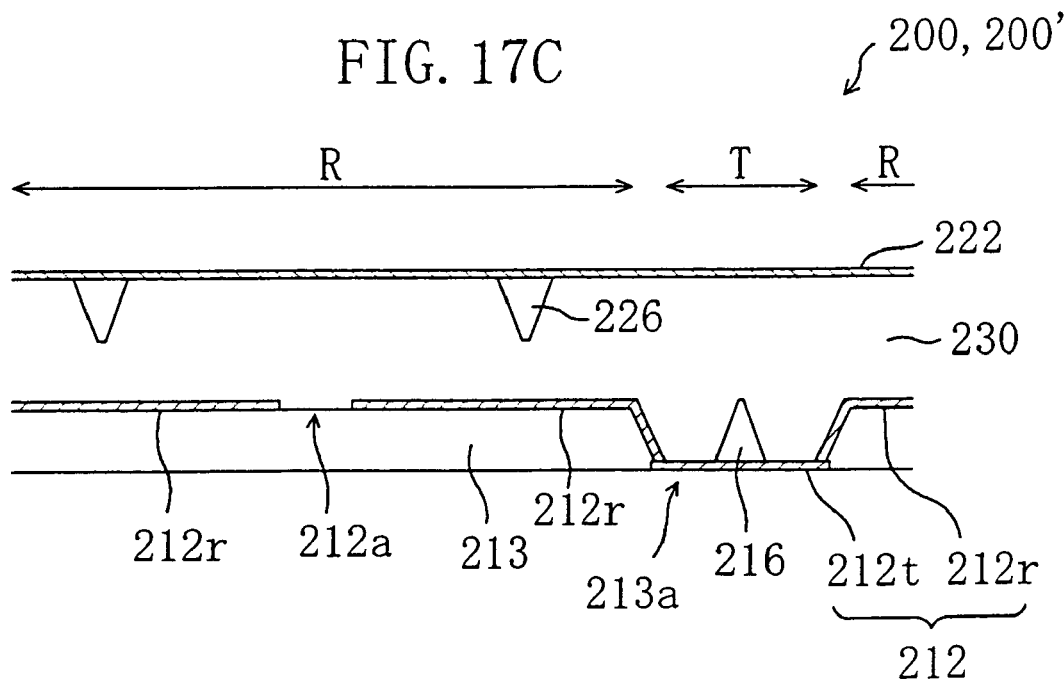

FIG. 17A is a top view of a combination type liquid crystal display device 200, FIG. 17B is a top view of a combination type liquid crystal display device 200' and FIG. 17C is a cross-sectional view taken along line 17C–17C' of FIG. 17A or 17B. In these drawings, a color filter, a black matrix, a TFT and the like are omitted for simplification.

A picture element electrode 212 of the combination type liquid crystal display device 200 or 200' includes a transparent electrode 212t and a reflecting electrode 212r. The transparent electrode 212t defines a transmission region T for producing a display in a transmission mode, and the reflecting electrode 212r defines a reflection region R for producing a display in a reflection mode. The transparent electrode 212t is formed from, for example, an ITO layer, and the reflecting electrode 212r is formed from, for example, an aluminum layer. Instead of the reflecting electrode 212r, a combination of a transparent conducting layer and a reflecting layer may be used.

A liquid crystal layer 230 has a larger thickness in the transmission region T than in the reflection region R. This is for adjusting retardation of transmitted light having passed through the liquid crystal layer 230 in the transmission region T and retardation of reflected light having passed through the liquid crystal layer 230 in the reflection region R. The liquid crystal layer 230 preferably has, in the transmission region T, a thickness approximately twice as large as that in the reflection region R.

This difference in the thickness of the liquid crystal layer 230 is caused, for example, forming the reflecting electrode 212r on an insulating layer 213 and forming the transparent electrode 212t in an opening 213a formed in the insulating layer 213. The transparent electrode 212t is electrically connected to the drain electrode of a TFT (not shown), and the reflecting electrode 212r is connected to the transparent electrode 212t within the opening 213a of the insulating layer 213. The reflecting electrode 212r is formed so as to cover the level difference caused by the opening 213a. Needless to say, the opening 213a may be a recess.

As is understood from comparison between FIGS. 17A and 17B, the combination type liquid crystal display devices 200 and 200' are different from each other in the mutual arrangement of the reflection region R and the transmission region T. The arrangement is not limited to those shown in the drawings but any of a variety of arrangements may be employed. However, a region where an element not transmitting light, such as a line (such as a scanning line and a signal line) and a TFT, is formed cannot be used as the transmission region T. Therefore, when the reflection region R is formed in the region where an element not transmitting light is formed, the area of the picture element region substantially usable for display can be advantageously increased.

The combination type liquid crystal display device 200 or 200' has an opening 212a formed in the reflecting electrode 212r and a first protrusion 216 formed on the transparent electrode 212t on the surface of the TFT substrate facing the liquid crystal layer 230, and also has a second protrusion 226 formed on the surface of the counter electrode 222 facing the liquid crystal layer 230. As described in detail in Embodiment 1, the radially-inclined orientation of liquid crystal molecules of the liquid crystal layer 230 can be stabilized by orientation-regulating force caused by the opening and the protrusions. It goes without saying that the structure is not limited to that shown in the drawing but a protrusion and an opening formed in or on the electrode can be variously combined as described in Embodiment 1.

However, when the protrusion 216 is formed on the transparent electrode 212t, the protrusion 216 can be formed in the step of patterning a transparent resin layer (preferably having photosensitivity) corresponding to the insulating layer 213 formed on the transparent electrode 212t for forming the opening 213a. Therefore, the production process can be advantageously simplified.

Also, the reflecting electrode 212r preferably covers the level difference. When the level difference is thus covered, an electric field for forming an equipotential line parallel to the reflecting electrode 212r can be generated. Therefore, the radially-inclined orientation can be more stable than in the case where the level difference is not covered with the reflecting electrode 212r.

In this manner, according to the invention, the electrode is formed to cover the level difference so as to suppress discontinuity in the orientation of liquid crystal molecules derived from the level difference by using the function of the electric field, and the protrusion 216 having an appropriately inclined side face is provided so as to form the center of the radially-inclined orientation by using the orientation-regulating force caused by its inclined side face. As a result, stable radially-inclined orientation can be realized.

The functions of the opening 212a and the second protrusion 226 formed in the reflection region R are the same as those in the liquid crystal display device 130 of Embodiment 1 shown in FIGS. 4A and 4B, and hence, the description is omitted.

Figure 18A:
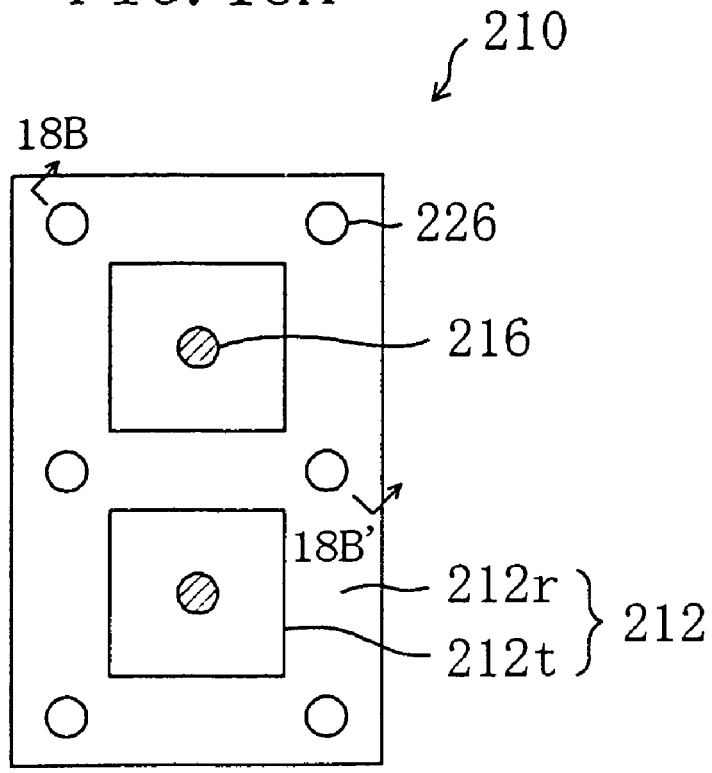
FIG. 18A is a top view for schematically showing the structure of one picture element region of another combination type liquid crystal display device 210 of Embodiment 2 and FIG. 18B is a cross-sectional view thereof taken along line 18B–18B' of FIG. 18A.

Next, the structure of one picture element region of another combination type liquid crystal display device 210 of Embodiment 2 will be described with reference to FIGS. 18A and 18B. FIG. 18A is a top view seen from the substrate normal direction and FIG. 18B is a cross-sectional view taken along line 18B–18B' of FIG. 18A.

The transmission region T is formed at the center of the picture element region and the reflection region R is formed around the transmission region T. Differently from the combination type liquid crystal display devices 200 and 200', no opening 212a is formed in the reflecting electrode 212r. Six second protrusions 226 are formed in the counter electrode 222 in the reflection region R. The six second protrusions 226 are arranged so as to form two square lattices, and first protrusions 216 are respectively disposed at the centers of the square lattices. Since the first protrusions 216 and the second protrusions 226 are thus arranged, eight liquid crystal domains having the radially-inclined orientation about the respective protrusions can be stably formed.

Figure 19A:
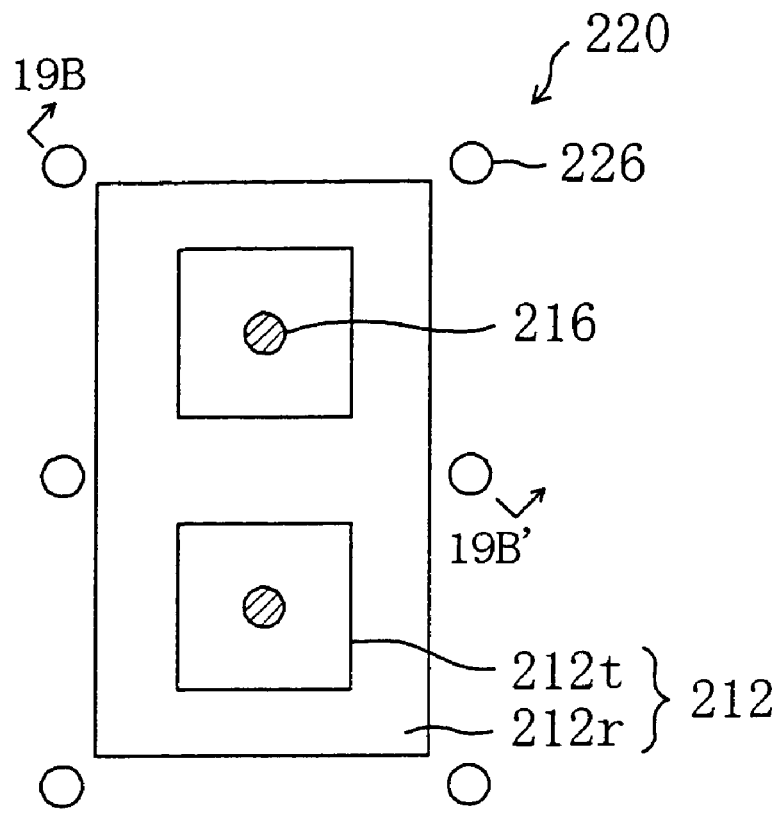
FIG. 19A is a top view for schematically showing the structure of one picture element region of still another combination type liquid crystal display device 220 of Embodiment 2 and FIG. 19B is a cross-sectional view thereof taken along line 19B–19B' of FIG. 19A.
Figure 19B:
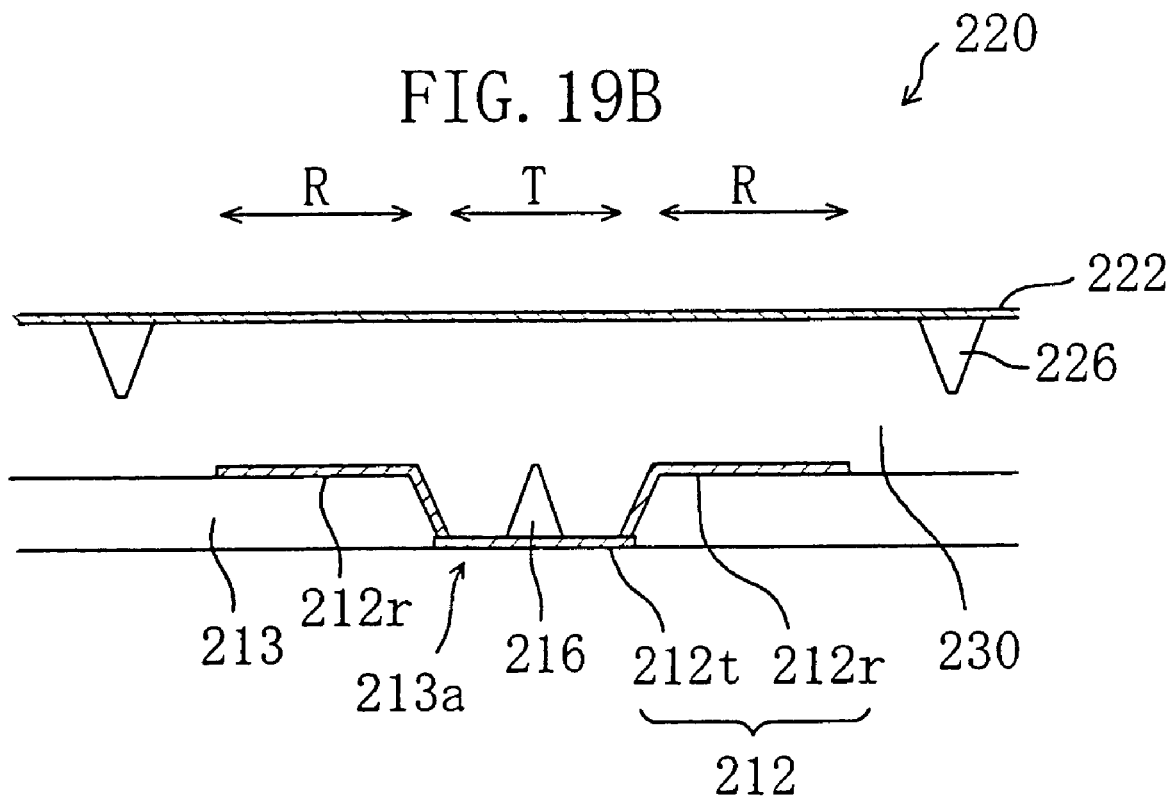

Next, the structure of one picture element region of still another combination type liquid crystal display device 220 of Embodiment 2 will be described with reference to FIGS. 19A and 19B. FIG. 19A is a top view seen from the substrate normal direction and FIG. 19B is a cross-sectional view taken along line 19B–19B' of FIG. 19A.

Figure 18B:
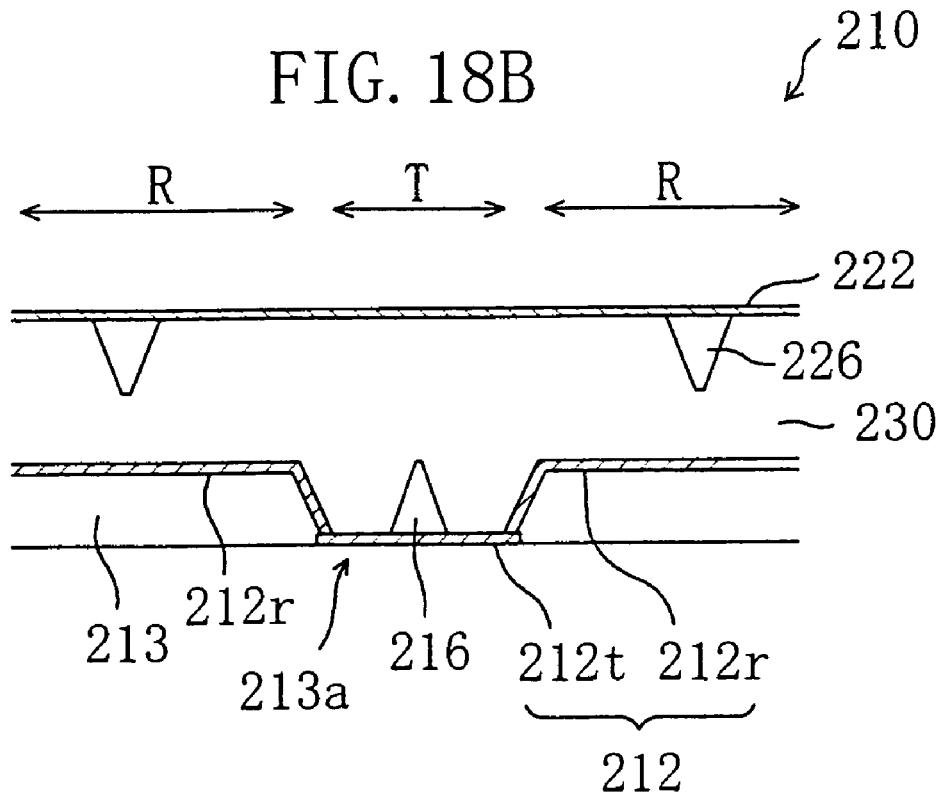

The combination type liquid crystal display device 220 is different from the combination type liquid crystal display device 210 of FIGS. 18A and 18B in second protrusions 226 disposed out of the picture element region.

Merely a part of a liquid crystal domain formed about each second protrusion 226 is positioned within the picture element region so as to make contribution to display and the other part thereof makes no contribution to display. However, since the protrusions 226 are arranged so as to form square lattices, when the parts of the liquid crystal domains positioned within the picture element region are added up, two liquid crystal domains in total are formed in the picture element region. Specifically, approximately ¼ of a liquid crystal domain formed in the vicinity of each corner of the rectangular picture element region is positioned within the picture element region ((¼)×4) and approximately ½ of a liquid crystal domain formed in the vicinity of the center of each longer side of the picture element region is positioned within the picture element region ((½)×2). Accordingly, the viewing angle characteristic of the combination type liquid crystal display device 220, which is equivalent to that of the combination type liquid crystal display device 210, is very good.

When the protrusions 226 are formed out of the picture element region (in a region between adjacent picture element regions) as in the combination type liquid crystal display device 220, even in the case where light leakage derived from liquid crystal molecules positioned in the vicinity of the protrusions 226 is caused, degradation of the display quality can be suppressed.

Figure 20A:
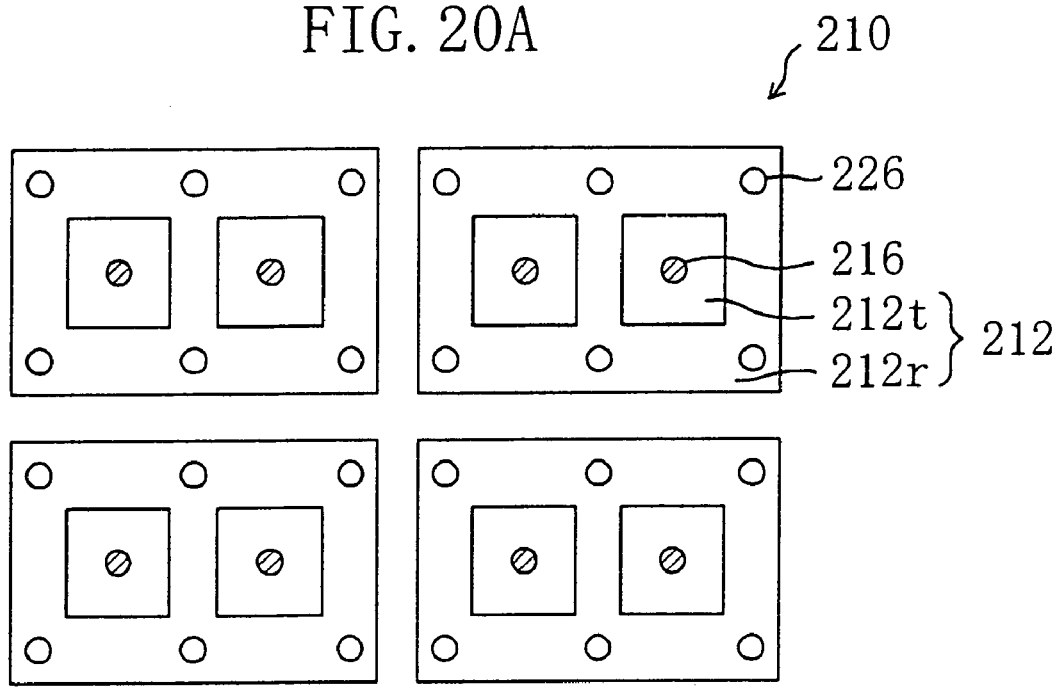
FIGS. 20A and 20B are top views of the combination type liquid crystal display devices 210 and 220, respectively.
Figure 20B:
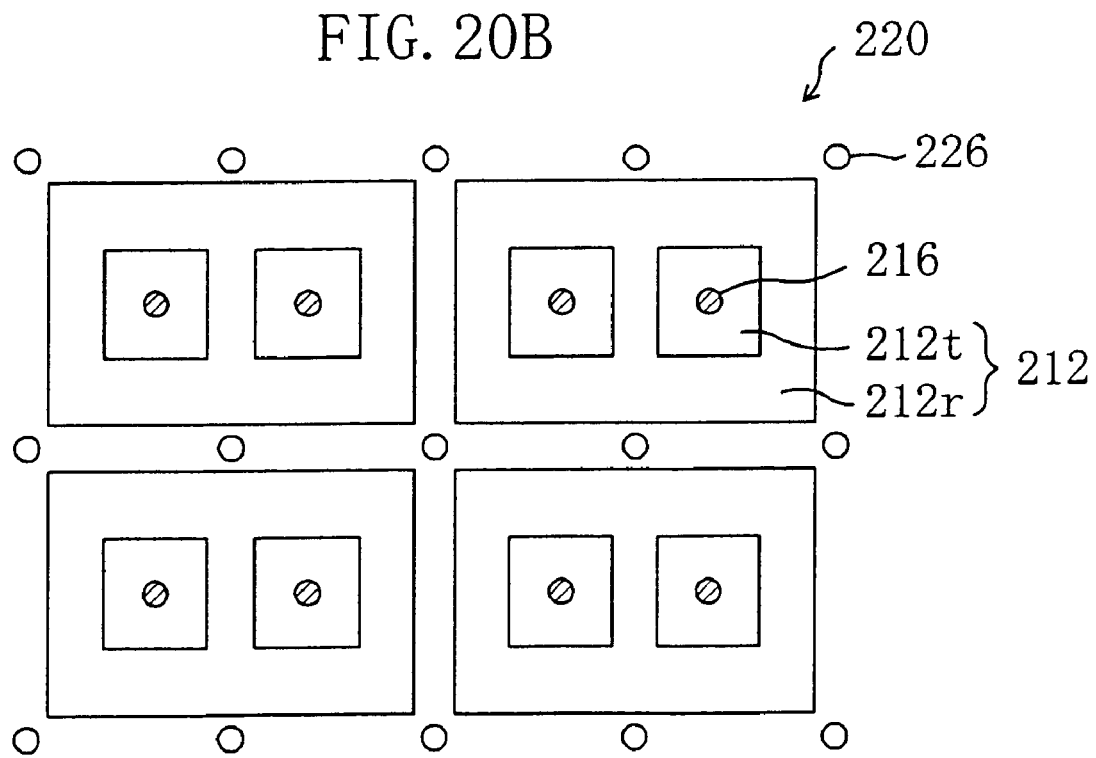

Also, as is obvious from comparison between the combination type liquid crystal display device 210 of FIG. 20A and the combination type liquid crystal display device 220 of FIG. 20B, since the protrusions 226 are not positioned within the picture element region, the effective area used for display is large in the combination type liquid crystal display device 220, so as to realize brighter display.

Needless to say, the arrangement of the protrusions 226 is not limited to that described above but may be variously modified in accordance with the shape and the size of the picture element region. For example, the protrusions 226 can be arranged as in any of combination type liquid crystal display devices 240, 250, 260 and 270 respectively shown in FIGS. 21A, 21B, 21C and 21D.

Figure 21A:
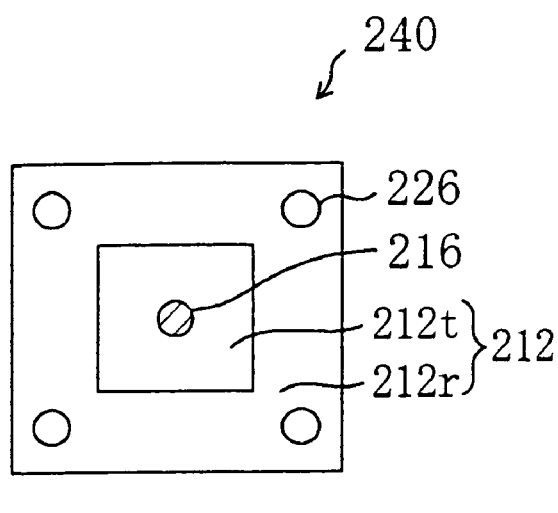
FIGS. 21A, 21B, 21C and 21D are top views for schematically showing the structure of one picture element region of other combination type liquid crystal display devices 240, 250, 260 and 270 of Embodiment 2, respectively.
Figure 21B:
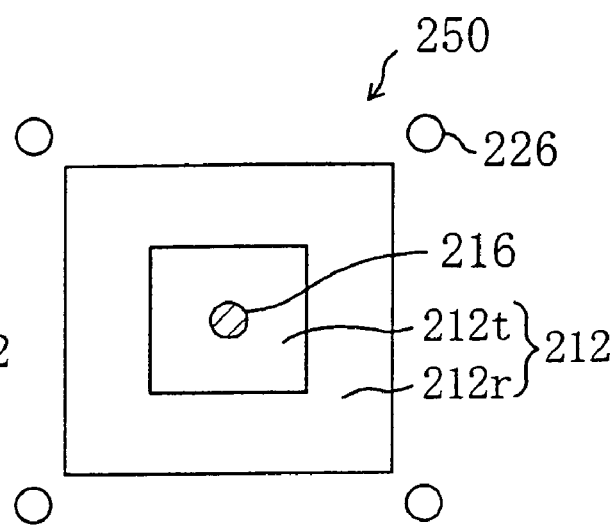

In the case where the picture element region is in the shape of a square as shown in FIGS. 21A and 21B, a square transmission region (a region where the transparent electrode 212t is exposed) is formed at the center of the picture element region with a reflection region (namely, the reflecting electrode 212r) formed around the transmission region, and the second protrusions 226 formed on the counter substrate may be arranged so as to form a square lattice within the picture element region (as shown in FIG. 21A) or out of the picture element region (as shown in FIG. 21B). Needless to say, the arrangement may be appropriately modified in accordance with the size of the transmission region (the proportion to the size of the reflection region).

Figure 21C:
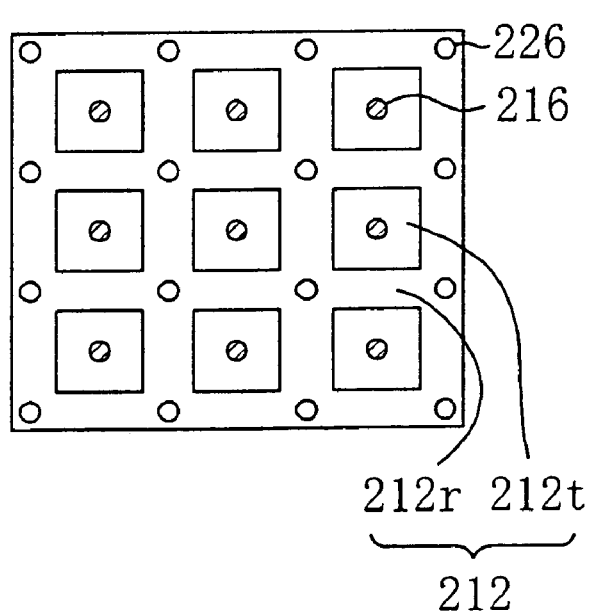
Figure 21D:
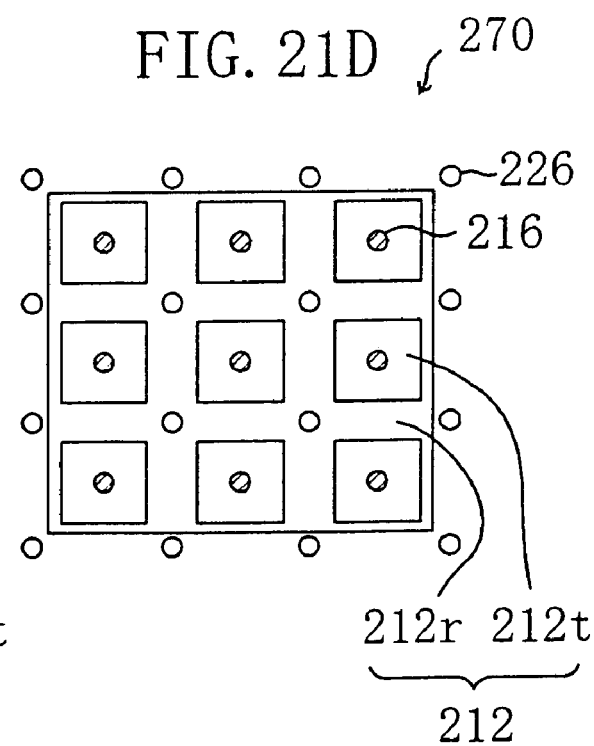

In particular, when the picture element region is large, it is preferred that a plurality of transmission regions (regions where the transparent electrode 212 is exposed) are formed with a reflection region (the reflecting electrode 212r) formed around the transmission regions as in the combination type liquid crystal display devices 260 and 270 respectively shown in FIGS. 21C and 21D. In other words, when the picture element region is large, it is necessary to increase the number of liquid crystal domains in order to stably form the radially-inclined orientation. In this case, all the second protrusions 226 may be formed within the picture element region as shown in FIG. 21C, or protrusions 226 disposed in the outermost portion may be formed out of the picture element region as shown in FIG. 21D, whereas the protrusions 226 formed out of the picture element region are preferably arranged also so as to form square lattices together with the protrusions 226 formed within the picture element region in consideration of the stability of the orientation. Instead of the second protrusion, an opening may be formed in the counter electrode 222.

In the case where the picture element region is small, even when the second protrusions 226 shown in FIG. 21A or 21B are omitted, the radially-inclined orientation can be stably formed by utilizing an inclined electric field generated at the edge portion of the picture element electrode 212.

Figure 22A:
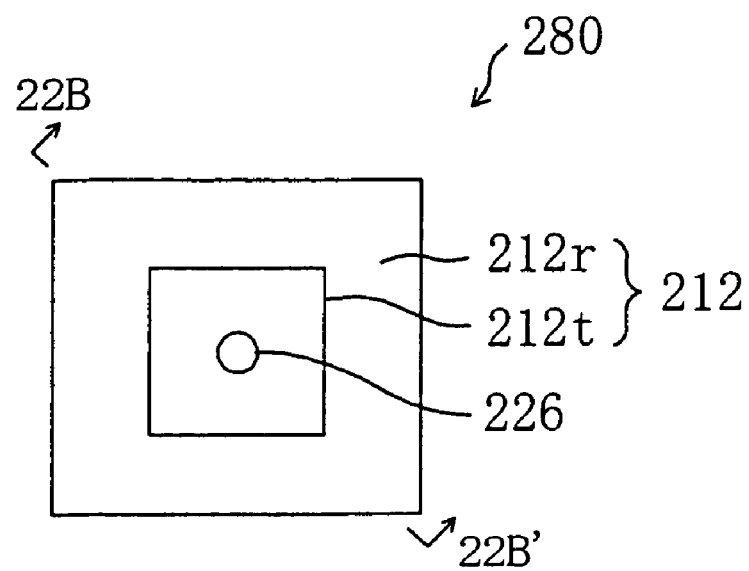
FIG. 22A is a top view for schematically showing the structure of one picture element region of still another combination type liquid crystal display device 280 of Embodiment 2 and FIG. 22B is a cross-sectional view thereof taken along line 22B–22B' of FIG. 22A.
Figure 22B:
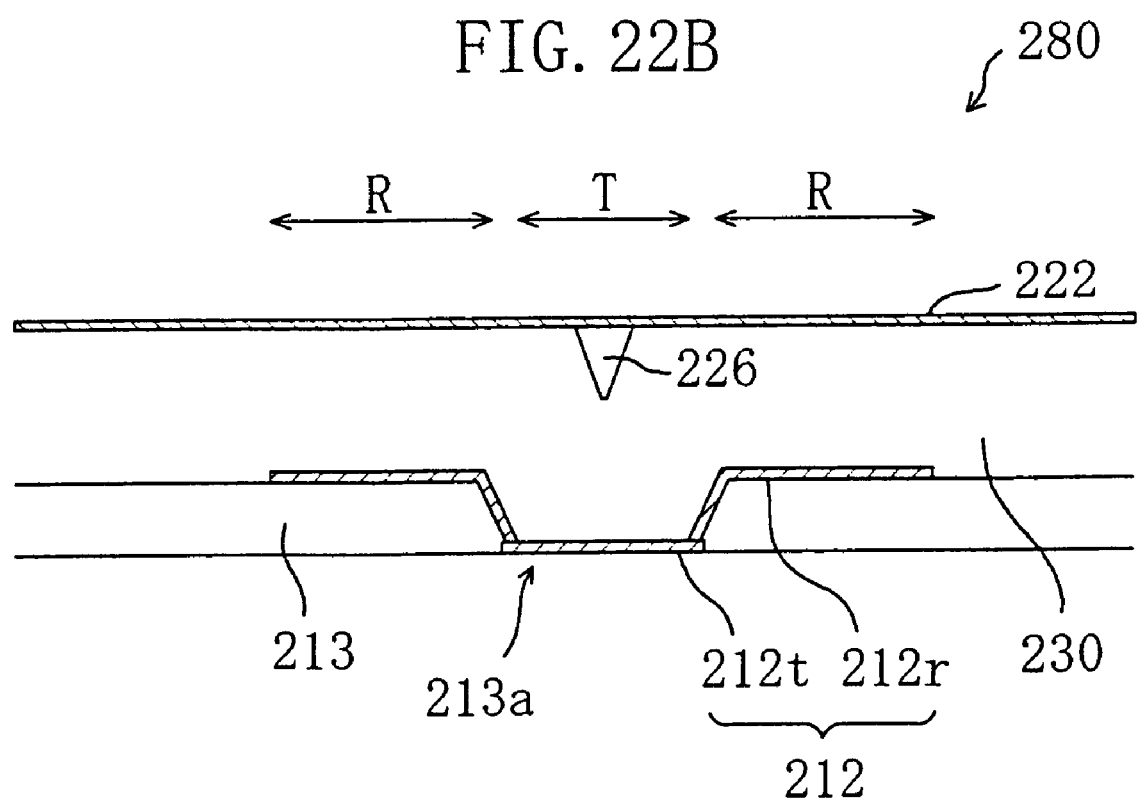

Alternatively, as in a liquid crystal display device 280 shown in FIGS. 22A and 22B, the first protrusion 216 formed on the TFT substrate may be omitted so that the radially-inclined orientation can be realized by the second protrusion 226 formed on the counter substrate in the transmission region T.

Next, specific structures of combination type liquid crystal display devices 300 and 310 will be described with reference to FIGS. 23, 24 and 25.

The combination type liquid crystal display device 300 or 310 includes a TFT 342, a signal line 343 integrally formed with the source electrode of the TFT 342 and a scanning line 344 integrally formed with the gate electrode of the TFT 342. A transparent electrode 312t is connected to the drain electrode of the TFT 342, and a reflecting electrode 312r is connected to the transparent electrode 312t in an opening 312a formed in an insulating layer 313 (shown in FIG. 25). The reflecting electrode 312r is formed so as to cover the TFT 342 and overlap the signal line 343 and the scanning line 344 in its periphery. The combination type liquid crystal display device 300 or 310 further includes an storage capacitance line 345, which is connected to the reflecting electrode 312r within a contact hole 347 formed in the insulating layer.

Figure 23:
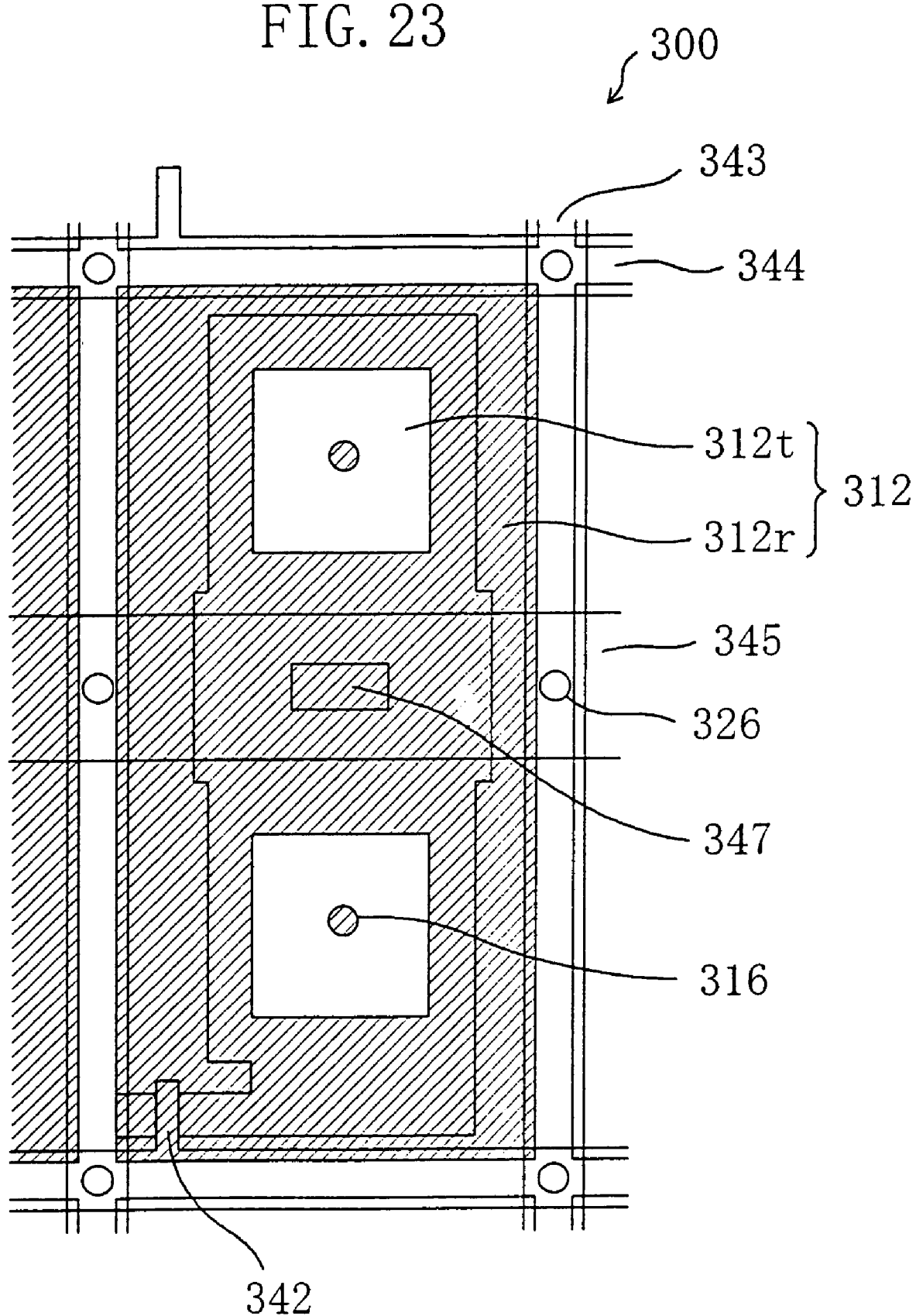
FIG. 23 is a top view for schematically showing the structure of one picture element region of still another combination type liquid crystal display device 300 of Embodiment 2.

The combination type liquid crystal display device 300 of FIG. 23 has two transmission regions T (see FIG. 25), and a first protrusion 316 is formed at the center of each transmission region T. Second protrusions 326 formed on the counter substrate are disposed out of the picture element region in portions corresponding to the signal line 343 and the scanning line 344.

Figure 24:
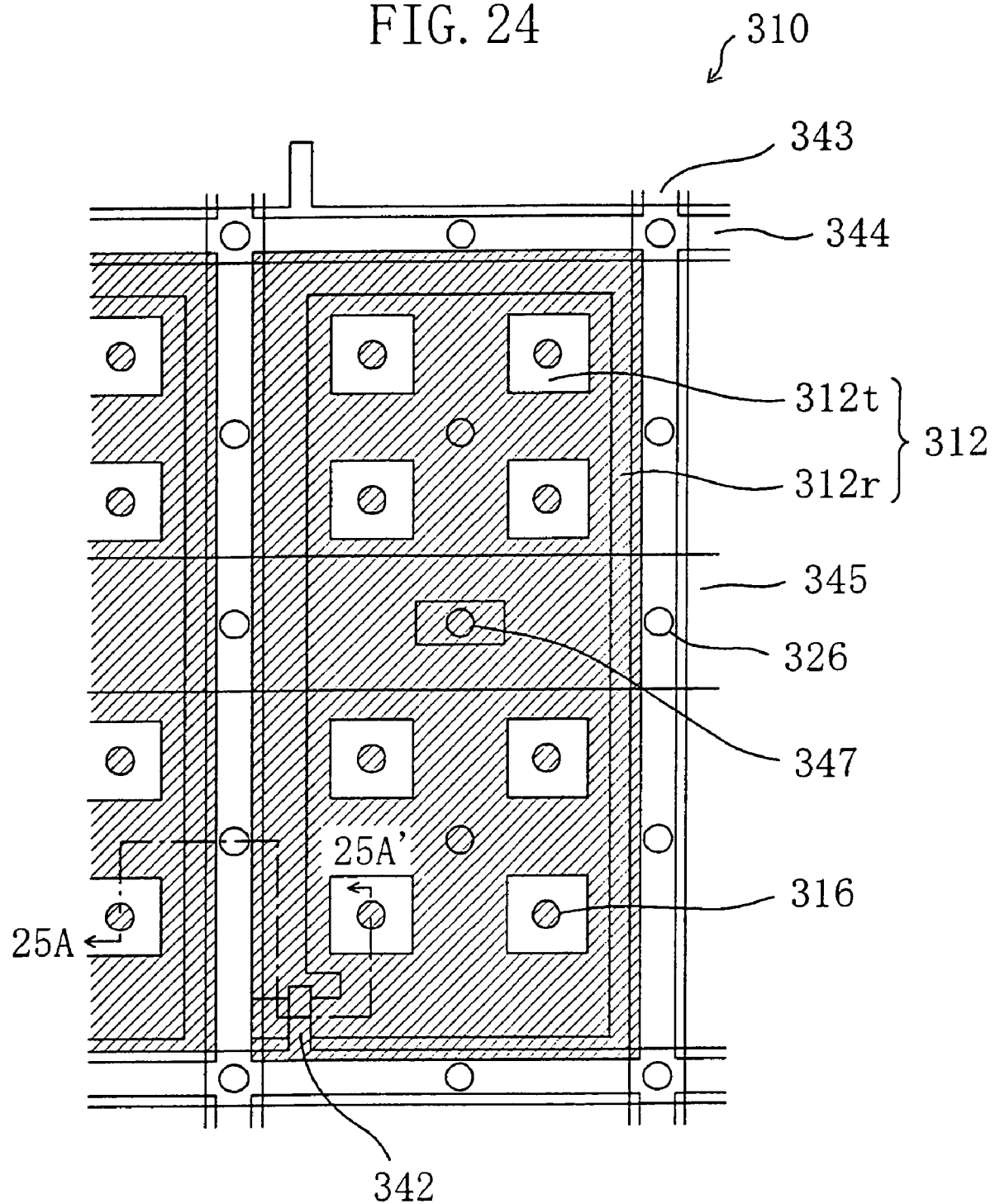
FIG. 24 is a top view for schematically showing the structure of one picture element region of still another combination type liquid crystal display device 310 of Embodiment 2.
Figure 25:
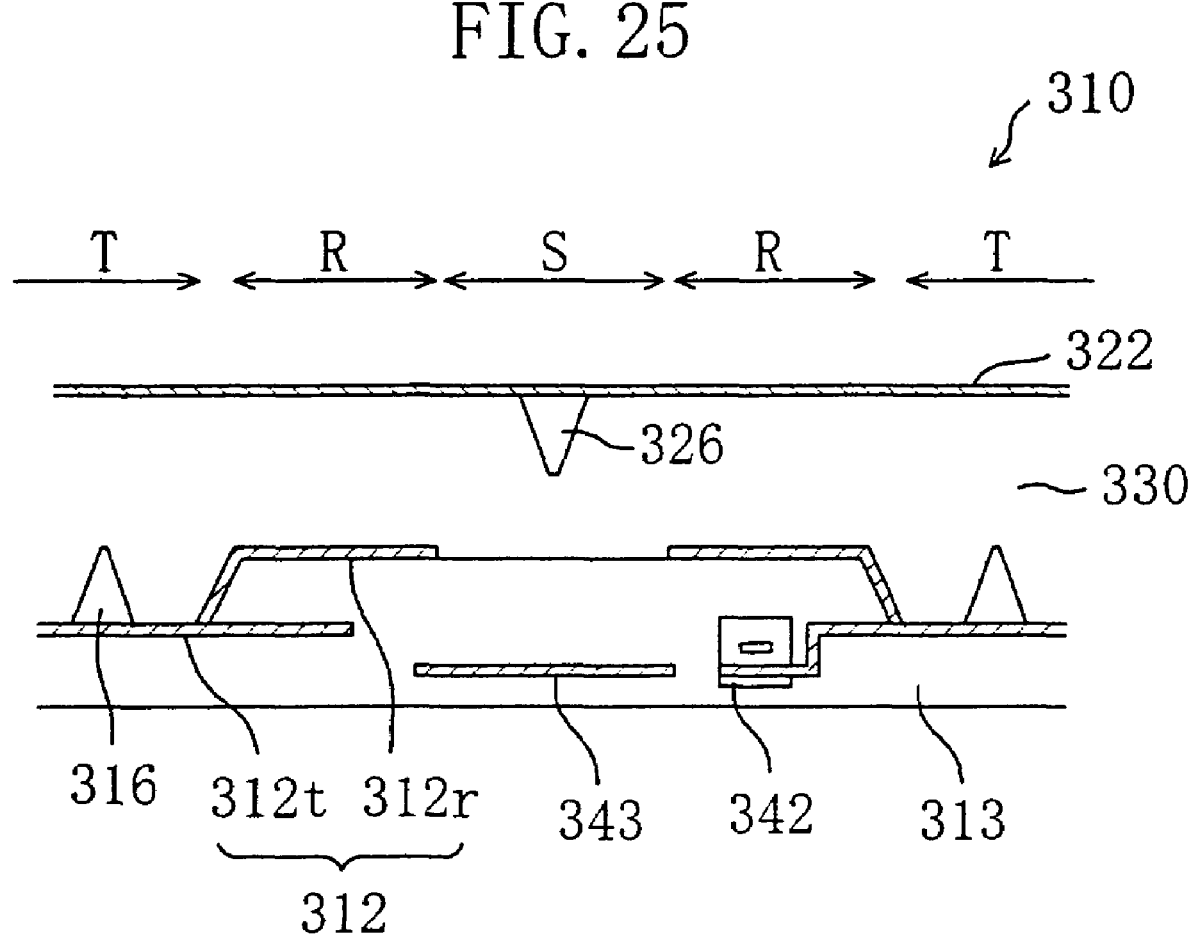
FIG. 25 is a cross-sectional view for schematically showing the structure of one picture element region of the combination type liquid crystal display device 310 taken along line 25A–25A' of FIG. 24.

The combination type liquid crystal display device 310 shown in FIGS. 24 and 25 is different from the combination type liquid crystal display device 300 in including a large number of transmission regions T. Furthermore, a second protrusion 326 is formed also in a portion corresponding to the contact hole 347. When the second protrusion 326 is also formed in such a portion, the regularity in the arrangement of liquid crystal domains can be improved, resulting in increasing the stability of the radially-inclined orientation. In this manner, even when it is difficult to arrange liquid crystal domains so as to be highly rotationally symmetrical as in the square lattice arrangement, the second protrusions 326 (or the first protrusions 316 or the openings) are disposed so as to make the mutual arrangement of the liquid crystal domains as regular as possible. Furthermore, since the storage capacitance line 345 is made from a material that does not transmit light, even when light leakage is caused in the vicinity of the second protrusion 326 disposed correspondingly to the storage capacitance line 345, the display quality is never degraded. Moreover, as shown in FIG. 25, even when light leakage is caused in the vicinity of the second protrusion 326 disposed correspondingly to the signal line 343, the display quality is never degraded because light is shaded by the signal line 343.

Figure 26:
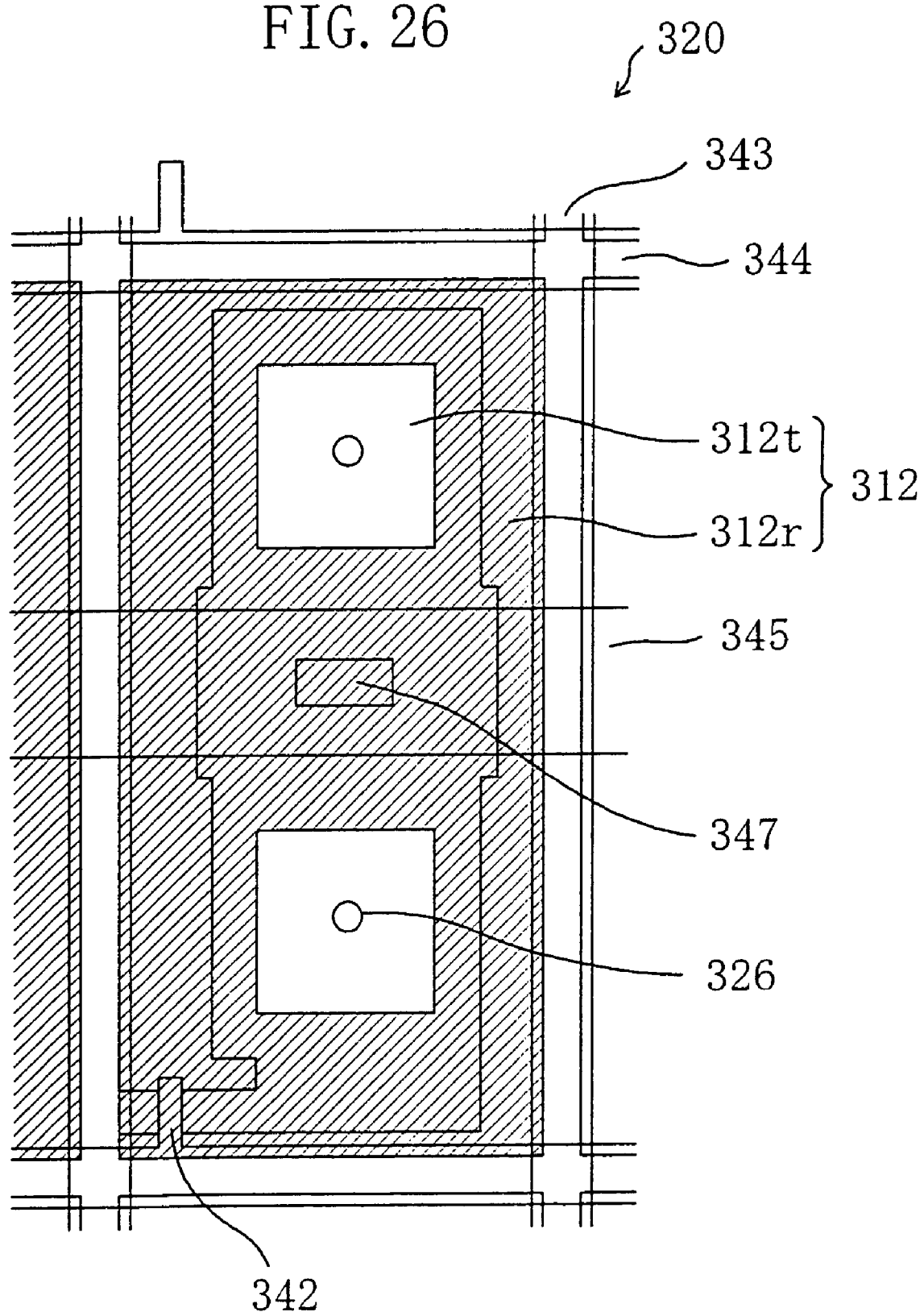
FIG. 26 is a top view for schematically showing the structure of one picture element region of still another combination type liquid crystal display device 320 of Embodiment 2.

Alternatively, as in a liquid crystal display device 320 shown in FIG. 26, the first protrusion 316 formed on the TFT substrate may be omitted so that the radially-inclined orientation can be realized by the second protrusion 326 formed on the counter substrate in the transmission region T.

In a liquid crystal display device of the multi-gap system in which one picture element region includes a plurality of portions where a liquid crystal layer has different thicknesses, a level difference (a boundary) present between the plurality of portions is preferably covered with an electrode as described above. In the case where protrusions are formed to have, as the boundary, the level difference covered with the electrode, the protrusions may be alternately provided on the two substrates or may be provided merely on one substrate.

Combination type liquid crystal display devices 300A and 300B in which the protrusions are provided on the two substrates are schematically shown in FIGS. 27A, 27B, 28A and 28B.

Figure 27A:
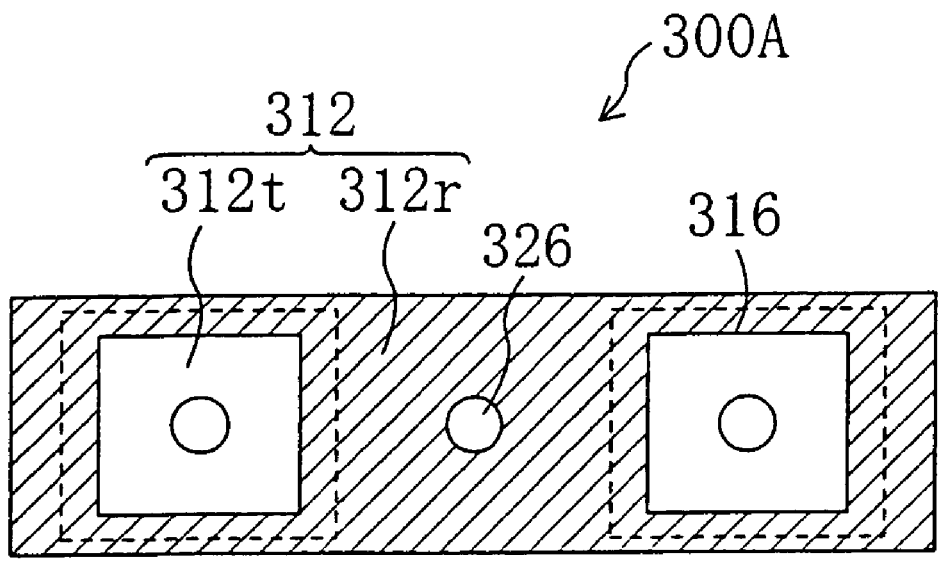
FIG. 27A is a top view for schematically showing the structure of one picture element region of still another combination type liquid crystal display device 300A of Embodiment 2 and FIG. 27B is a cross-sectional view thereof.
Figure 27B:
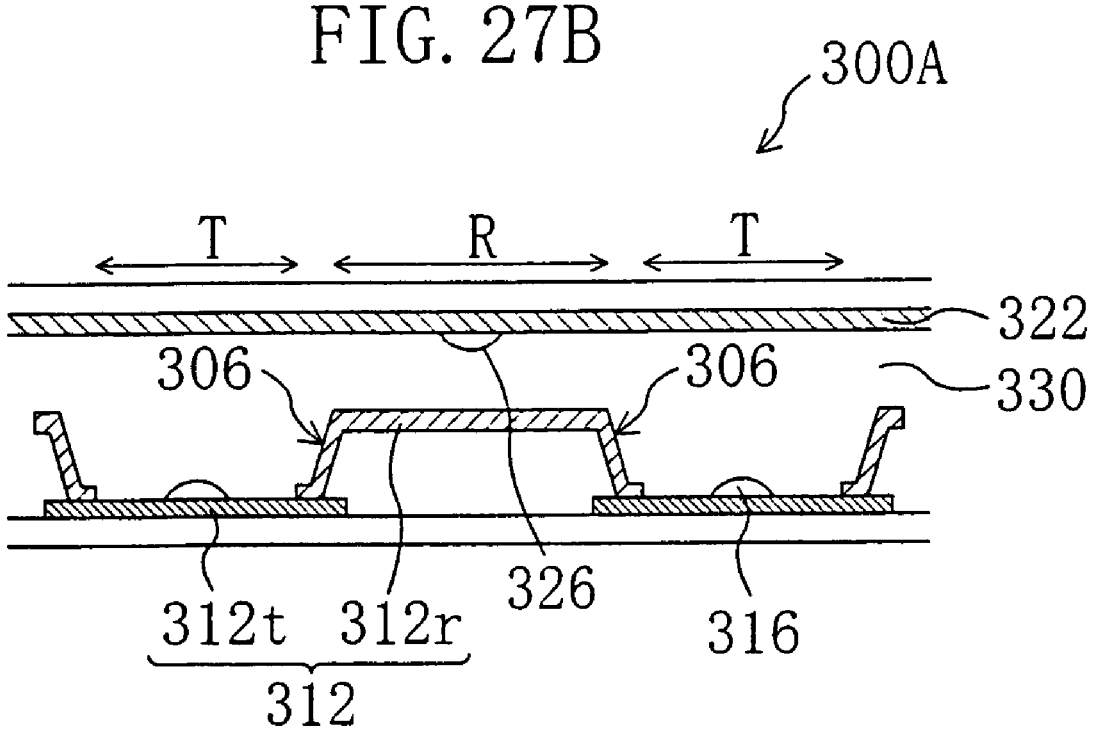

The combination type liquid crystal display device 300A has a first protrusion 316 formed on the TFT substrate and a second protrusion 326 formed on the counter substrate as shown in FIGS. 27A and 27B. The first protrusion 316 is disposed in the transmission region T and the second protrusion 326 is disposed in the reflection region R. In other words, the protrusions adjacent to each other via a level difference 306 covered with the reflecting electrode 312r sandwiched therebetween are respectively formed on the different substrates.

The orientation-regulating force caused by the first protrusion 316 disposed in the transmission region T and the orientation-regulating force caused by the second protrusion 326 disposed in the reflection region R match with each other. Also, the level difference 306 between the transmission region T and the reflection region R is covered with the reflecting electrode 312r, and hence, discontinuity in the orientation of liquid crystal molecules derived from the level difference can be suppressed by an electric field parallel to the surface of the level difference 306 generated by the electrode covering the level difference 306. Therefore, the radially-inclined orientation of a liquid crystal domain formed in the transmission region T of the liquid crystal layer 330 and the radially-inclined orientation of a liquid crystal domain formed in the reflection region R of the liquid crystal layer 330 are smoothly continuous, resulting in realizing stable radially-inclined orientation.

Figure 28A:
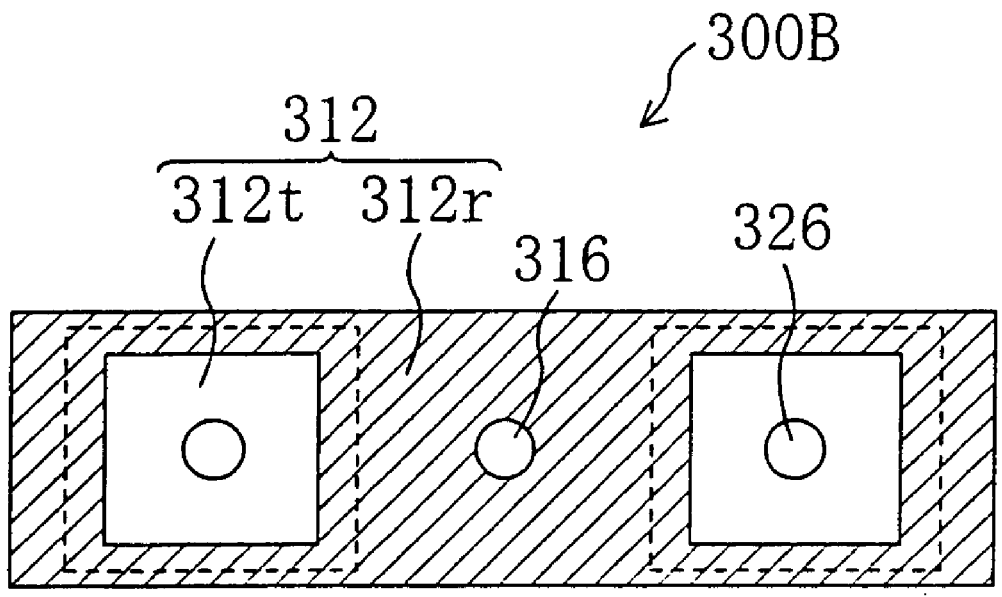
FIG. 28A is a top view for schematically showing the structure of one picture element region of still another combination type liquid crystal display device 300B of Embodiment 2 and FIG. 28B is a cross-sectional view thereof.
Figure 28B:
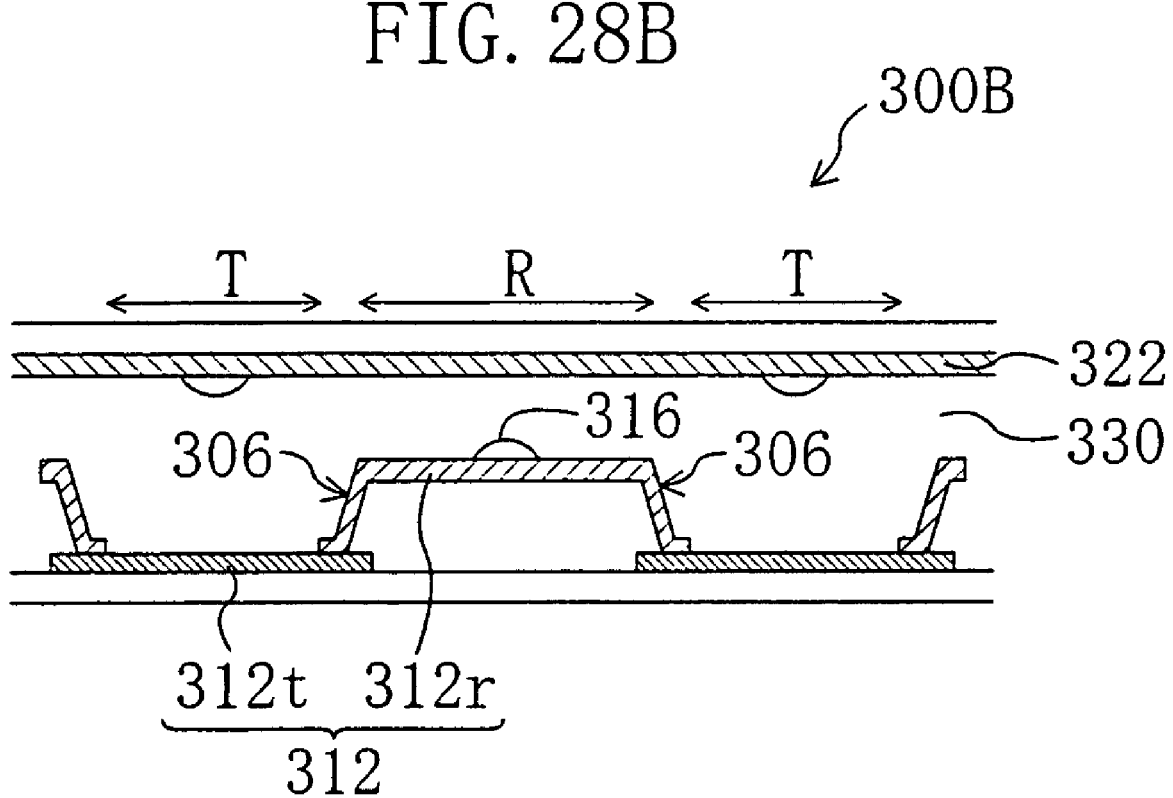

The combination type liquid crystal display device 300B shown in FIGS. 28A and 28B is different from the combination type liquid crystal display device 300A in the first protrusion 316 formed on the TFT substrate being provided in the reflection region R and the second protrusion 326 formed on the counter substrate being provided in the transmission region T, but the stable radially-inclined orientation can be similarly realized.

Combination type liquid crystal display devices 300C and 300D in which the protrusions are provided on merely one substrate are schematically shown in FIGS. 29A, 29B, 30A and 30B.

Figure 29A:
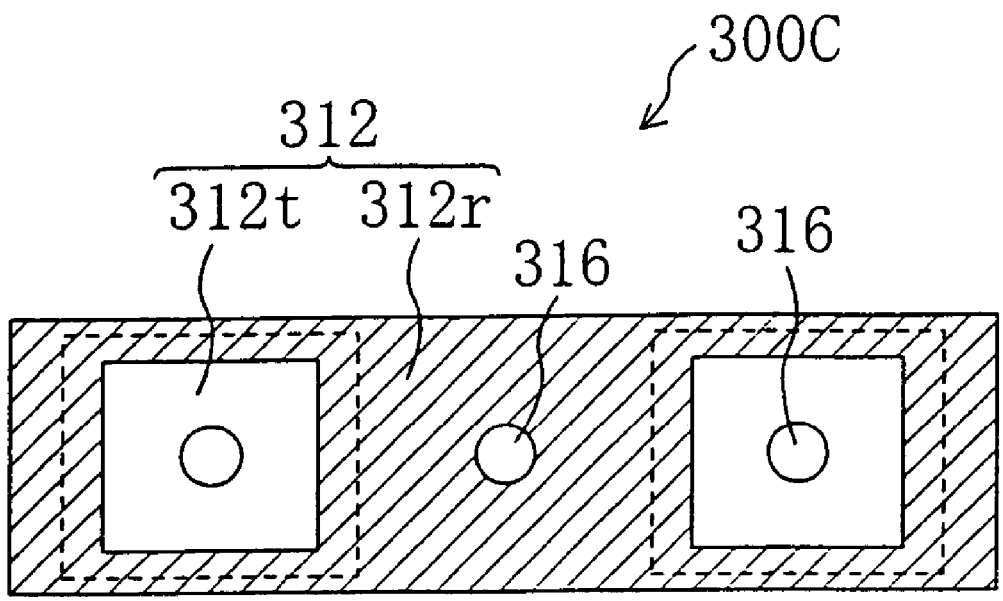
FIG. 29A is a top view for schematically showing the structure of one picture element region of still another combination type liquid crystal display device 300C of Embodiment 2 and FIG. 29B is a cross-sectional view thereof.
Figure 29B:
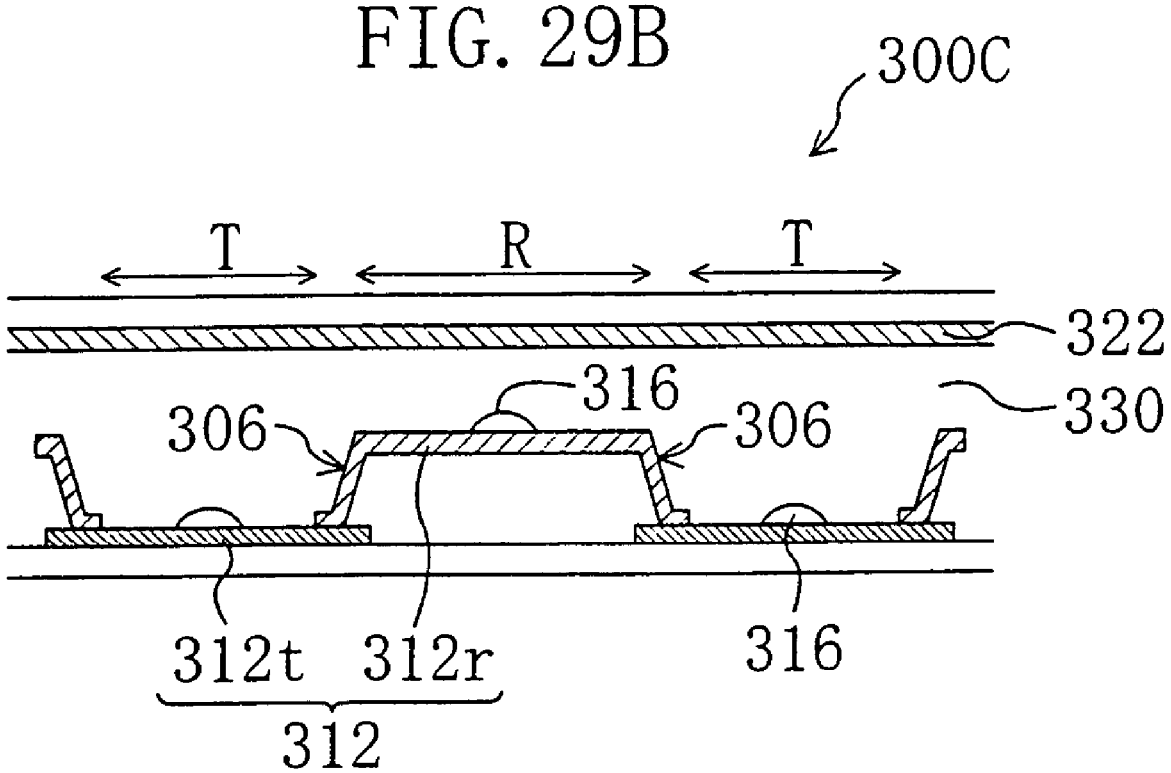
Figure 30A:
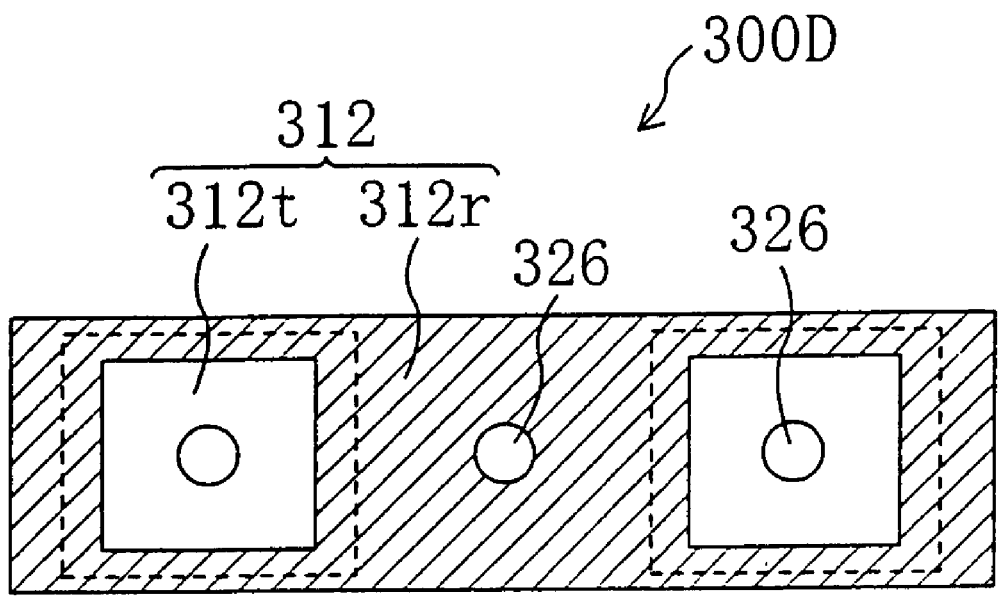
FIG. 30A is a top view for schematically showing the structure of one picture element region of still another combination type liquid crystal display device 300D of Embodiment 2 and FIG. 30B is a cross-sectional view thereof.
Figure 30B:
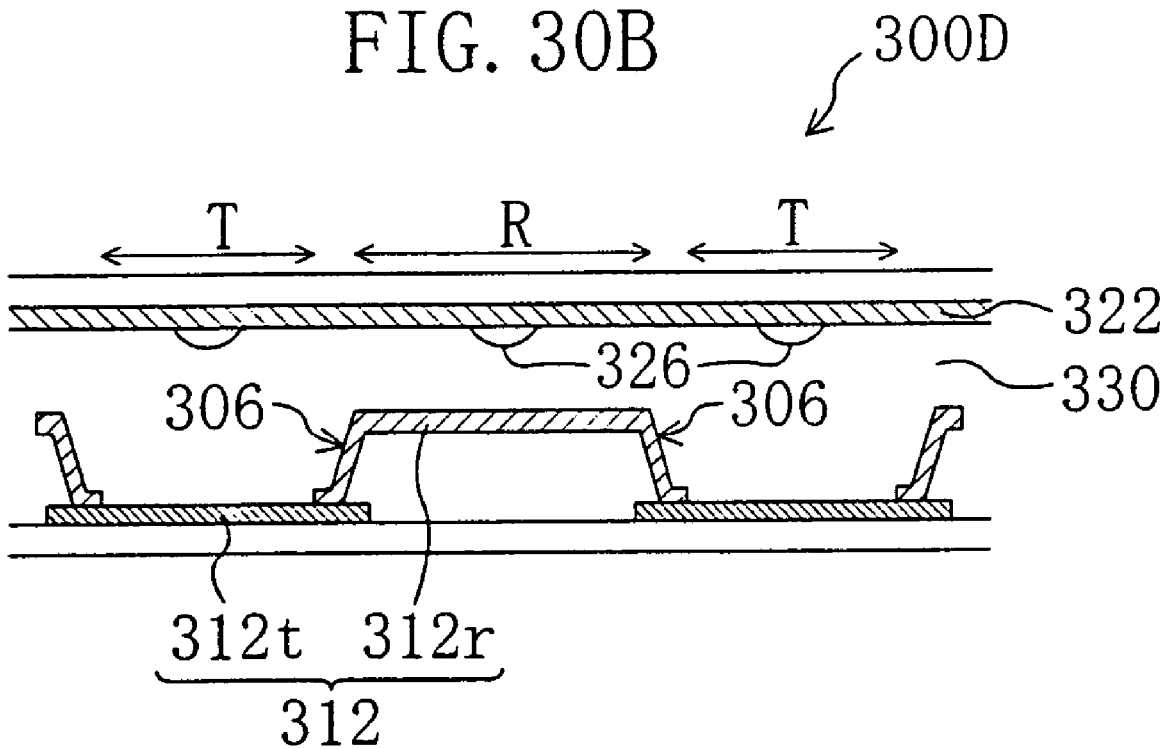

The combination type liquid crystal display device 300C shown in FIGS. 29A and 29B has first protrusions 316 formed on the TFT substrate in both the transmission region T and the reflection region R, and the combination type liquid crystal display device 300D shown in FIGS. 30A and 30B has second protrusions 326 formed on the counter substrate in both the transmission region T and the reflection region R. In other words, protrusions adjacent to each other via the level difference 306 covered with the reflecting electrode 312r are formed on the same substrate in the combination type liquid crystal display devices 300C and 300D.

If the orientation state of liquid crystal molecules positioned above the level difference 306 is not considered, it seems that the radially-inclined orientation of a liquid crystal domain formed in the transmission region T and the radially-inclined orientation of a liquid crystal domain formed in the reflection region R do not match with each other. However, in the combination type liquid crystal display device 300C or 300D, the level difference 306 is covered with an electrode (the reflecting electrode 312r in this case) and hence works as a point where the situation changes. Therefore, the liquid crystal domain formed in the transmission region T and the liquid crystal domain formed in the reflection region R both attain stable radially-inclined orientation.

Figure 31:
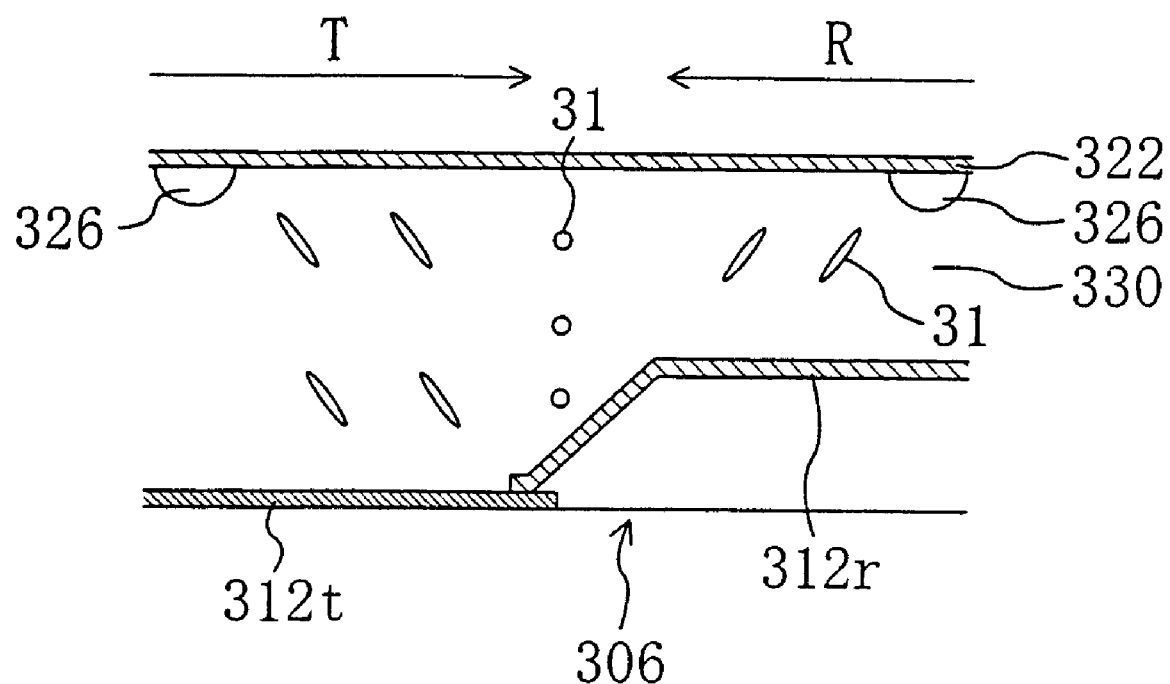
FIG. 31 is a schematic diagram for showing an orientation state of the liquid crystal molecules 31 under application of a voltage through the liquid crystal layer 330 of the combination type liquid crystal display device 300D.

This is for the following reason: Subtle unbalance is caused by a special shape of the level difference and an electric field (equipotential face) parallel to the surface of the level difference 306 is generated by the electrode covering the level difference 306. Therefore, as shown in FIG. 31, a liquid crystal molecule 31 positioned above the level difference 306 is definitely inclined to be parallel to the substrate surface in a direction perpendicular to a line extending between the first protrusions 316 (namely, in a direction vertical to the drawing surface in FIG. 31). The liquid crystal domain formed in the transmission region T and the liquid crystal domain formed in the reflection region R are oriented so as to three-dimensionally match with each other via the thus inclined liquid crystal molecule 31 positioned above the level difference 306 sandwiched therebetween as the boundary.

As described above, in a liquid crystal display device of the multi-gap system in which one picture element region includes a plurality of portions where a liquid crystal layer has different thicknesses, stable radially-inclined orientation can be obtained by covering a level difference (a boundary) present between the plural portions with an electrode. In consideration of effective suppression of discontinuity in the orientation derived from the level difference, it is preferred that a protrusion is surrounded with the level differences (when seen from the substrate normal direction).

Although a combination type liquid crystal display device including a transmission region T and a reflection region R is herein exemplified, it goes without saying that the invention can realize stable radially-inclined orientation also in a transmission type liquid crystal display device and a reflection type liquid crystal display device of the multi-gap system by covering a level difference with an electrode. The electrode used for covering the level difference is not limited to the reflecting electrode. The level difference may be covered with a transparent electrode or a transparent electrode and a reflecting electrode may be stacked on the level difference.

Furthermore, since the vertical alignment film is not subjected to the rubbing treatment in this embodiment, no rubbing streaks are caused in a displayed image and good display with a high contrast ratio can be produced. In contrast, in the case where the orientation is regulated by subjecting the vertical alignment film to the rubbing treatment, a pre-tilt angle of approximately 90 degrees (for example, of 88 through 89 degrees) is caused in liquid crystal molecules positioned in the vicinity of the substrate surface, and hence, the black level may be varied due to subtle variation in the pre-tilt angle. Therefore, the contrast ratio is locally varied so that rubbing streaks may be caused. This is because the variation in the black level more largely affects the contrast ratio than the variation in the white level.

Still other combination type liquid crystal display devices 300E and 300F are schematically shown in FIGS. 32A, 32B, 33A and 33B. When protrusions formed in the reflection region R are omitted as in the combination type liquid crystal display devices 300E and 300F shown in the FIGS. 32A, 32B, 33A and 33B, the area of a portion of the reflection region R usable for display can be increased, so as to improve the reflectance of the reflection region R.

Figure 32A:
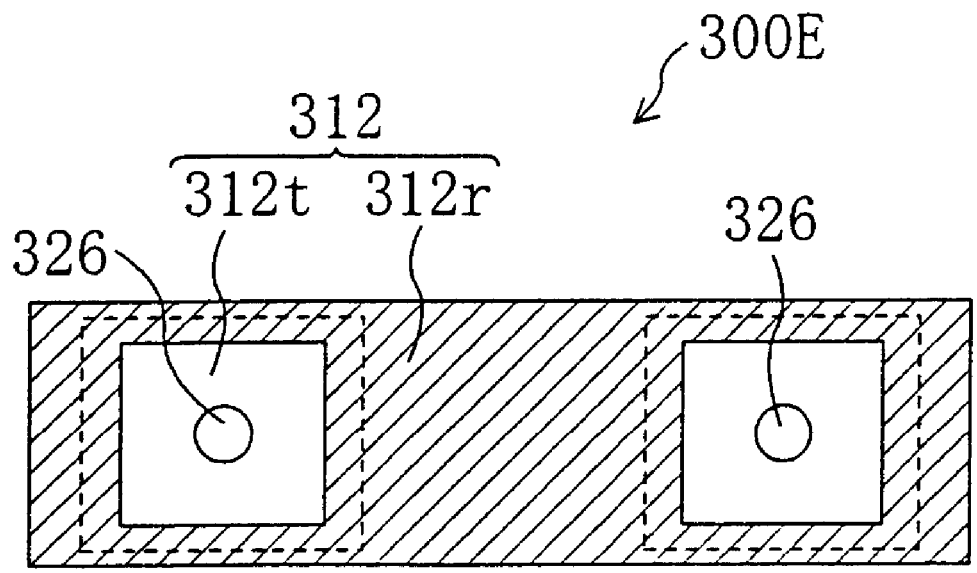
FIG. 32A is a top view for schematically showing the structure of one picture element region of still another combination type liquid crystal display device 300E of Embodiment 2 and FIG. 32B is a cross-sectional view thereof.
Figure 32B:
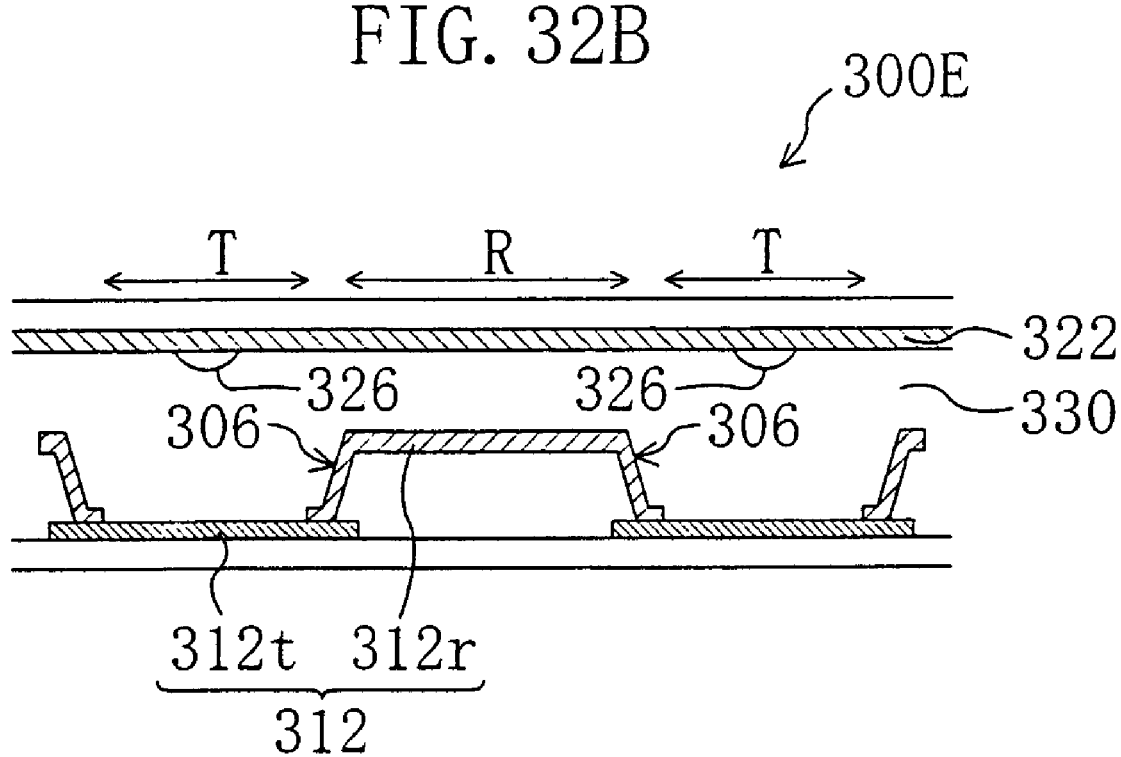
Figure 33A:
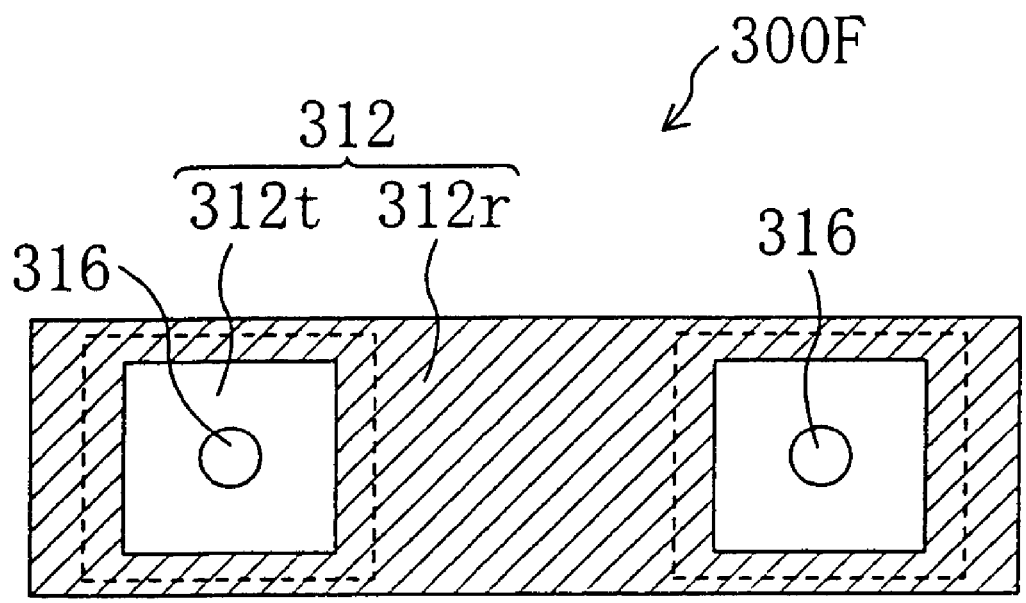
FIG. 33A is a top view for schematically showing the structure of one picture element region of still another combination type liquid crystal display device 300F of Embodiment 2 and FIG. 33B is a cross-sectional view thereof.
Figure 33B:
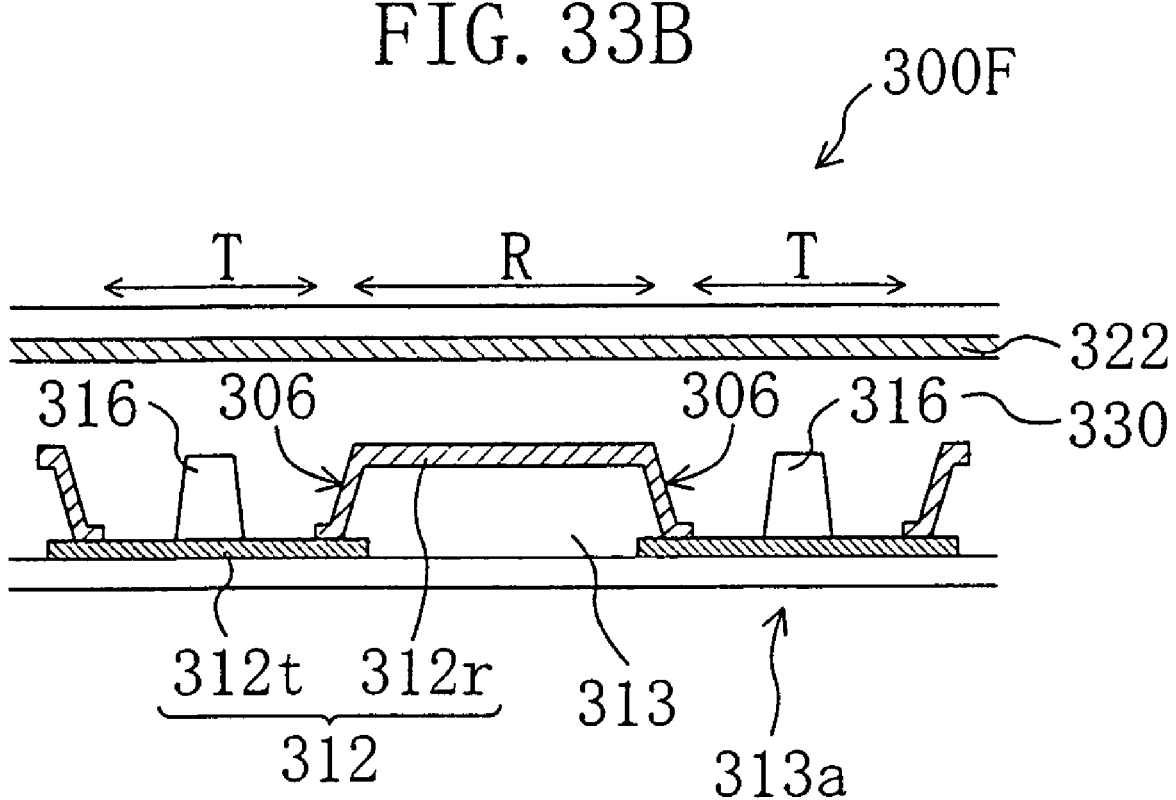

While the combination type liquid crystal display device 300E of FIGS. 32A and 33B includes the second protrusions 326 formed on the counter substrate in the transmission region T, the combination type liquid crystal display device 300F of FIGS. 33A and 33B includes the first protrusions 316 formed on the TFT substrate in the transmission region T.

In the combination type liquid crystal display device 300F of FIGS. 33A and 33B, the protrusion (namely, the first protrusion 316) is provided in a low level portion of the substrate having the level difference (namely, a portion corresponding to the transmission region T of the TFT substrate having the level difference 306). Therefore, the protrusion can be formed in the step of patterning of a transparent resin layer (preferably having photosensitivity) corresponding to the insulating layer 313 for forming the opening 313a, and hence, the production process can be advantageously simplified.

Furthermore, the protrusion used for forming the radially-inclined orientation of the liquid crystal molecules may work also as a spacer for keeping the gap between the substrates (i.e., the thickness of the liquid crystal layer). For example, as in combination type liquid crystal display devices 300G, 300H and 300I shown in FIGS. 34A, 34B, 35A, 35B, 36A and 36B, a second protrusion 326' also functioning as the spacer for defining the thickness of the liquid crystal layer 300 may be formed as the protrusion disposed in the reflection region R. As shown in FIGS. 34A through 36B, the second protrusion 326' is provided between the TFT substrate and the counter substrate (more specifically, between the reflecting electrode 312r and the counter electrode 322) so as to keep the gap therebetween, and works as the spacer for defining the thickness of the liquid crystal layer 330.

When such a structure is employed, there is no need to separately provide a spacer for defining the thickness of the liquid crystal layer 330, and therefore, the production process can be advantageously simplified to reduce the production cost. Also, in the case where a spacer is provided additionally to the protrusion, a portion where the spacer is provided substantially makes no contribution to display. However, when the second protrusion 326' also works as the spacer as in the combination type liquid crystal display devices 300G, 300H and 300I, the area of a portion usable for display can be increased so as to improve the aperture ratio.

Figure 34A:
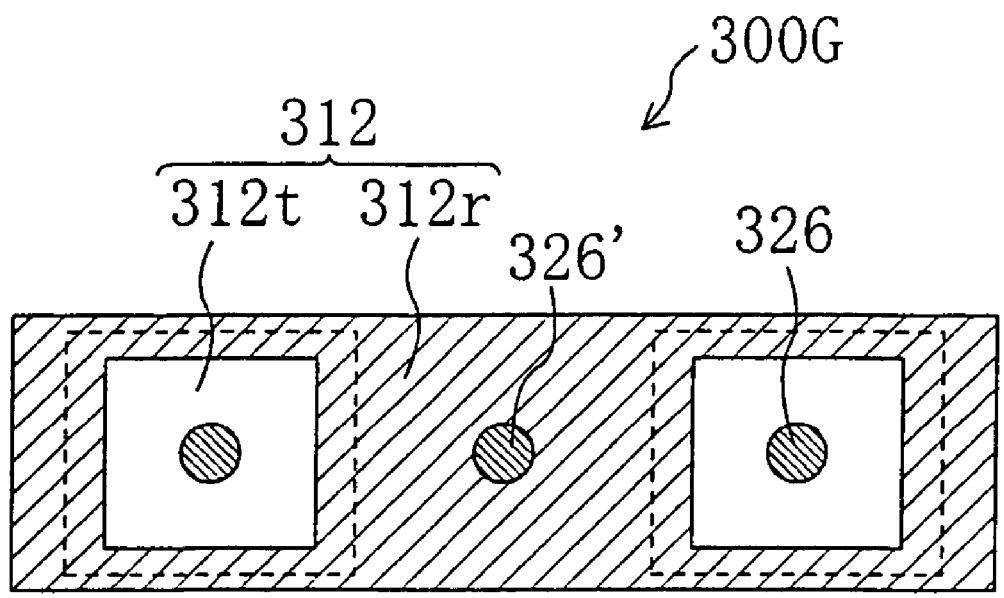
FIG. 34A is a top view for schematically showing the structure of one picture element region of still another combination type liquid crystal display device 300G of Embodiment 2 and FIG. 34B is a cross-sectional view thereof.
Figure 34B:
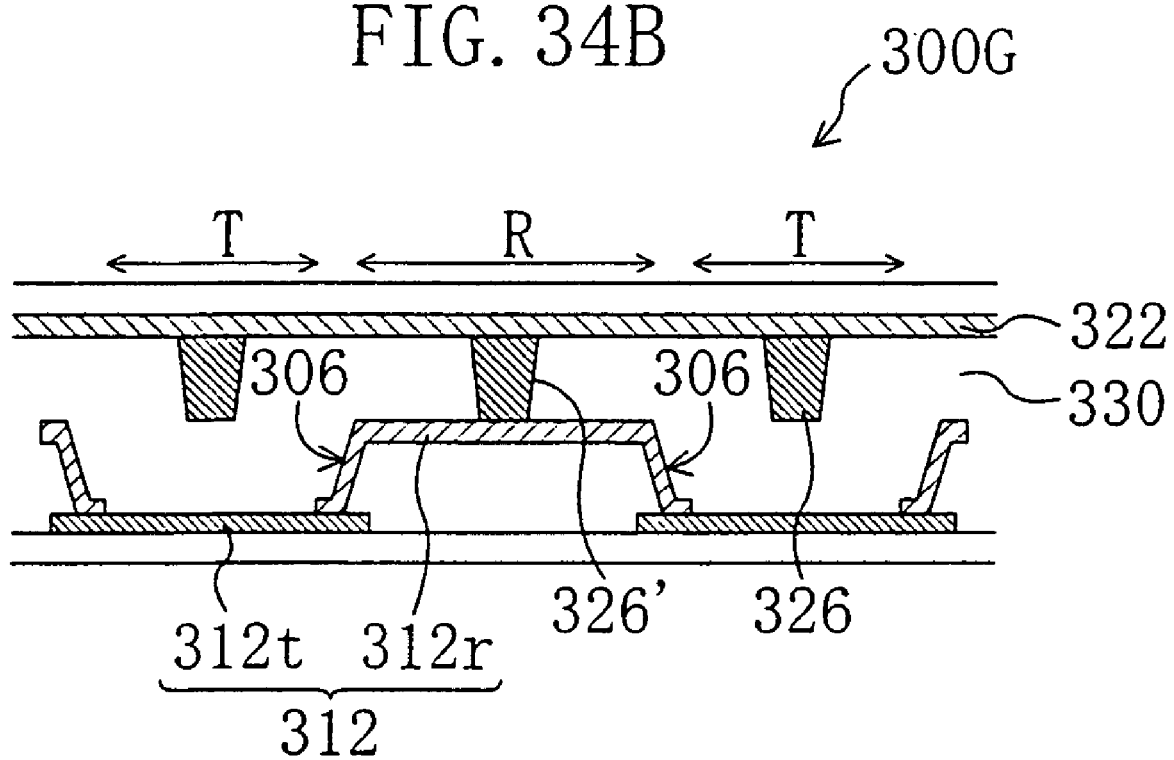
Figure 35A:
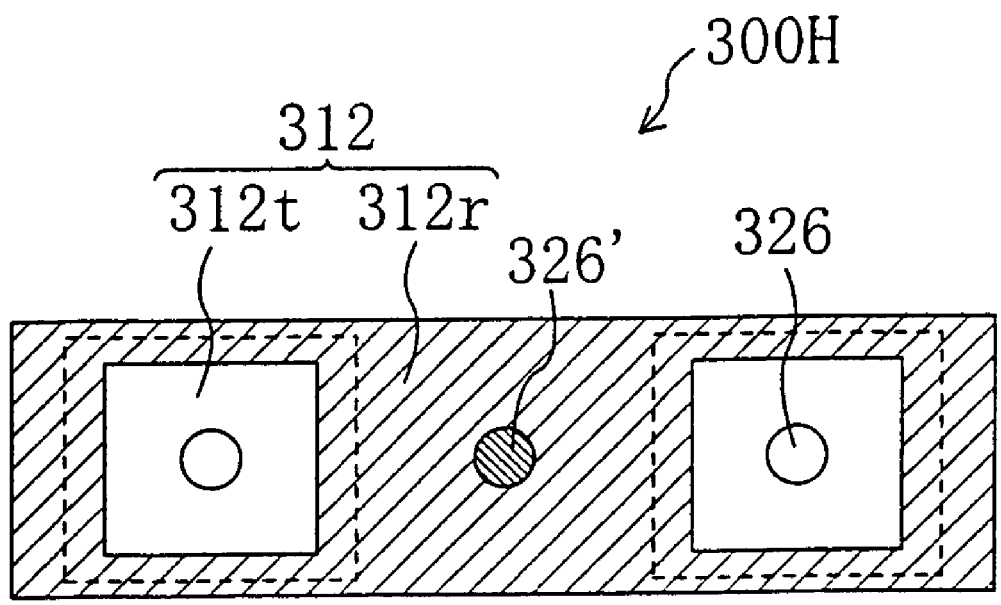
FIG. 35A is a top view for schematically showing the structure of one picture element region of still another combination type liquid crystal display device 300H of Embodiment 2 and FIG. 35B is a cross-sectional view thereof.
Figure 35B:
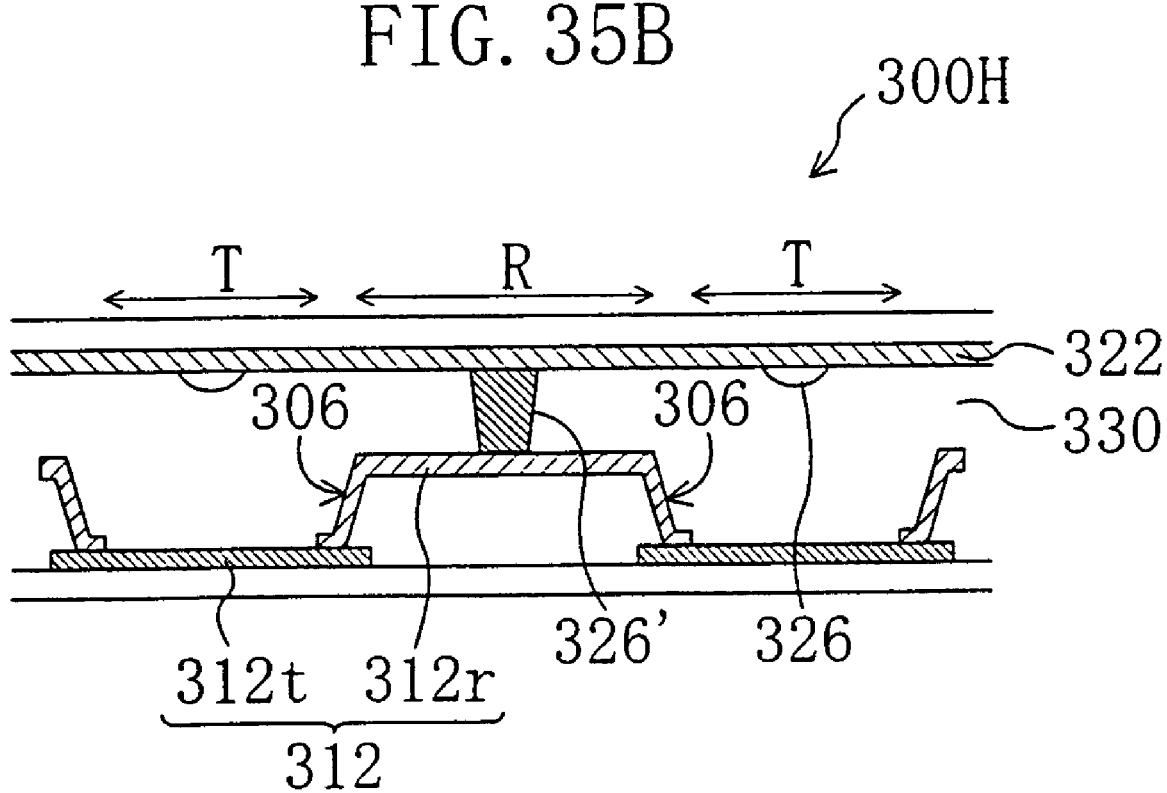
Figure 36A:
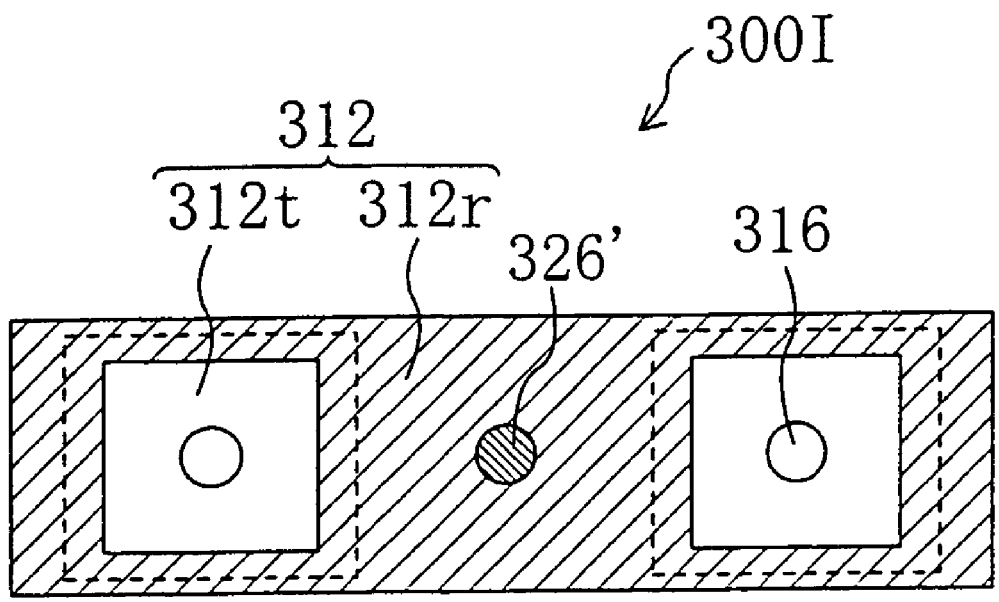
FIG. 36A is a top view for schematically showing the structure of one picture element region of still another combination type liquid crystal display device 300I of Embodiment 2 and FIG. 36B is a cross-sectional view thereof.
Figure 36B:
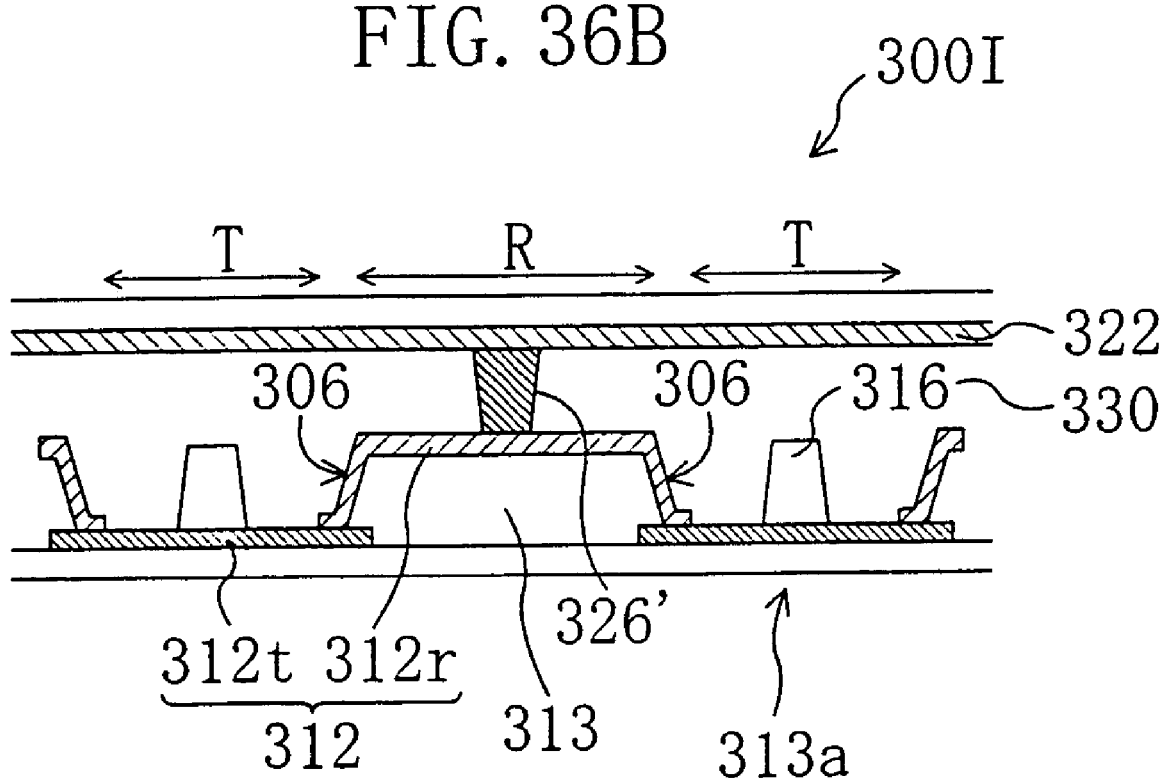

When the second protrusion 326 disposed in the transmission region T is formed from the same material and in the same step as the second protrusion 326' disposed in the reflection region R and also functioning as the spacer as shown in FIGS. 34A and 34B, the production cost can be further reduced. Also, when the second protrusion 326 disposed in the transmission region T is formed to be lower than the second protrusion 326' disposed in the reflection region R and also functioning as the spacer as shown in FIGS. 35A and 35B, the area of the inclined side face of the protrusion can be reduced so as to lower the existing probability of liquid crystal molecules that might cause light leakage. Therefore, the contrast ratio can be improved. When the first protrusion 316 formed on the TFT substrate is disposed in the transmission region T as shown in FIGS. 36A and 36B, the first protrusion 316 can be formed in the step of forming the opening 313a in the insulating film 313 as described above, and hence, the production cost can be further reduced.

Figure 37A:
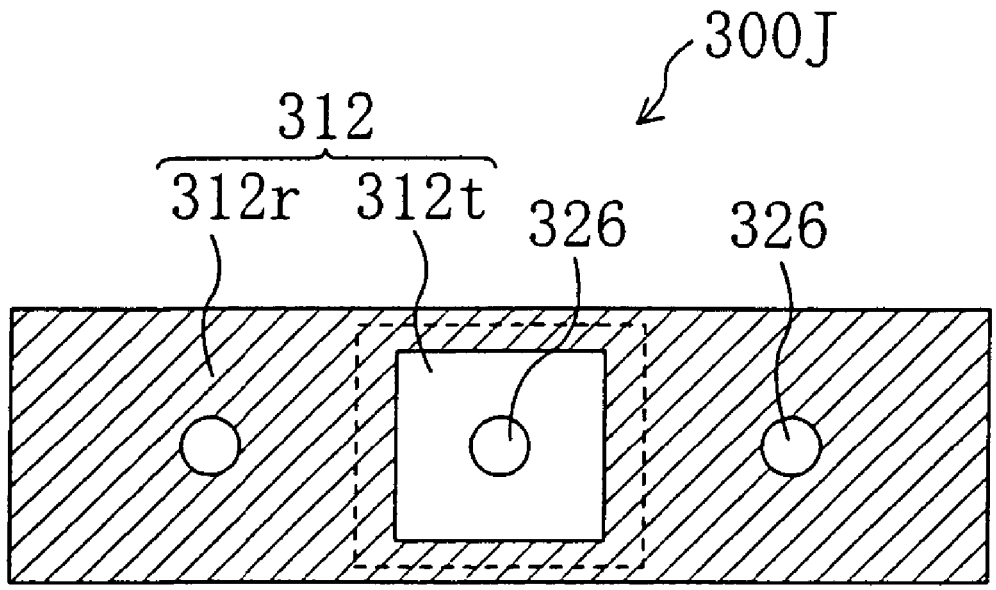
FIG. 37A is a top view for schematically showing the structure of one picture element region of still another combination type liquid crystal display device 300J of Embodiment 2 and FIG. 37B is a cross-sectional view thereof.
Figure 37B:
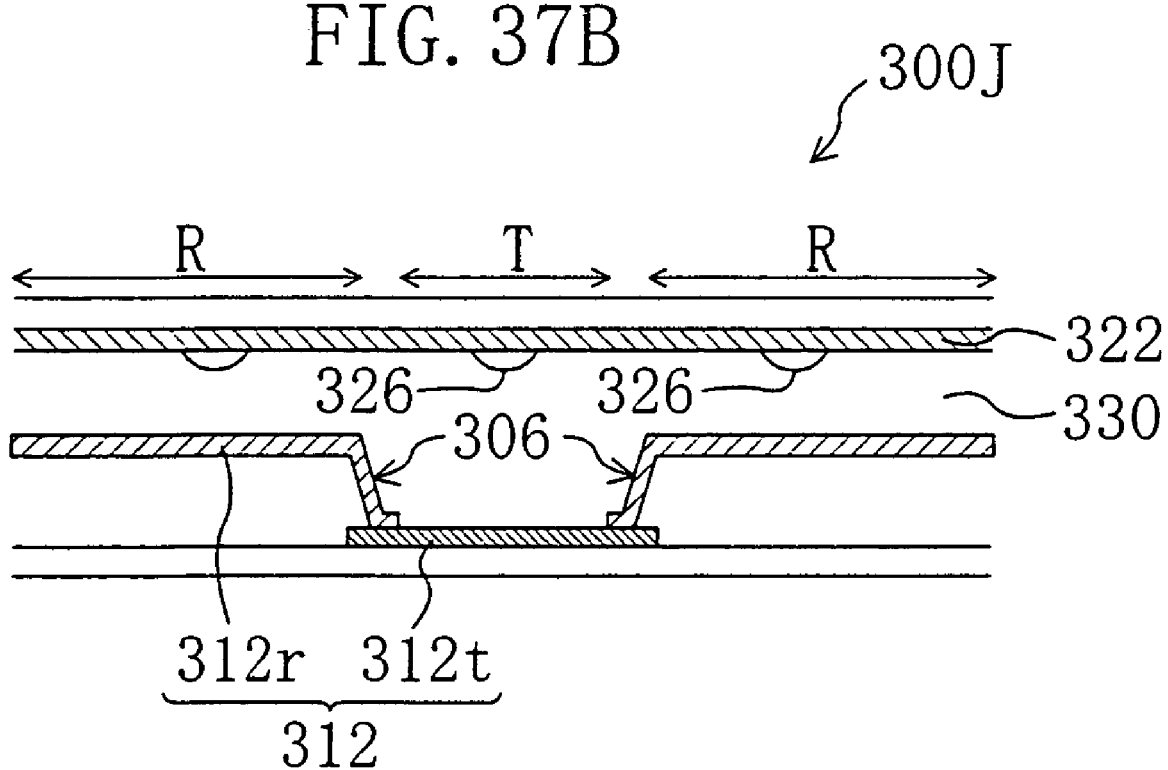
Figure 38A:
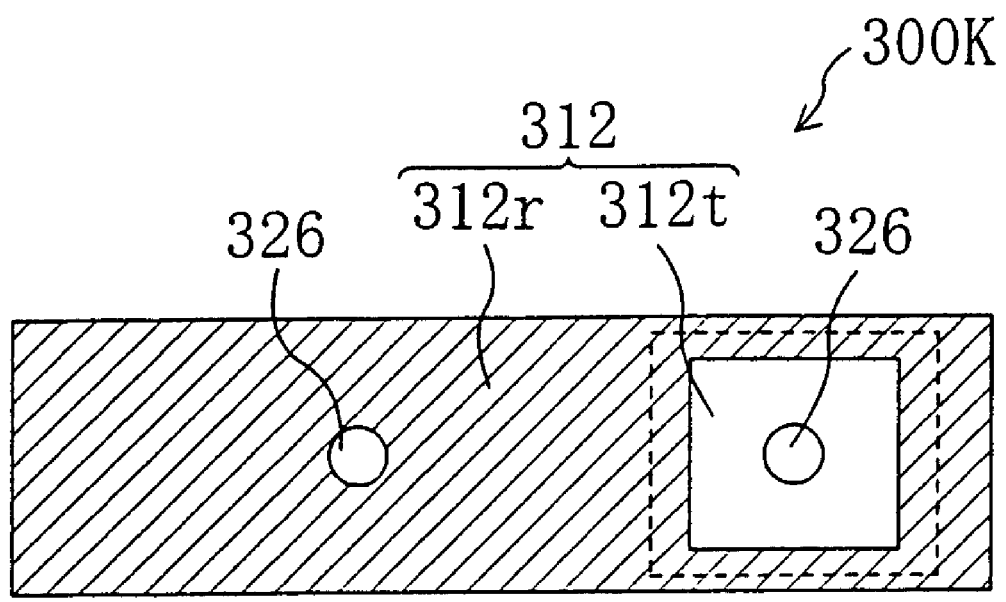
FIG. 38A is a top view for schematically showing the structure of one picture element region of still another combination type liquid crystal display device 300K of Embodiment 2 and FIG. 38B is a cross-sectional view thereof.
Figure 38B:
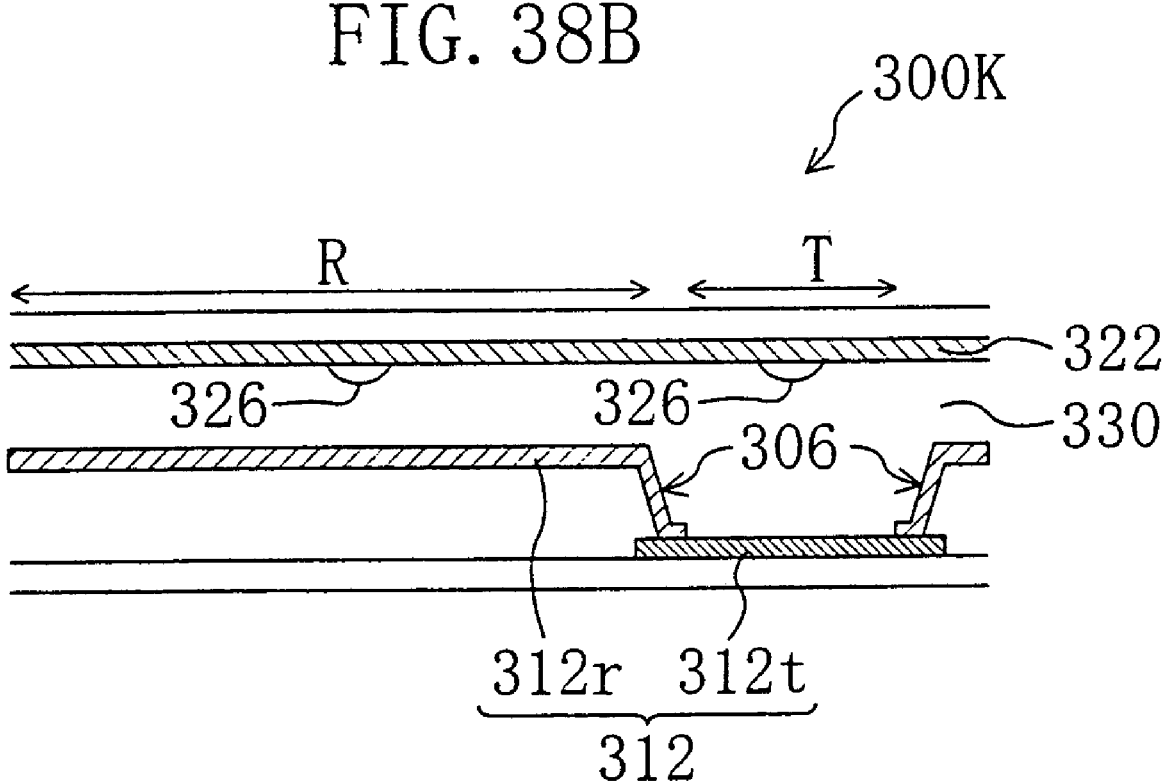

Although the area of the transmission region T is larger than the area of the reflection region R in each picture element region of the devices of FIGS. 27A through 36B, it goes without saying that the area of the reflection region R can be larger than the area of the transmission region T as in combination type liquid crystal display devices 300J and 300K shown in FIGS. 37A, 37B, 38A and 38B. Two reflection regions R may be disposed so as to sandwich a transmission region T as shown in FIGS. 37A and 37B, or a transmission region T may be disposed at the end of the picture element region as shown in FIGS. 38A and 38B. The arrangement of the reflection region R can be determined in accordance with the layout of elements that do not transmit light, such as lines (a scanning line, a signal line, an storage capacitance line and the like) and a TFT. Since a portion where the element not transmitting light is formed cannot be used as the transmission region T, the reflection region R is formed in the portion where the element not transmitting light is formed, so that the area of a portion of the picture element region substantially usable for display can be increased.

Combination type liquid crystal display devices 300L and 300M each including two reflection regions R disposed so as to sandwich a transmission region T are schematically shown in FIGS. 39A, 39B, 40A and 40B.

Figure 39A:
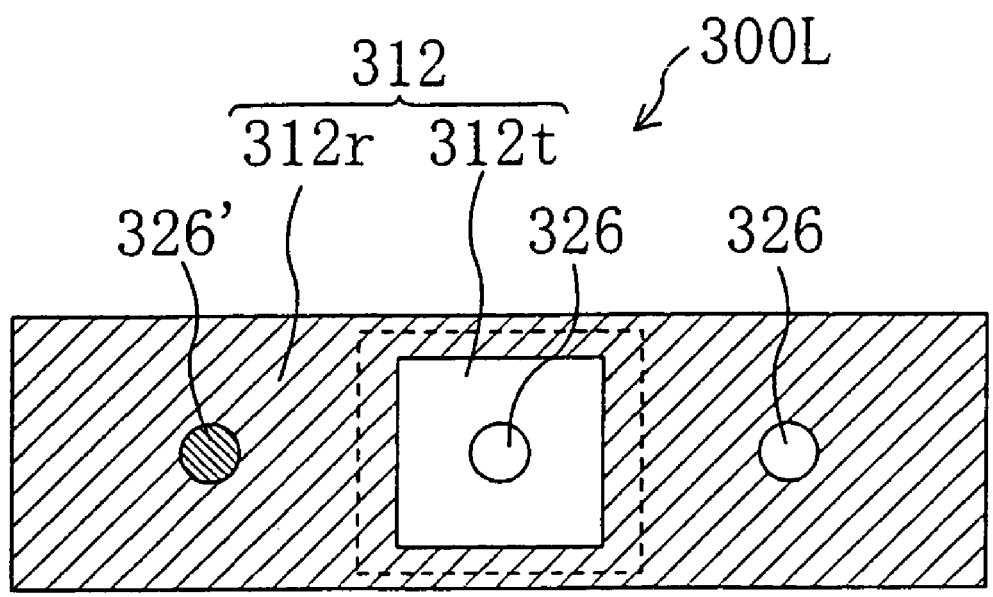
FIG. 39A is a top view for schematically showing the structure of one picture element region of still another combination type liquid crystal display device 300L of Embodiment 2 and FIG. 39B is a cross-sectional view thereof.
Figure 39B:
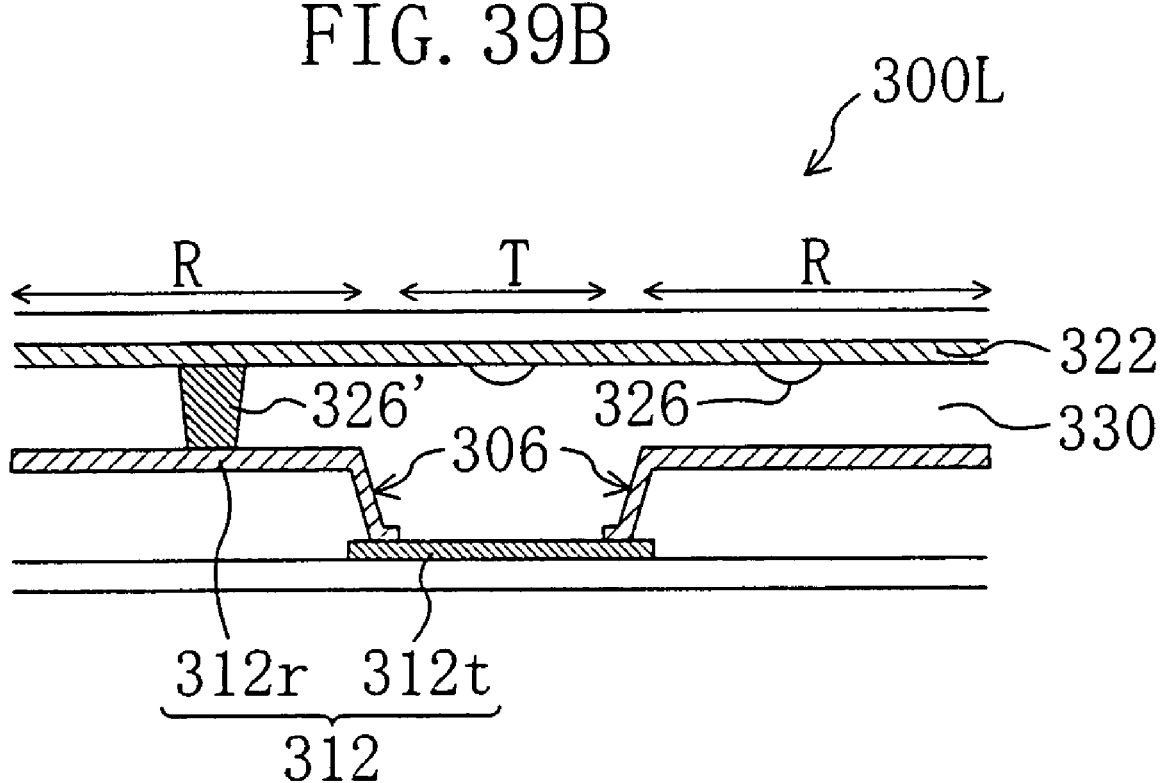

The combination type liquid crystal display device 300L of FIGS. 39A and 39B includes second protrusions 326 and 326' formed on the counter substrate respectively in the transmission region T and the two reflection regions R, and the second protrusion 326' disposed in one of the reflection regions R also works as the spacer.

Figure 40A:
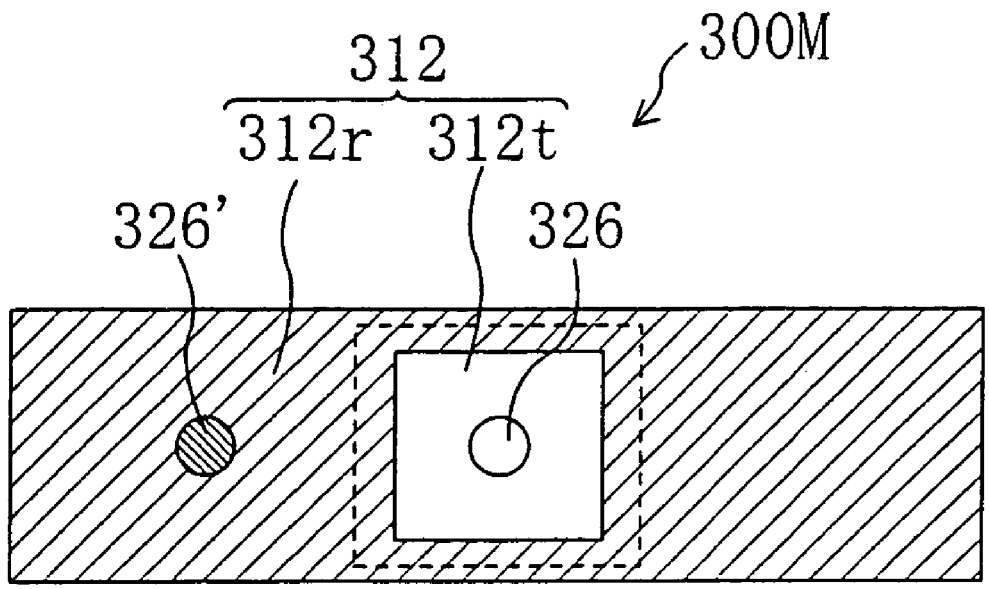
FIG. 40A is a top view for schematically showing the structure of one picture element region of still another combination type liquid crystal display device 300M of Embodiment 2 and FIG. 40B is a cross-sectional view thereof.
Figure 40B:
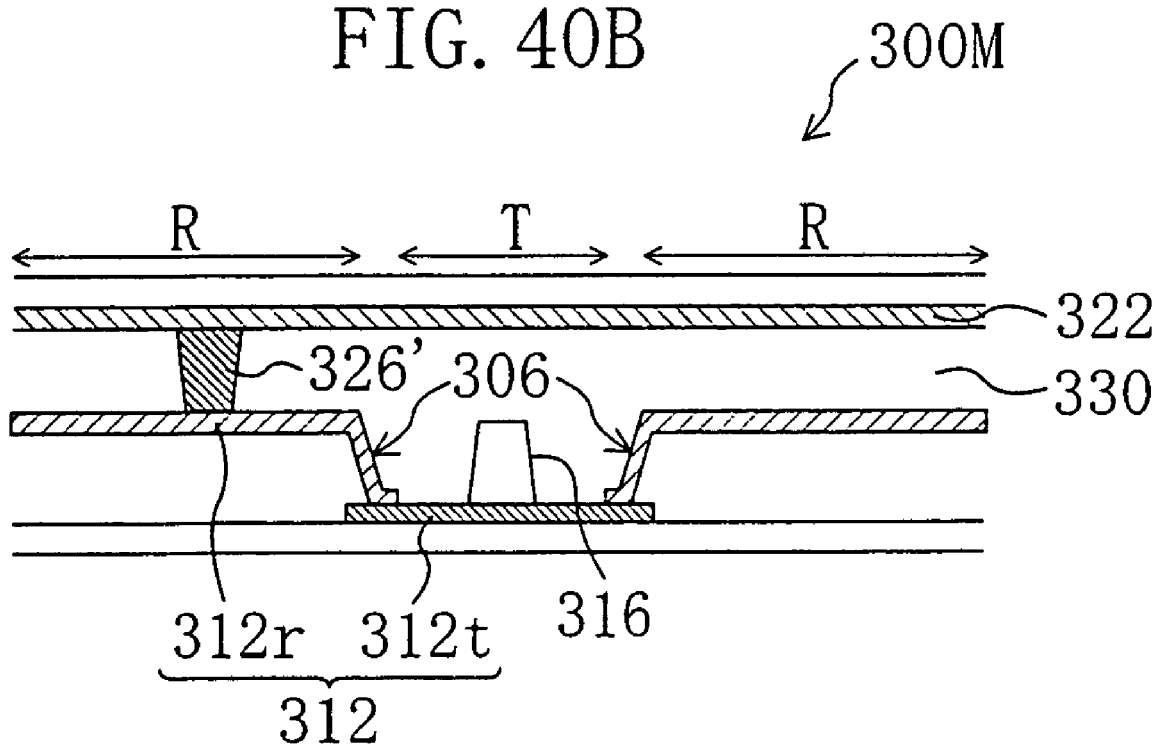

The combination type liquid crystal display device 300M of FIGS. 40A and 40B includes a first protrusion 316 formed on the TFT substrate in the transmission region T and a second protrusion 326' formed on the counter substrate in merely one of the reflection regions R. The second protrusion 326' disposed in one reflection region R alone also works as the spacer. When a protrusion disposed in another reflection region R is omitted and the first protrusion 316 formed on the TFT substrate is disposed in the transmission region T in this manner, the aperture ratio can be improved as well as the production cost can be reduced.

Although the protrusion formed on the substrate is in the shape of a truncated cone in the above-described devices, the shape of the protrusion is not limited to this. A protrusion 16' having a substantially cross-shaped cross-section taken along the substrate surface as shown in FIGS. 41A, 41B and 41C may be used instead.

Figure 41A:
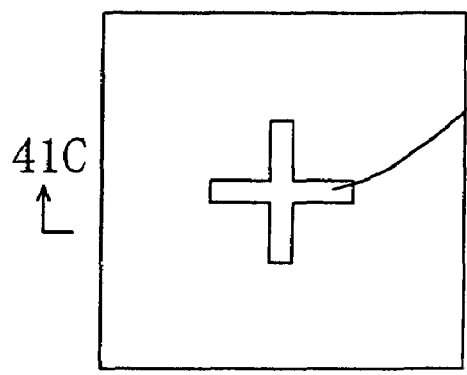
FIGS. 41A and 41B are top views for schematically showing other protrusions 16' usable in the liquid crystal display device of this invention and FIG. 41C is a cross-sectional view taken along line 41C–41C' of FIGS. 41A and 41B.
Figure 41B:
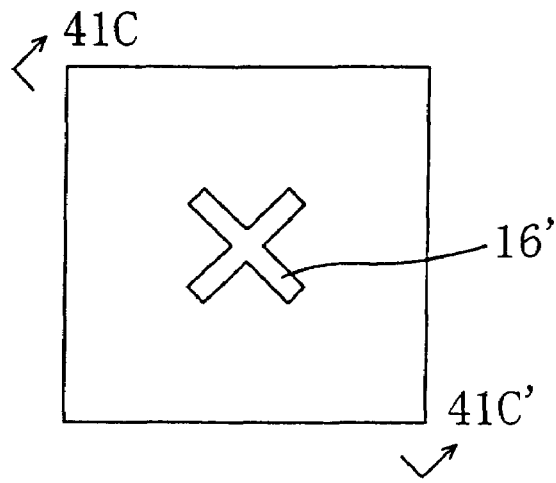
Figure 41C:
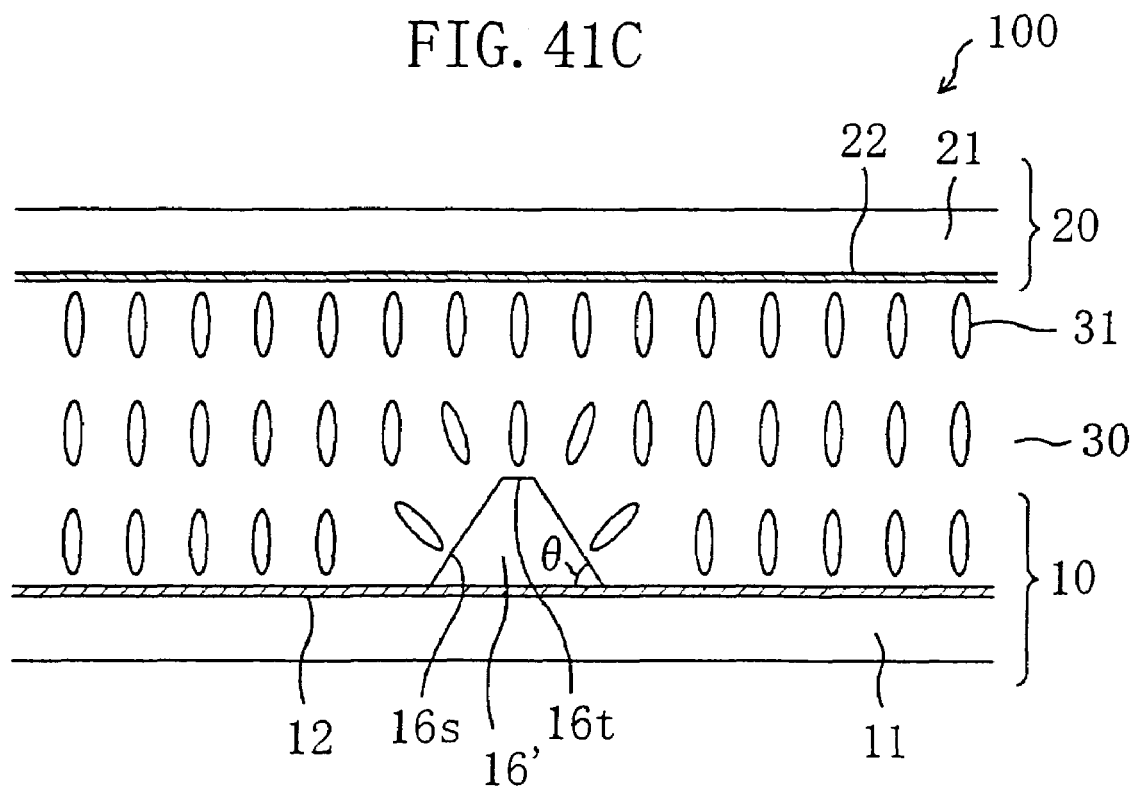

The protrusion 16' of FIGS. 41A, 41B and 41C has an inclined side face 16s and a top face 16t and the inclined side face 16s is inclined at an angle θ against the surface of the picture element electrode 12 (parallel to the surface of the substrate 11). Needless to say, the protrusion 16' may not have the top face 16t.

In the protrusion 16' having a substantially cross-shaped cross-section, the area of the inclined side face 16s causing the orientation-regulating force in the liquid crystal molecules 31 of the liquid crystal layer 30 is larger than a protrusion having a substantially circular cross-section and occupying substantially the same area. Therefore, the protrusion 16' can exhibit larger orientation-regulating force against the liquid crystal molecules 31. Accordingly, when the protrusion 16' of FIGS. 41A, 41B and 41C having a substantially cross-shaped cross-section is used, the radially-inclined orientation can be more stabilized and the response speed under voltage application can be improved.

Figure 42:
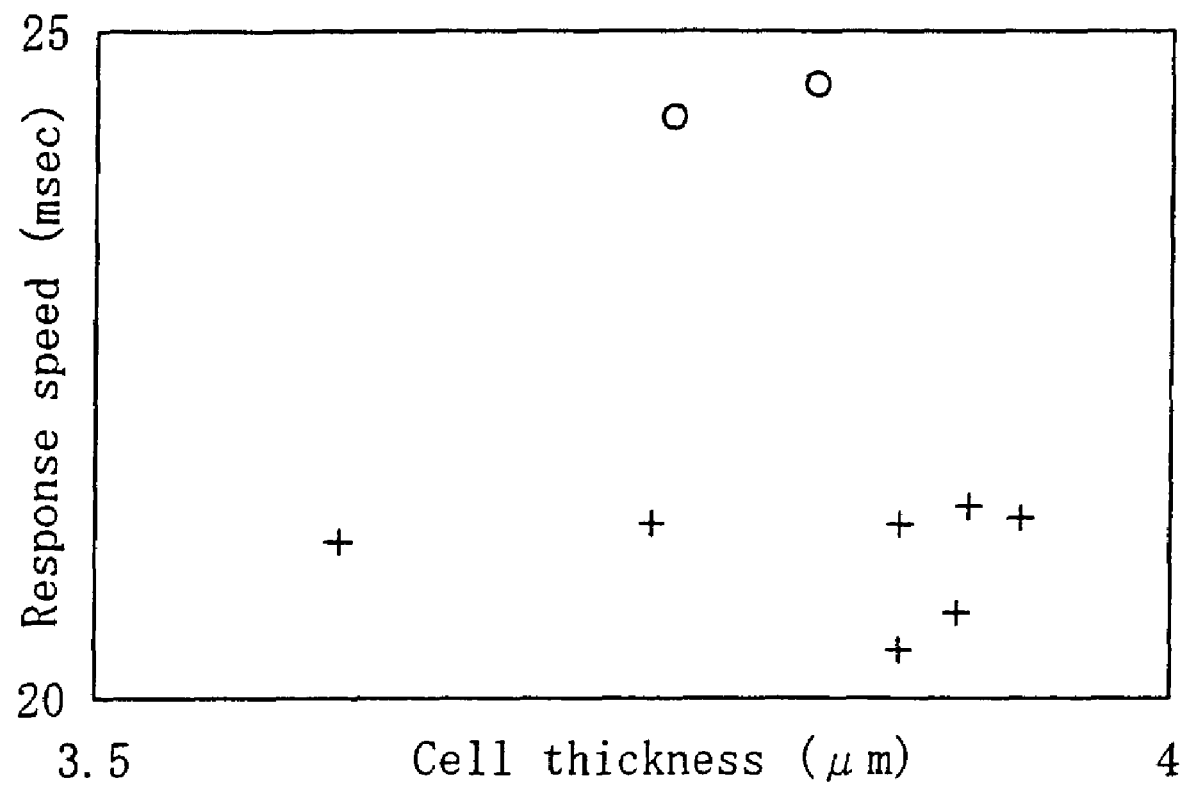
FIG. 42 is a graph for showing the response speed of a liquid crystal display device including a protrusion having a substantially circular cross-section and a liquid crystal display device including a protrusion having a substantially cross-shaped cross-section.

FIG. 42 shows the response speed in a liquid crystal display device including a protrusion having a substantially circular cross-section and a liquid crystal display device including a protrusion having a substantially cross-shaped cross-section. In the graph of FIG. 42, the abscissa indicates the cell thickness (μm) and the ordinate indicates the response speed (msec.). In FIG. 42, ○ denotes the response speed obtained when the cross-section is in a substantially circular shape and + denotes the response speed obtained when the cross-section is in a substantially cross shape. As shown in FIG. 42, the response speed is higher when the cross-section is in a substantially cross shape than when the cross-section is in a substantially circular shape.

Needless to say, when the size of the protrusion is increased, the area of the inclined side face is increased, and hence, the orientation-regulating force can be increased by increasing the size of the protrusion. However, when the size of the protrusion is increased, the area occupied by the protrusion in the picture element region is also increased. Therefore, the area of a portion of the picture element region used for display is reduced, resulting in lowering the aperture ratio. In contrast, when the protrusion has a substantially cross-shaped cross-section, the area of the inclined side face can be increased without increasing the area occupied by the protrusion as compared with the case where the protrusion has a substantially circular cross-section. Accordingly, the orientation-regulating force against the liquid crystal molecules 31 can be increased without lowering the aperture ratio.

Furthermore, when the protrusion 16' having a substantially cross-shaped cross-section is used, directivity can be caused in existing probabilities of liquid crystal molecules oriented along all the azimuth directions. Therefore, when the protrusion 16' having a substantially cross-shaped cross-section is used in a liquid crystal display device equipped with polarizing plates, the transmittance can be improved by optimizing the positional relationship between the directions of the polarization axes of the polarizing plates and the direction of the crossing lines of the cross. Thus, the transmittance can be improved so that brighter display can be realized and the contrast ratio can be improved. This will be described in detail.

Figure 43:
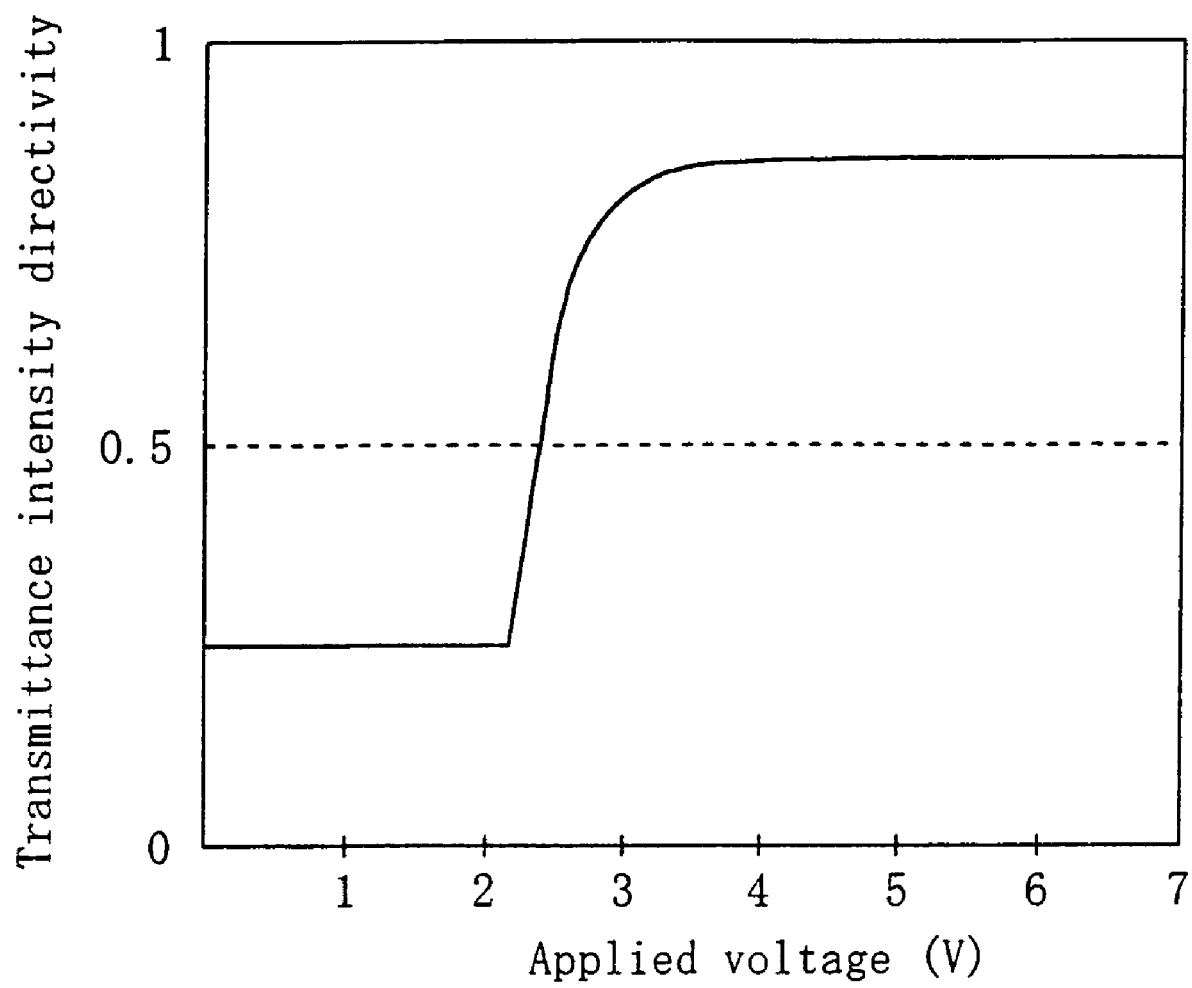
FIG. 43 is a graph for showing transmittance intensity directivity against the applied voltage (V) obtained in the cases where a protrusion has a substantially circular cross-section and a substantially cross-shaped cross-section.

FIG. 43 shows transmittance intensity directivity against an applied voltage (V) obtained when the protrusion has a substantially circular cross-section and when the protrusion has a substantially cross-shaped cross-section. In FIG. 43, a broken line denotes the transmittance intensity directivity obtained when the protrusion has a substantially circular cross-section, and a solid line denotes the transmittance intensity directivity obtained when the protrusion has a substantially cross-shaped cross-section. The transmission intensity directivity is expressed as $I_+/(I_+ + I_x)$, wherein $I_+$ is transmittance intensity obtained when a pair of polarizing plates in a crossed Nicols state are in given arrangement and $I_x$ is transmittance intensity obtained when the polarization axes are rotated from this arrangement by 45 degrees. In the case where the protrusion has a substantially cross-shaped cross-section, transmittance intensity obtained when the polarization axis directions of the polarizing plates accord with the direction of the crossing lines of the cross is defined as the transmittance intensity $I_+$. In the case where liquid crystal molecules are oriented in equivalent probabilities along all the azimuth directions, the transmittance intensity directivity is 0.5, and in the case where completely divided orientation is attained, the transmittance intensity directivity is 0 or 1.

When the protrusion has a substantially circular cross-section, the transmittance intensity directivity is approximately 0.5 regardless of the applied voltage as shown in FIG. 43. This is because, when the protrusion has a substantially circular cross-section, the liquid crystal molecules are oriented along all the azimuth directions in equivalent probabilities both under application of a voltage and under application of no voltage.

Figure 44A:
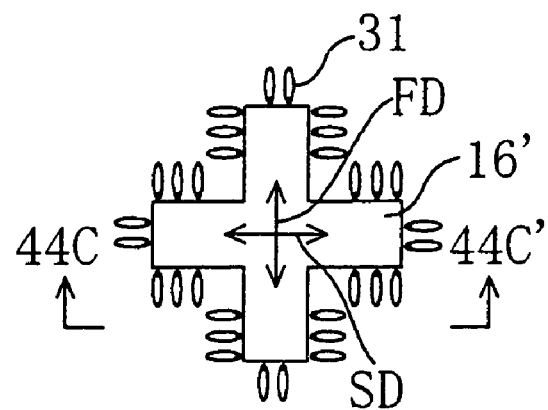
FIGS. 44A, 44B and 44C are schematic diagrams for showing an orientation state of the liquid crystal molecules 31 under application of no voltage, and specifically.
Figure 44B:
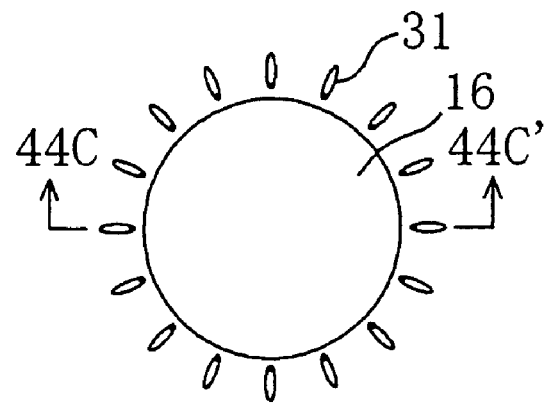
Figure 44C:
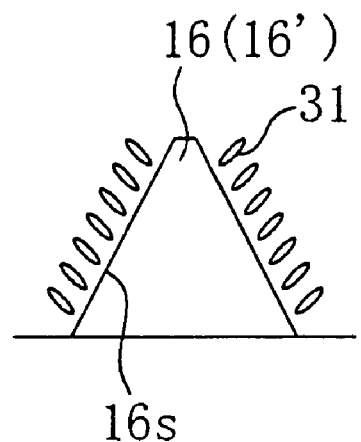

In contrast, in the case where the protrusion has a substantially cross-shaped cross-section, the transmittance intensity directivity is smaller than 0.5 when no voltage is applied and is larger than 0.5 when a sufficiently high voltage is applied. This means that when the polarization axes of the polarizing plates disposed in the crossed Nicols state accord with the directions of the crossing lines of the cross, darker black display and brighter white display can be realized and the contrast ratio can be improved. This is for the following reason:

The reason why darker black display can be realized will be described with reference to FIGS. 44A, 44B and 44C. FIGS. 44A, 44B and 44C schematically show the orientation states of liquid crystal molecules 31 under application of no voltage. Specifically, FIG. 44A is a top view of the orientation state obtained when the protrusion 16' having a substantially cross-shaped cross-section is provided, FIG. 44B is a top view of the orientation state obtained when the protrusion 16 having a substantially circular cross-section is provided, and FIG. 44C is a cross-sectional view taken along line 44C–44C' of FIGS. 44A and 44B.

As shown in FIG. 44C, when no voltage is applied, there are liquid crystal molecules 31 oriented to be inclined due to the anchoring effect of the inclined side face 16s, and hence, light leakage may be caused due to the birefringent effect of these inclined liquid crystal molecules 31.

In the case where the protrusion has a substantially cross-shaped cross-section, the azimuth directions of the orientation of the liquid crystal molecules 31 inclined under application of no voltage are parallel or vertical to the directions the crossing lines of the cross (that is, a first direction FD and a second direction SD crossing each other at right angles) as shown in FIG. 44A. Therefore, when the directions of the polarization axes of the polarizing plates accord with the directions of the crossing lines of the cross, the azimuth directions of the orientation of the liquid crystal molecules 31 inclined under application of no voltage are parallel or vertical to the polarization axes of the polarizing plates. Accordingly, the liquid crystal molecules 31 inclined under application of no voltage do not cause a phase difference in incident light, resulting in suppressing light leakage.

In contrast, in the case where the protrusion has a substantially circular cross-section, the liquid crystal molecules 31 inclined due to the effect of the inclined side face 16s are oriented along all the azimuth directions in equivalent probabilities as shown in FIG. 44B. Therefore, no matter how the polarization axes of the polarizing plates are set, there are liquid crystal molecules oriented along a direction inclined against the polarization axes. Accordingly, light leakage may be caused.

As described above, when the protrusion has a substantially cross-shaped cross-section, the occurrence of light leakage can be suppressed under application of no voltage by optimizing the directions of the polarization axes of the polarizing plates, so that darker black display can be realized.

Figure 45A:
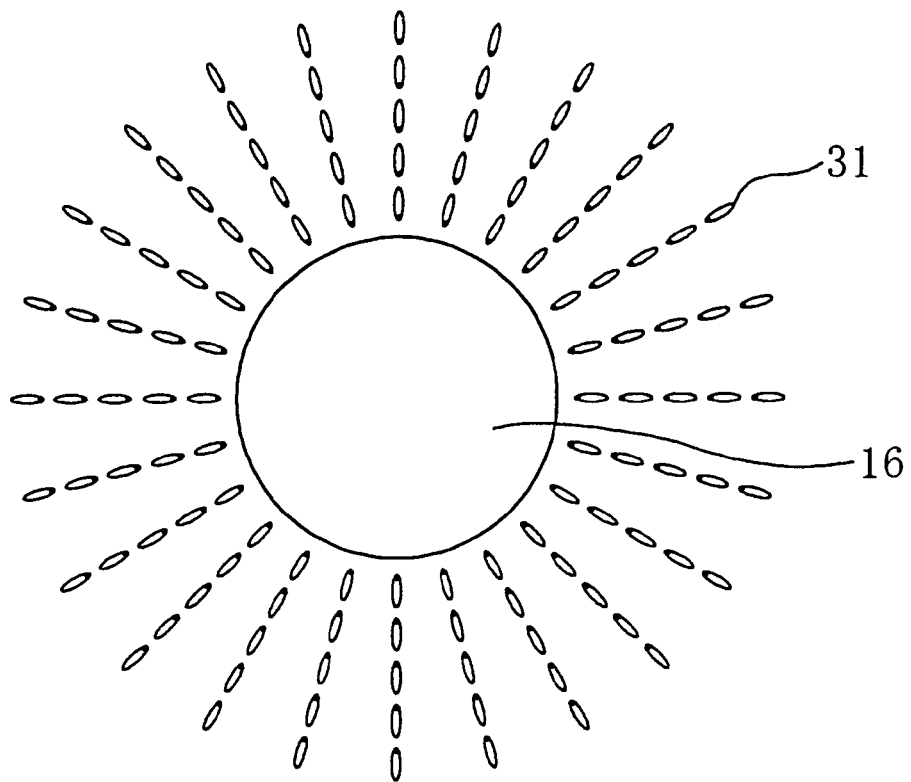
FIGS. 45A and 45B are schematic diagrams for showing an orientation state of the liquid crystal molecules 31 under application of a voltage, and specifically.
Figure 45B:
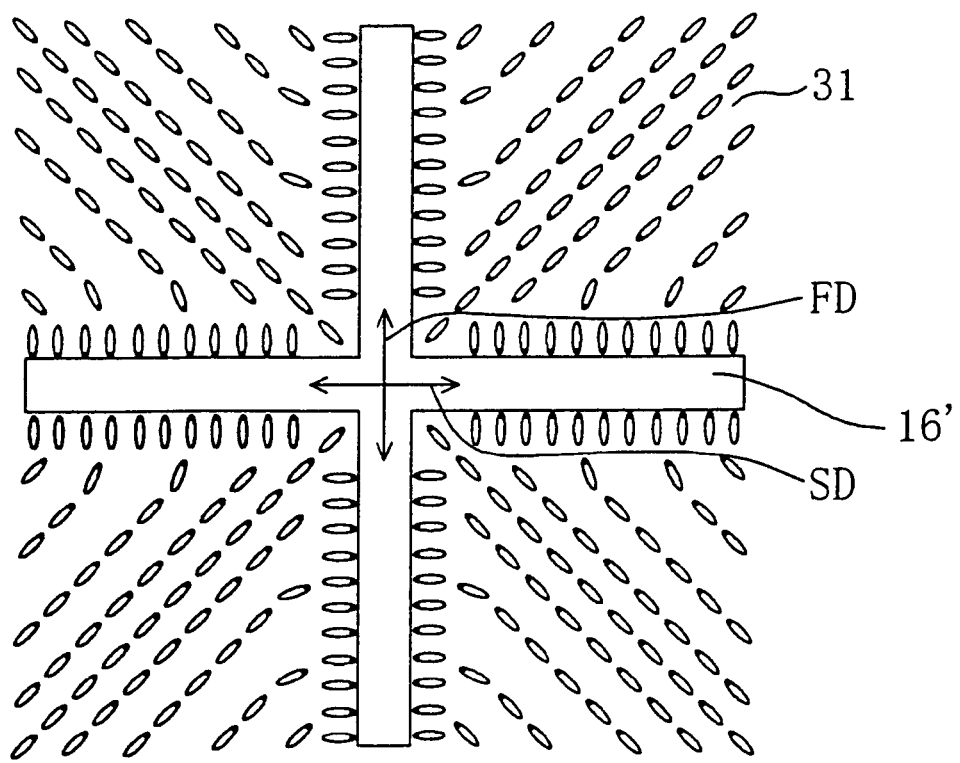

Next, the reason why brighter white display can be realized will be described with reference to FIGS. 45A and 45B. FIGS. 45A and 45B schematically show the orientation states of liquid crystal molecules 31 under voltage application. Specifically, FIG. 45A is a top view of the orientation state obtained when the protrusion 16 having a substantially circular cross-section is provided and FIG. 45B is a top view of the orientation state obtained when the protrusion 16' having a substantially cross-shaped cross-section is provided.

In the case where the protrusion 16 having a substantially circular cross-section is provided, liquid crystal molecules 31 present in the vicinity of the inclined side face 16s are oriented along all the azimuth directions in equivalent probabilities due to the orientation-regulating force (the anchoring effect) of the inclined side face 16s under application of no voltage as shown in FIG. 44B. Therefore, when a voltage is applied through the liquid crystal layer 30, liquid crystal molecules 31 other than those present in the vicinity of the inclined side face 16s are inclined along directions matching with the orientation directions of the liquid crystal molecules 31 inclined due to the orientation-regulating force of the inclined side face 16s. As a result, as shown in FIG. 45A, the liquid crystal molecules 31 of the liquid crystal layer 30 are oriented along all the azimuth directions in equivalent probabilities.

On the other hand, in the case where the protrusion 16' having a substantially cross-shaped cross-section is provided, the azimuth directions of the orientation of liquid crystal molecules 31 inclined under application of no voltage are parallel or vertical to the directions of the crossing lines of the cross (namely, the first direction FD and the second direction SD crossing each other at right angles) as shown in FIG. 44A. Therefore, when a voltage is applied through the liquid crystal layer 30, liquid crystal molecules 31 other than those present in the vicinity of the inclined side face 16s are inclined along directions matching with the orientation directions of the liquid crystal molecules 31 inclined due to the orientation-regulating force of the inclined side face 16s. As a result, the existing probability of liquid crystal molecules 31 oriented along directions at an angle of approximately 45 degrees against the directions of the crossing lines of the cross is comparatively high as shown in FIG. 45B. Therefore, when a pair of polarizing plates are disposed in such a manner that the directions of the polarization axes of the polarizing plates accord with the directions of the crossing lines of the cross, namely, in such a manner that the polarization axis of one polarizing plate is parallel to the first direction FD and the polarization axis of the other polarizing plate is parallel to the second direction SD, light transmittance can be improved because the existing probability of the liquid crystal molecules 31 oriented along directions at an angle of approximately 45 degrees against the polarization axes of the polarizing plates is comparatively high.

As described above, when the protrusion has a substantially cross-shaped cross-section, the light transmittance under voltage application can be improved by optimizing the directions of the polarization axes of the polarizing plates, so that brighter white display can be realized.

Figure 46A:
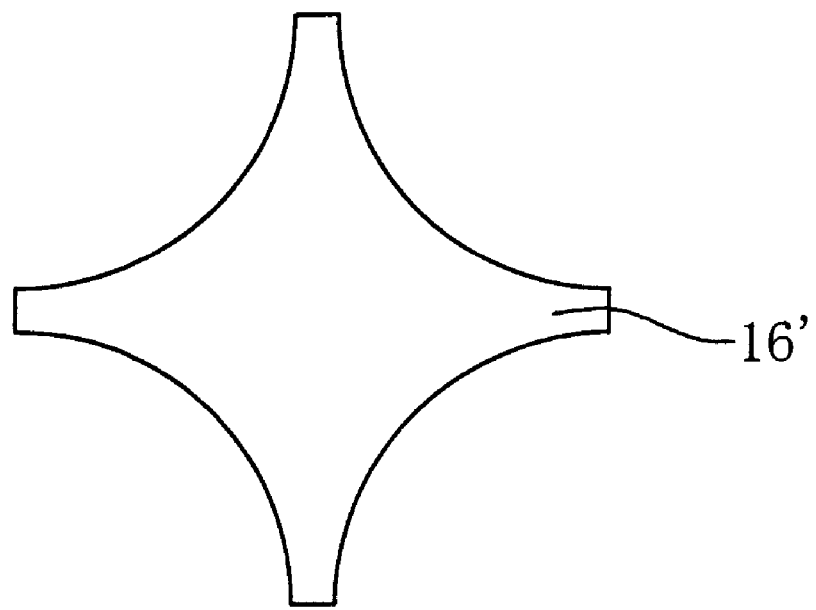
FIGS. 46A and 46B are schematic top views of other protrusions 16' usable in the liquid crystal display device of this invention.
Figure 46B:
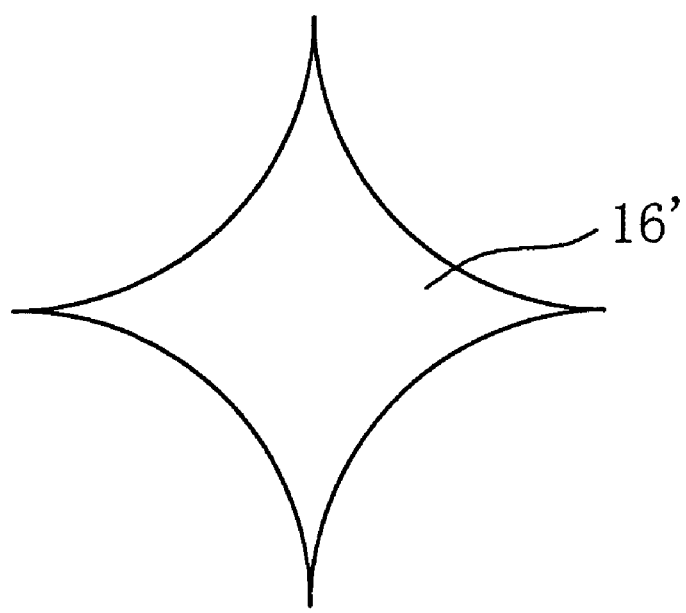

Although the protrusion 16' having a substantially cross-shaped cross-section consisting of linear sides is shown in FIGS. 41A and 41B, the shape of the protrusion 16' is not limited to this. A protrusion having a substantially cross-shaped cross-section including curved sides can attain the same effect. The cross-section may be in a substantially cross shape including four quarter arc-shaped sides as shown in FIG. 46A or may be in a substantially cross shape consisting of four quarter arc-shaped sides alone as shown in FIG. 46B. In order to increase the orientation-regulating force without lowering the aperture ratio, the substantially cross-shaped cross-section is preferably formed from the linear sides as shown in FIGS. 41A and 41B.

Examples of the arrangement of the protrusion having a substantially cross-shaped cross-section will be described by taking a combination type liquid crystal display device as an example. In the following description, the protrusion having a substantially cross-shaped cross-section is formed on the counter substrate, but it may be formed on the TFT substrate or may be used together with a protrusion having a substantially circular cross-section as described later.

Figure 47A:
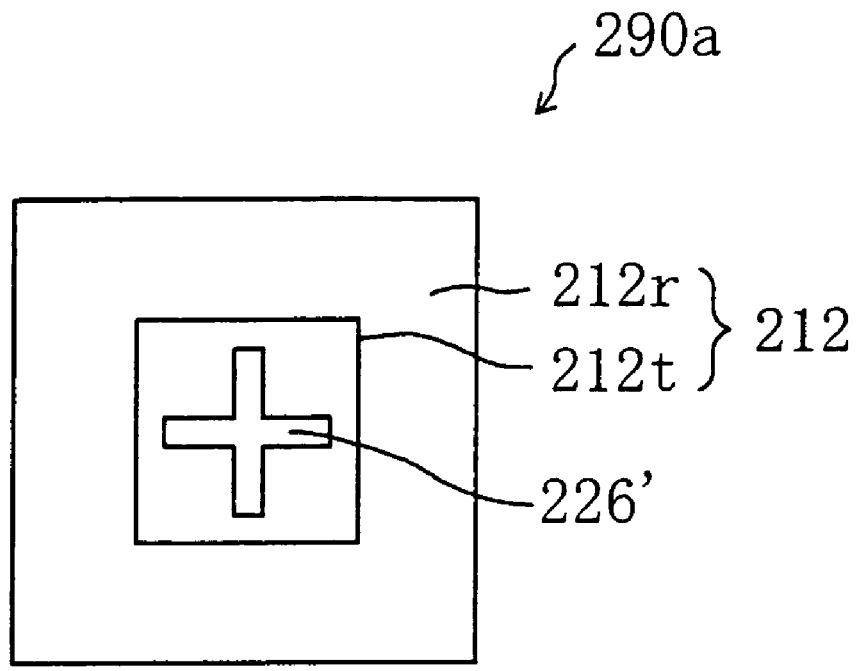
FIGS. 47A and 47B are schematic top views for showing the structure of one picture element region of other combination type liquid crystal display devices 290a and 290b of Embodiment 2, respectively.
Figure 47B:
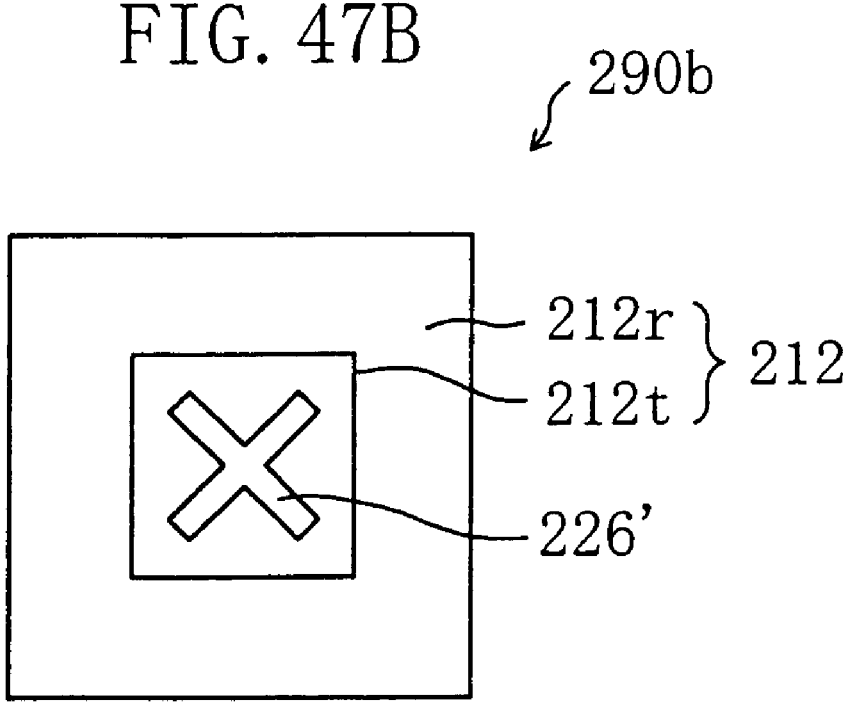

For example, a protrusion 226' formed on the counter substrate may be disposed in the transmission region (i.e., the transparent electrode 212t) as in combination type liquid crystal display devices 290a and 290b respectively shown in FIGS. 47A and 47B. Alternatively, the protrusion 226' formed on the counter substrate may be disposed to extend over both the transmission region (i.e., the transparent electrode 212*t*) and the reflection region (i.e., the reflecting electrode 212*r*) as in combination type liquid crystal display devices 290*c* and 290*d* respectively shown in FIGS. 48A and 48B. In consideration of the aperture ratio, the arrangement of FIG. 47A or 47B is preferred, and in consideration of increase of the orientation-regulating force for improving the response speed, the arrangement of FIG. 48A or 48B is preferred.

Figure 48A:
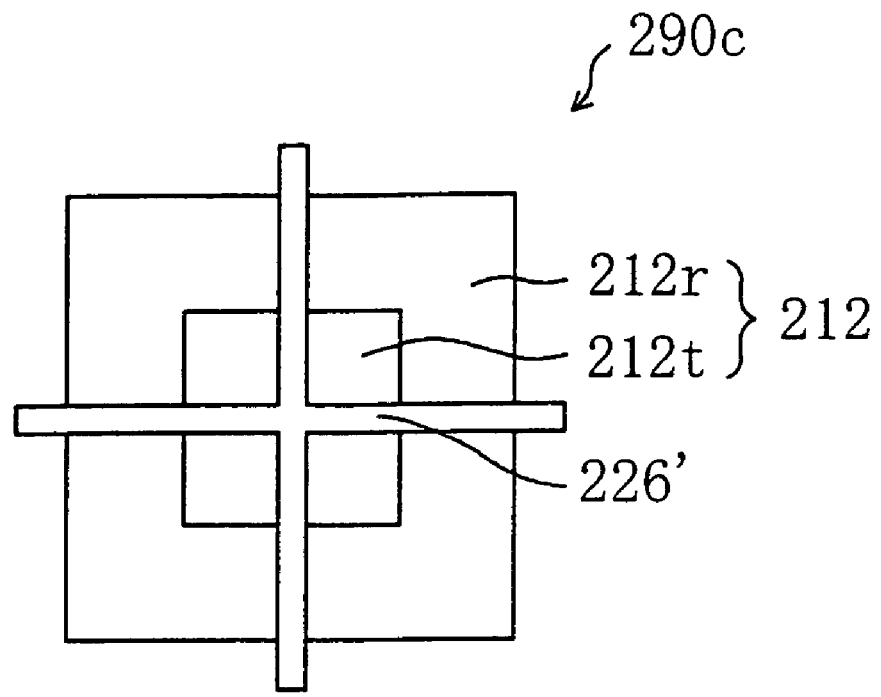
FIGS. 48A and 48B are schematic top views for showing the structure of one picture element region of still other combination type liquid crystal display devices 290c and 290d of Embodiment 2, respectively.
Figure 48B:
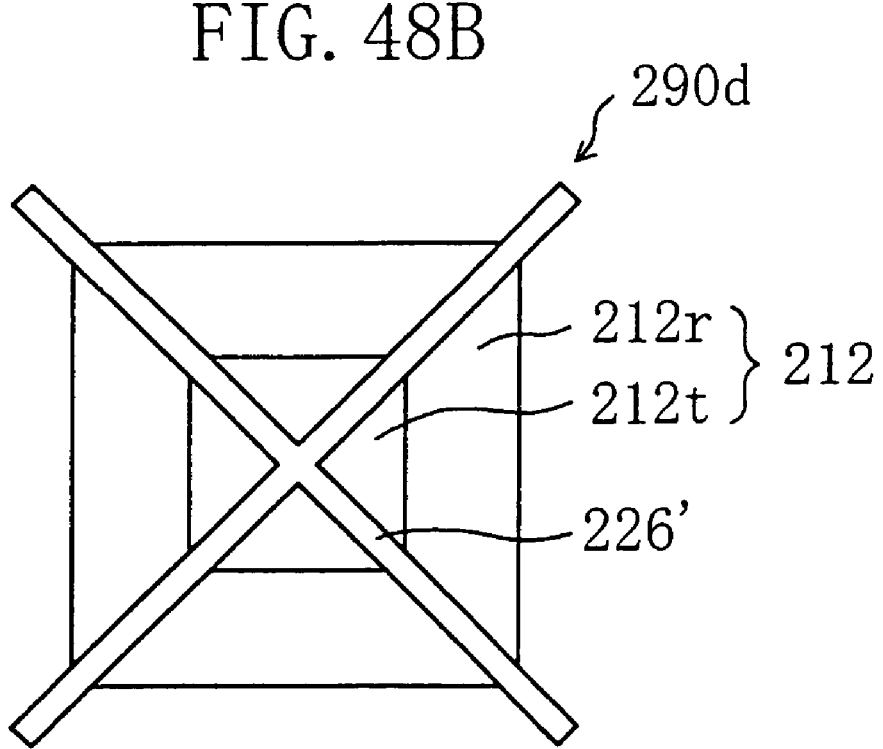

Also, the protrusion 226' may be disposed with the crossing lines of the cross extending vertically or in parallel to the sides for defining the picture element region as shown in FIGS. 47A and 48A. Alternatively, the protrusion 226' may be disposed with the crossing lines of the cross inclined (at an angle of, for example, approximately 45 degrees) against the sides for defining the picture element region as shown in FIGS. 47B and 48B. In either arrangement, the transmittance and the contrast ratio can be improved by allowing the directions of the polarization axes of the polarizing plates to accord with the directions of the crossing lines of the cross. Conversely speaking, even when there is restriction in the layout of the polarizing plates, the transmittance can be improved by optimizing the arrangement of the protrusion 226' (namely, the directions of the crossing lines of the cross).

Figure 50:
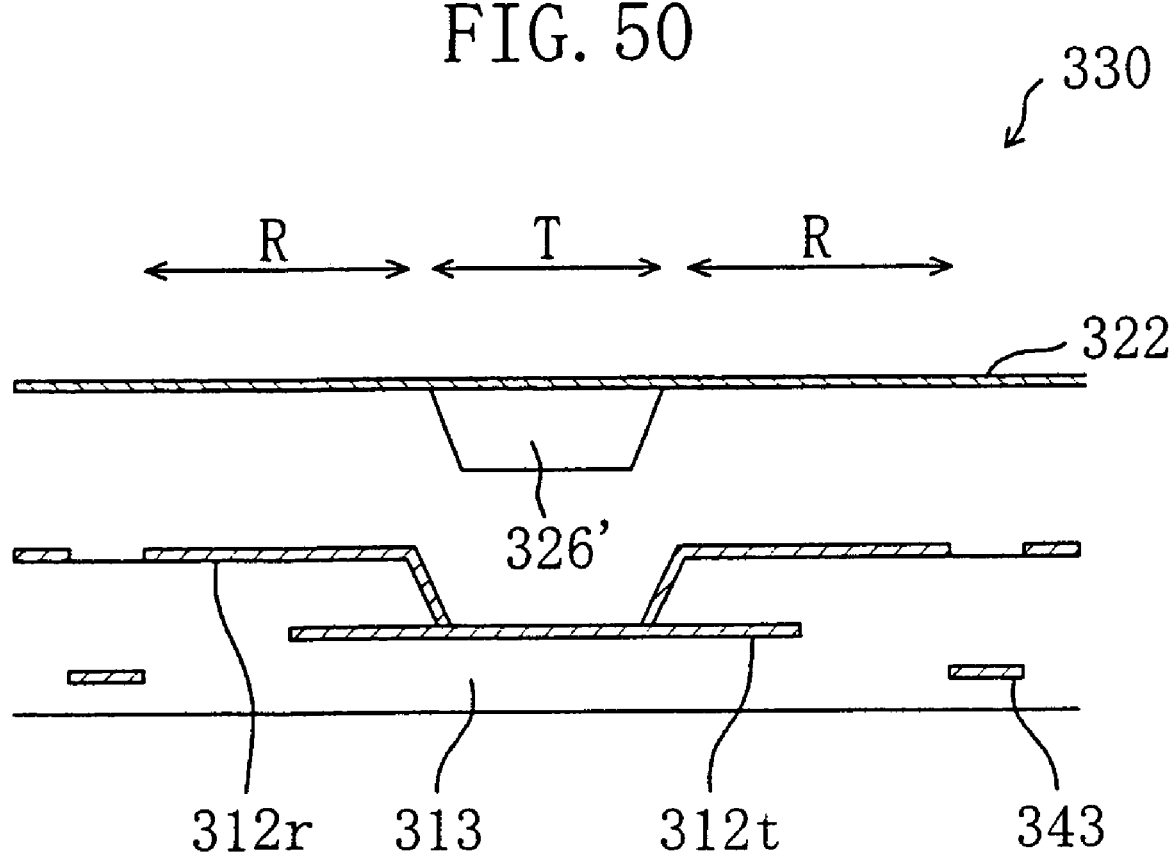
FIG. 50 is a cross-sectional view for schematically showing the structure of one picture element region of the combination type liquid crystal display device 330 taken along line 50A–50A' of FIG. 49.
Figure 51:
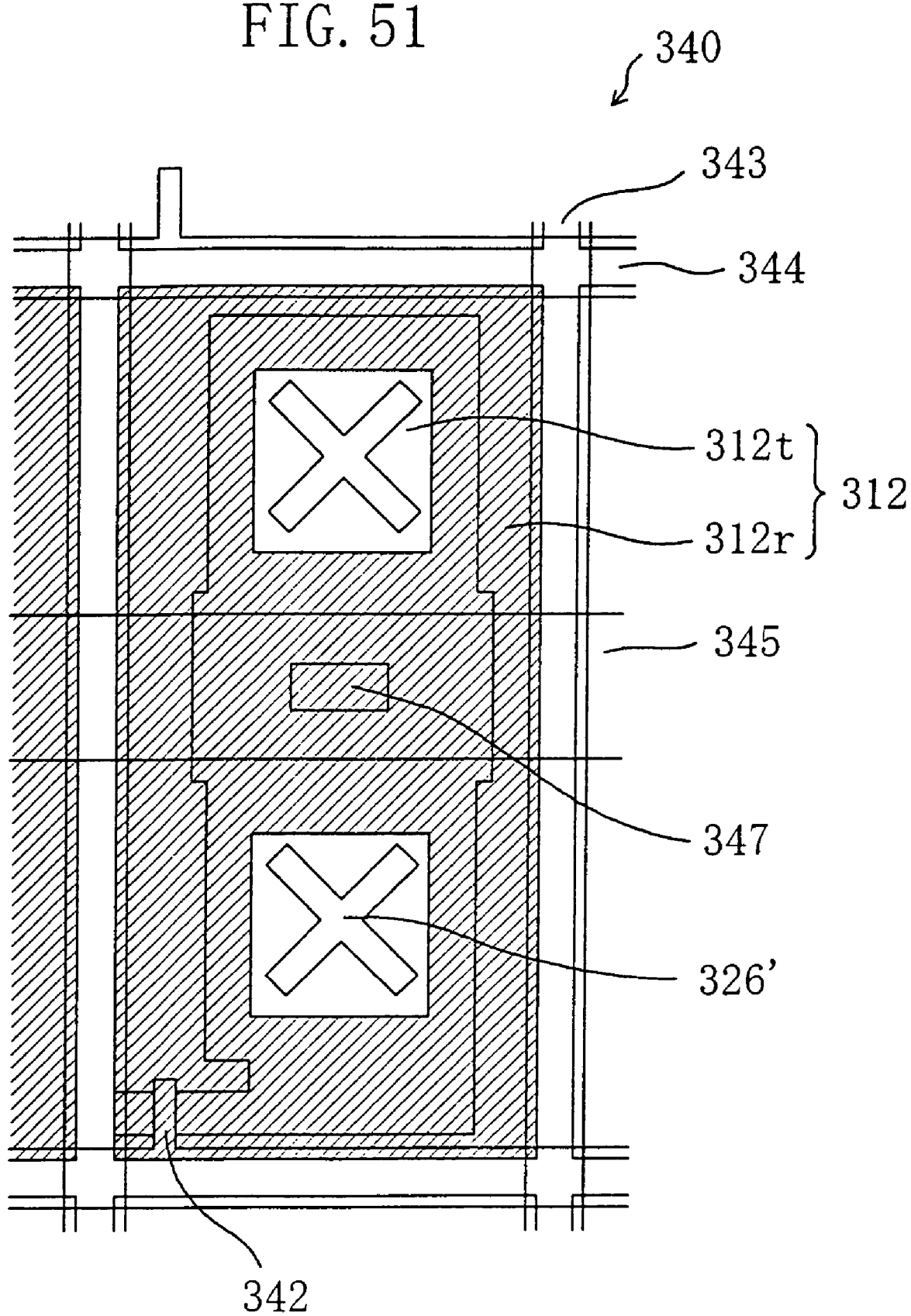
FIG. 51 is a top view for schematically showing the structure of one picture element region of still another combination type liquid crystal display device 340 of Embodiment 2.

Now, specific structures of combination type liquid crystal display devices 330 and 340 each including a protrusion 326' having a substantially cross-shaped cross-section formed on the counter substrate will be described with reference to FIGS. 49, 50 and 51. FIG. 49 is a top view for schematically showing the combination type liquid crystal display device 330, FIG. 50 is a cross-sectional view taken along line 50A–50A' of FIG. 49, and FIG. 51 is a top view for schematically showing the combination type liquid crystal display device 340. In the following description, like reference numerals are used to refer to elements having substantially the same functions as those of the combination type liquid crystal display devices 300 and 310 shown in FIGS. 23, 24 and 25 so as to omit the description.

The combination type liquid crystal display device 330 or 340 shown in FIGS. 49, 50 and 51 has two transmission regions T in one picture element region, and the protrusion 326' having a substantially cross-shaped cross-section is formed on the counter electrode 322 so as to be positioned at the center of each transmission region T.

In the combination type liquid crystal display device 330 shown in FIGS. 49 and 50, the protrusion 326' is disposed with the directions of the crossing lines of the cross extending vertically or in parallel to the sides for defining the picture element region. In contrast, in the combination type liquid crystal display device 340 shown in FIG. 51, the protrusion 326' is disposed with the directions of the crossing lines of the cross inclined (at an angle of, for example, approximately 45 degrees) against the sides for defining the picture element region.

Although the protrusion 326' is disposed in the transmission region T in the combination type liquid crystal display devices 330 and 340 shown in FIGS. 49, 50 and 51, the protrusion 326' may be disposed in the reflection region R. Alternatively, the protrusion 326' may be disposed to extend over both the transmission region T and the reflection region R as in a combination type liquid crystal display device 350 shown in FIGS. 52, 53A and 53B.

Figure 52:
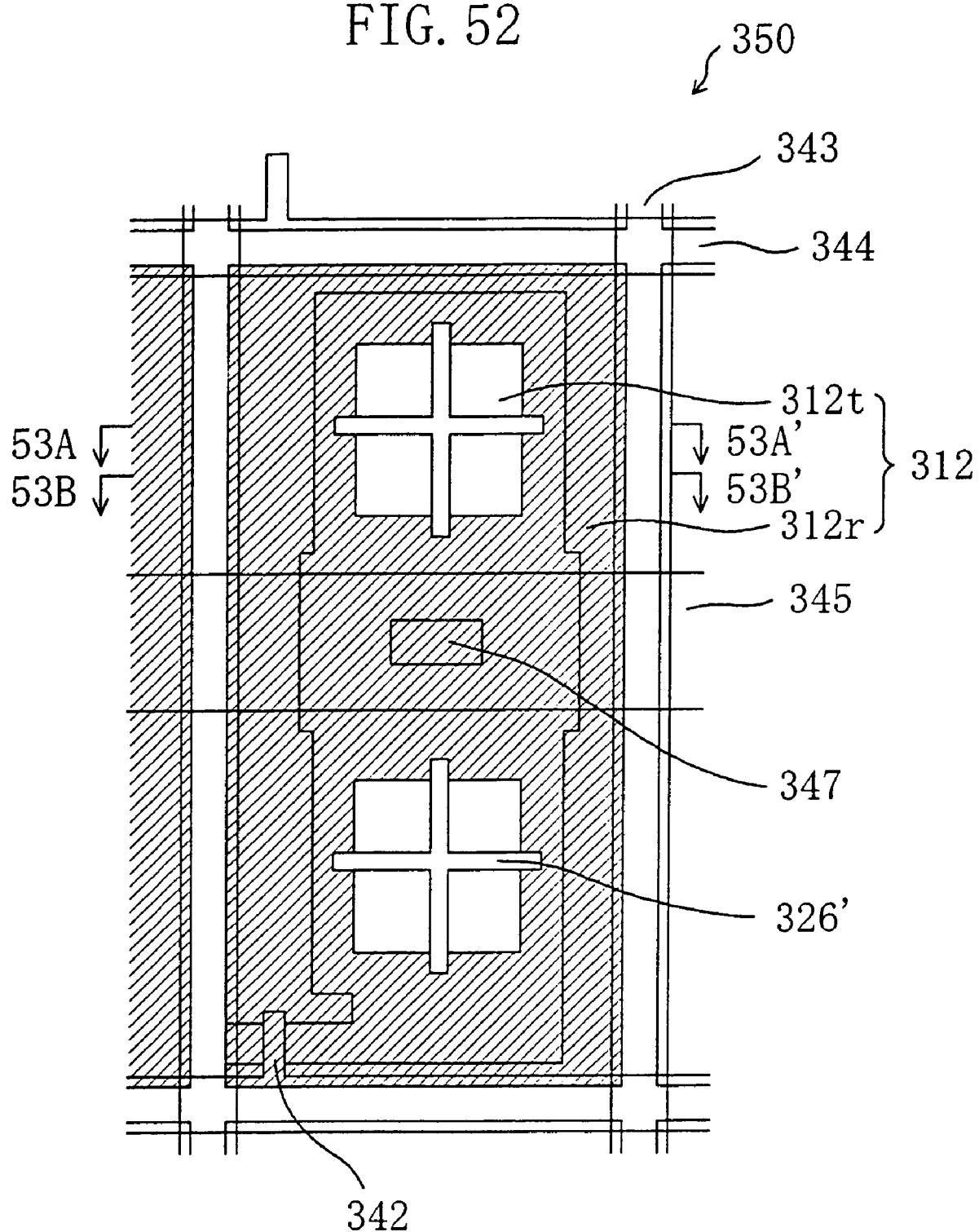
FIG. 52 is a top view for schematically showing the structure of one picture element region of still another combination type liquid crystal display device 350 of Embodiment 2.
Figure 53A:
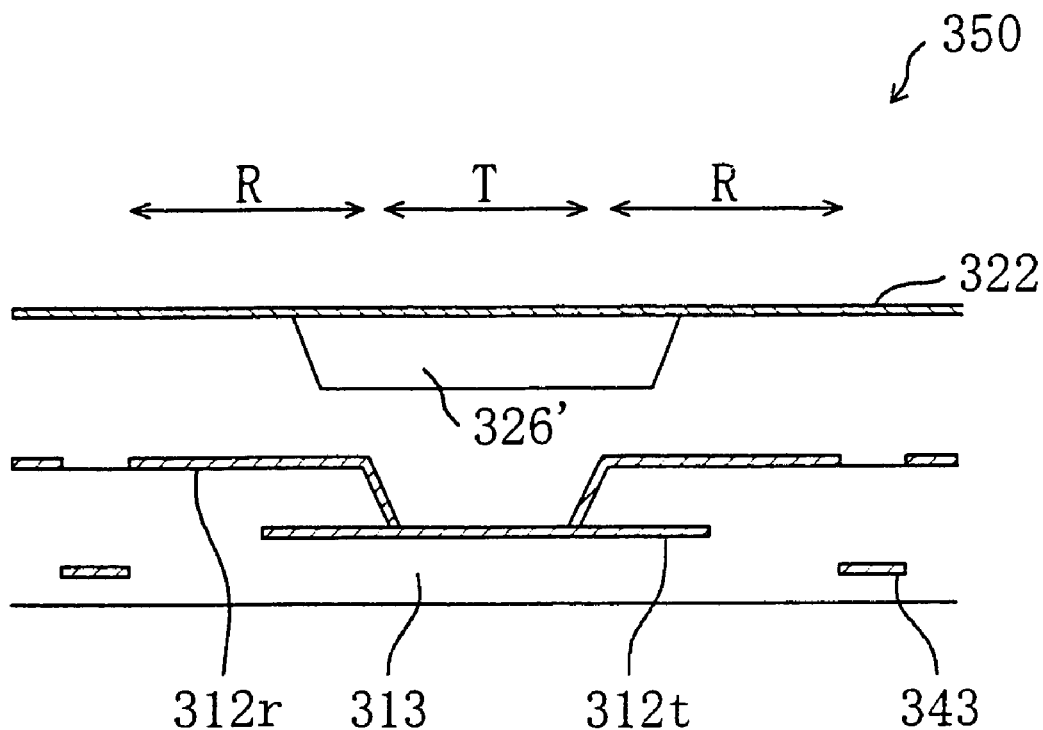
FIGS. 53A and 53B are cross-sectional views for schematically showing the structure of one picture element region of the combination type liquid crystal display device 350 taken along line 53A–53A' of FIG. 52 and line 53B–53B' of FIG. 52, respectively.
Figure 53B:
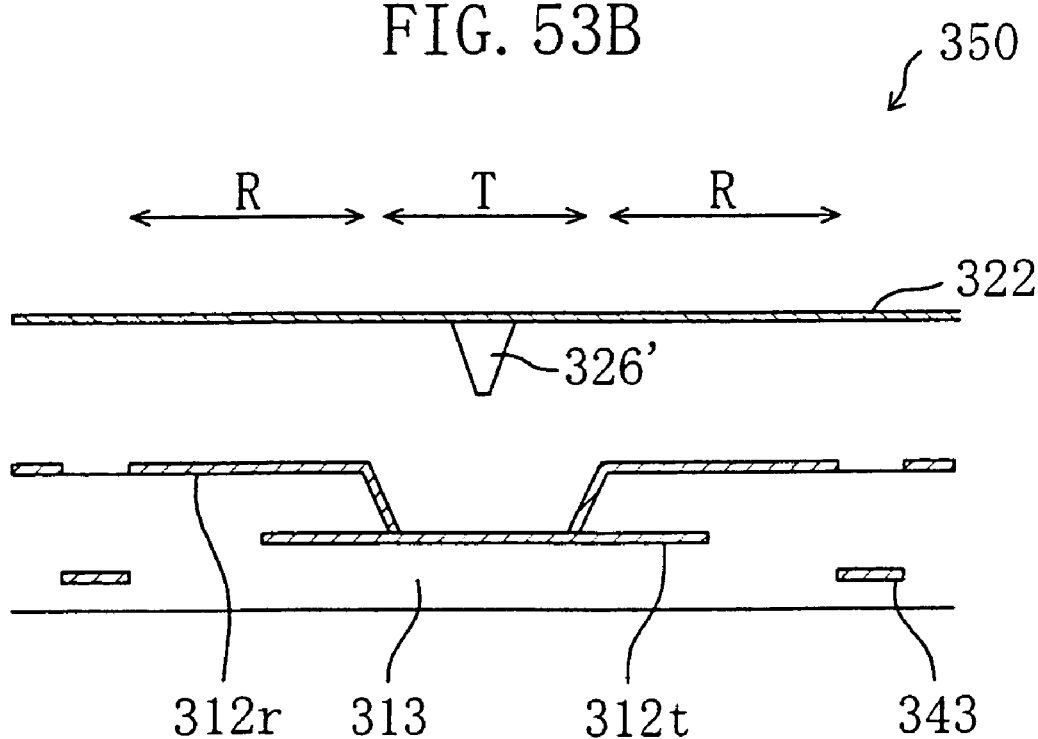
Figure 54:
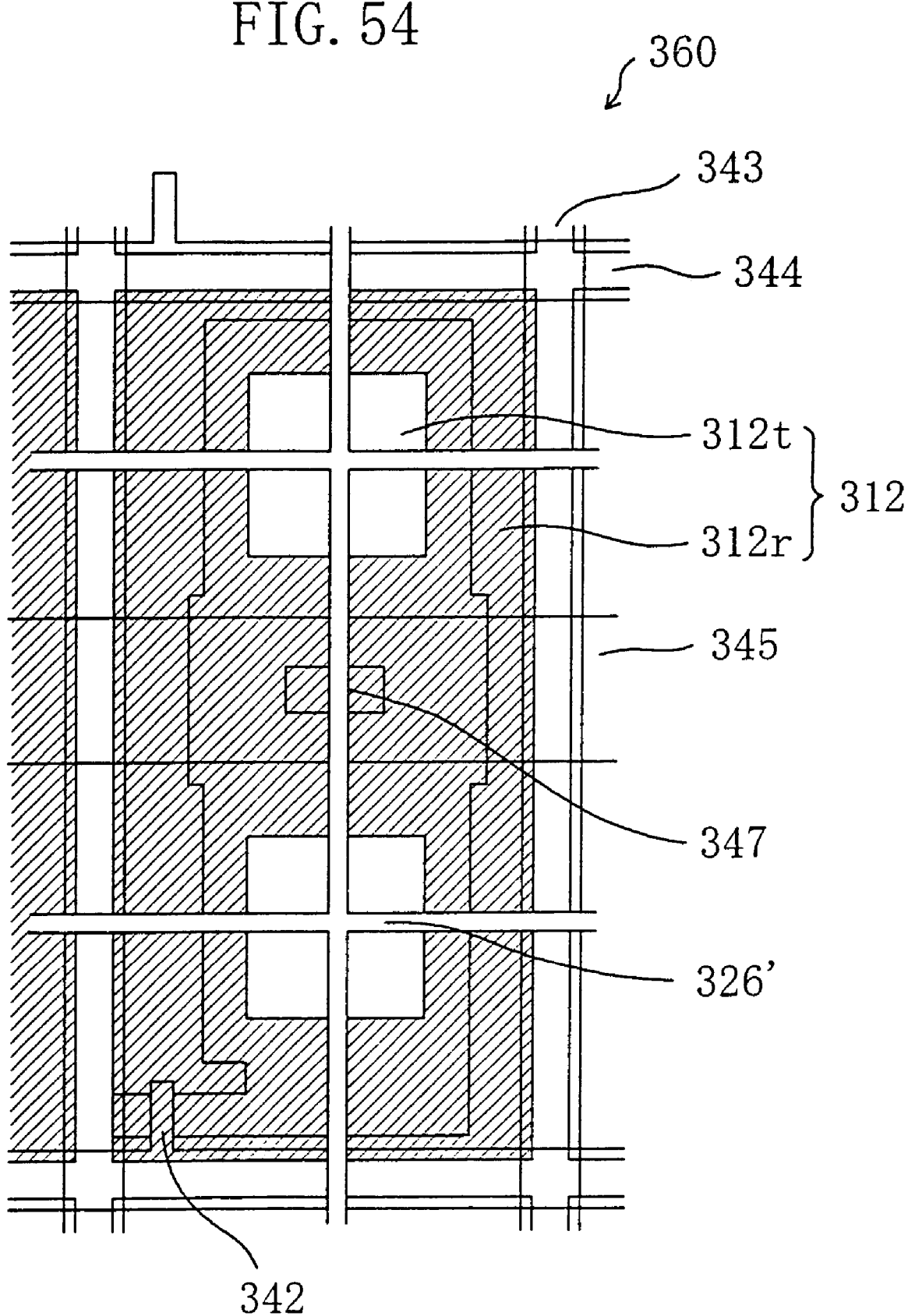
FIG. 54 is a top view for schematically showing the structure of one picture element region of still another combination type liquid crystal display device 360 of Embodiment 2.

Also, the protrusion 326' may be independently disposed in each picture element region as in the combination type liquid crystal display device 350 shown in FIGS. 52, 53A and 53B, or the protrusion 326' may be provided integrally with another adjacent protrusion 326' (including another protrusion 326' formed in another picture element region) as in a combination type liquid crystal display device 360 shown in FIG. 54.

Although the protrusion having a substantially cross-shaped cross-section alone is provided in the above-described devices, which, of course, does not limit the invention. The protrusion having a substantially cross-shaped cross-section may be used in combination with a protrusion having a cross-section in another shape. Also, although the protrusion with a substantially cross-shaped cross-section is provided on one substrate (the counter substrate) but no protrusion is formed on the other substrate (TFT substrate) in the above-described devices, which, of course, does not limit the invention. The protrusion having a substantially cross-shaped cross-section formed on one substrate may be used in combination with another protrusion formed on the other substrate.

Figure 55A:
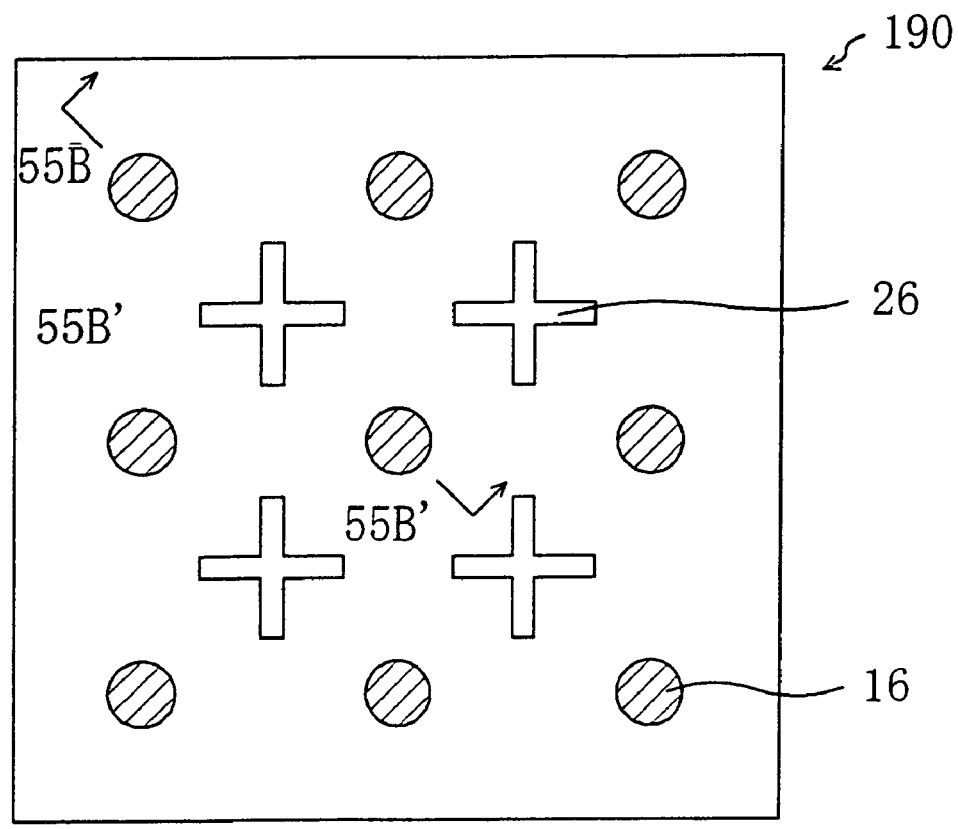
FIG. 55A is a top view for schematically showing the structure of one picture element region of a liquid crystal display device 190 according to another embodiment of the invention and FIG. 55B is a cross-sectional view thereof taken along line 55B–55B' of FIG. 55A.
Figure 55B:
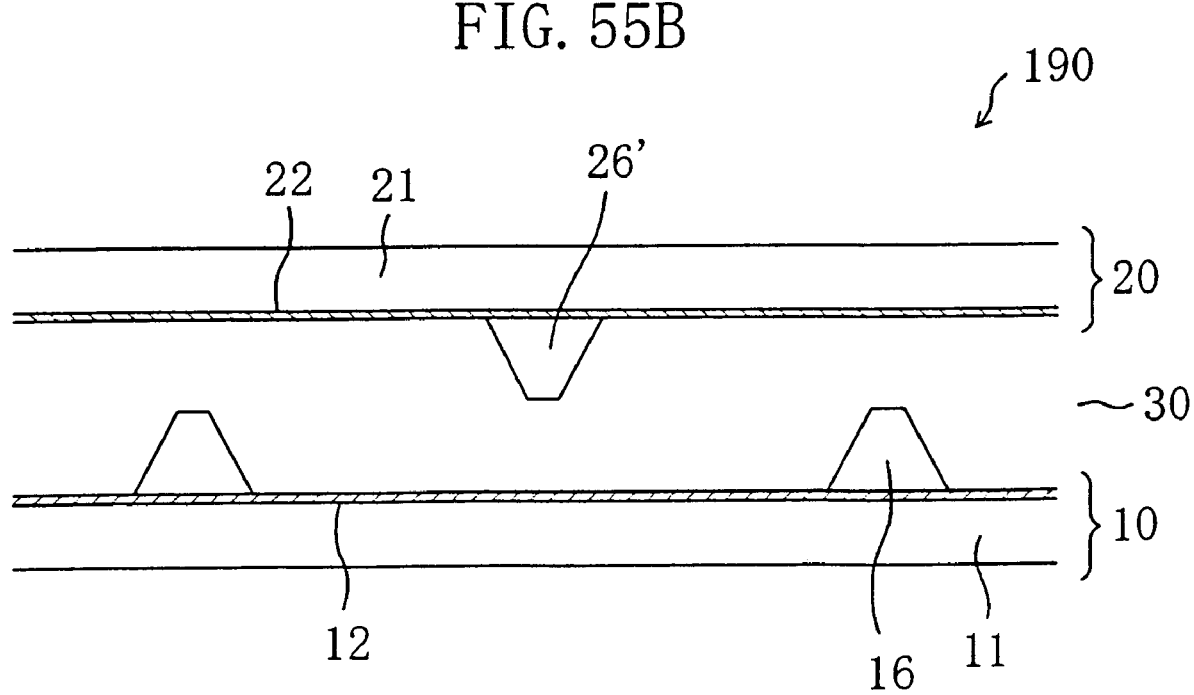

A liquid crystal display device 190 including a first protrusion 16 having a substantially circular cross-section and a second protrusion 26' having a substantially cross-shaped cross-section is schematically shown in FIGS. 55A and 55B. FIG. 55A is a schematic top view of the liquid crystal display device 190 and FIG. 55B is a cross-sectional view taken along line 55B–55B' of FIG. 55A.

The liquid crystal display device 190 includes a plurality of first protrusions 16 formed on the surface of the TFT substrate 10 facing the liquid crystal layer 30 and a plurality of second protrusions 26' formed on the surface of the counter substrate 20 facing the liquid crystal layer 30. The first protrusion 16 has a substantially circular cross-section and the second protrusion 26' has a substantially cross-shaped cross-section.

As shown in FIG. 55A, the nine first protrusions 16 are arranged so as to form four square lattices, and the second protrusions 26' are respectively positioned at the centers of the four square lattices. Also, the four second protrusions 26' together form a square lattice. Also in the case where the first protrusion 16 having a substantially circular cross-section and the second protrusion 26' having a substantially cross-shaped cross-section are used in combination, the radially-inclined orientation of liquid crystal domains formed in the liquid crystal layer 30 under voltage application can be further stabilized by thus arranging the first protrusions 16 and the second protrusions 26'.

Figure 56:
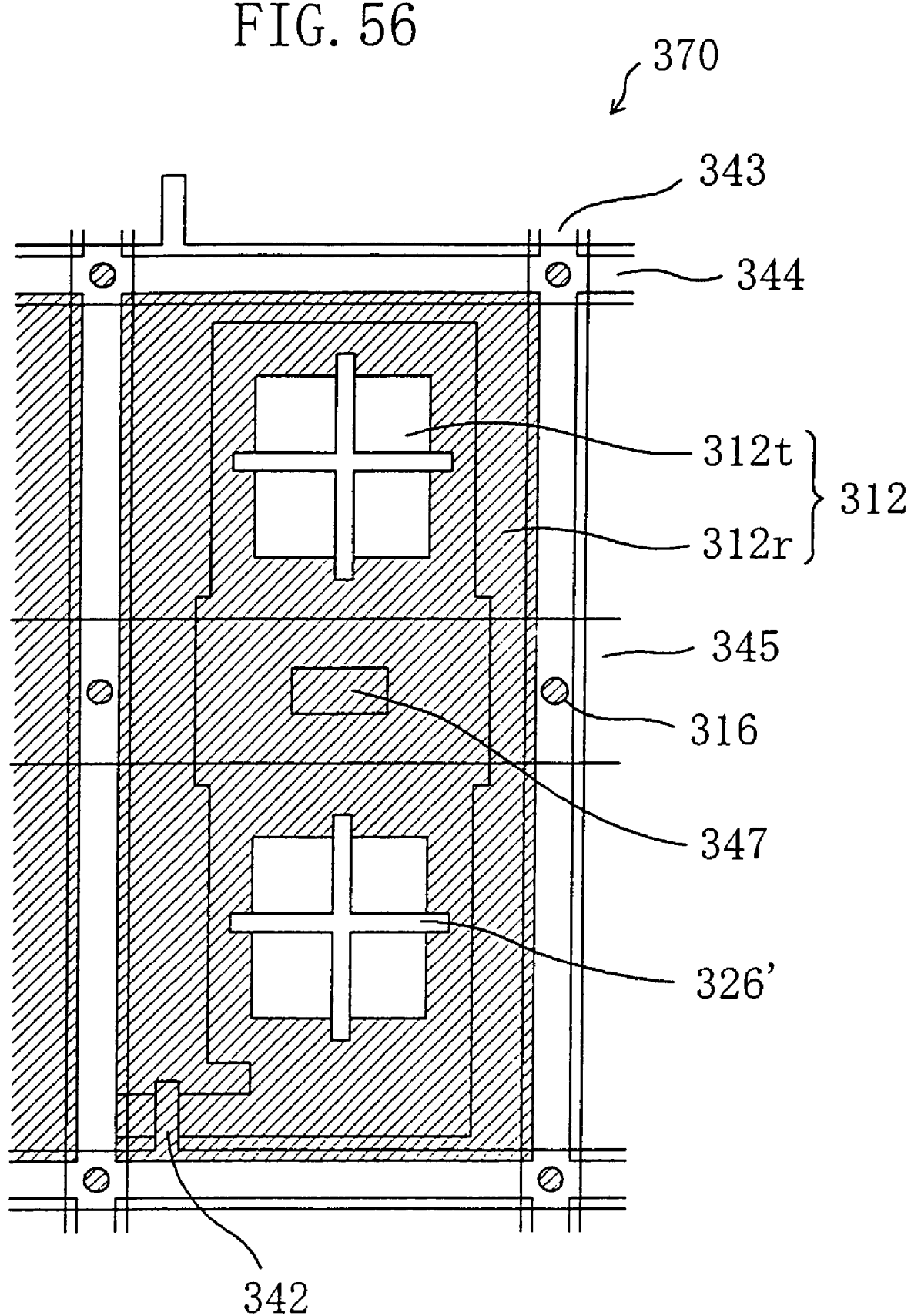
FIG. 56 is a top view for schematically showing the structure of one picture element region of a combination type liquid crystal display device 370 according to still another embodiment of the invention.

A combination type liquid crystal display device 370 including a first protrusion 316 having a substantially circular cross-section and a second protrusion 326' having a substantially cross-shaped cross-section is schematically shown in FIG. 56.

The combination type liquid crystal display device 370 of FIG. 56 has two transmission regions T, and the second protrusion 326' having a substantially cross-shaped cross-section is formed on the counter electrode 322 so as to be positioned at the center of each transmission region T. The first protrusions 316 formed on the TFT substrate are provided out of the picture element region in portions corresponding to the signal line 343 and the scanning line 344. As shown in FIG. 56, the six first protrusions 316 are arranged so as to form two square lattices, and the second protrusions 326' are respectively positioned at the centers of the two square lattices. Thus, the radially-inclined orientation can be further stabilized.

(Arrangement of Polarizing Plate and Phase Plate)

In the so-called vertical alignment type liquid crystal display device including a liquid crystal layer in which liquid crystal molecules having the negative dielectric anisotropy are vertically oriented under application of no voltage, a display can be produced in a variety of display modes. For example, not only a birefringence mode for producing a display by controlling the birefringence of the liquid crystal layer with an electric field but also an optical rotating mode and a combination of the optical rotating mode and the birefringence mode can be employed as the display mode. When a pair of polarizing plates are provided on the outer surfaces (the surfaces not facing the liquid crystal layer 30) of the pair of substrates (for example, the TFT substrate and the counter substrate) in each of the liquid crystal display devices described in Embodiments 1 and 2, a liquid crystal display device of the birefringence mode can be obtained. Also, a phase compensating device (typically, a phase plate) may be provided if necessary. Furthermore, a liquid crystal display device capable of bright display can be obtained by using substantially circularly polarized light.

According to the invention, the stability of the radially-inclined orientation of liquid crystal domains can be improved, so as to further improve the display quality of a conventional liquid crystal display device having a wide viewing angle characteristic. Furthermore, the invention provides a highly reliable liquid crystal display device in which the radially-inclined orientation can be easily restored even when it is destroyed by external force.

While the present invention has been described in preferred embodiments, it will be apparent to those skilled in the art that the disclosed invention may be modified in numerous ways and may assume many embodiments other than those specifically set out and described above. Accordingly, it is intended by the appended claims to cover all modifications of the invention that fall within the true spirit and scope of the invention.

What is claimed is:

1. A liquid crystal display device comprising:
   a first substrate;
   a second substrate;
   a liquid crystal layer disposed between the first substrate and the second substrate; and
   a plurality of picture element regions each defined by a first electrode provided on a surface of the first substrate facing the liquid crystal layer and a second electrode provided on a surface of the second substrate facing the liquid crystal layer,
   wherein the first substrate has, on the surface thereof facing the liquid crystal layer, at least one first protrusion with an inclined side face correspondingly to each of the plurality of picture element regions, and
   a portion of the liquid crystal layer included in each of the plurality of picture element regions is in a substantially vertical orientation state under application of no voltage, and includes at least a part of a first liquid crystal domain placed in a radially-inclined orientation state about the at least one first protrusion under voltage application so that when viewed from above liquid crystal molecules in the first liquid crystal domain extend outwardly in substantially all directions from the periphery of the protrusion, for producing a display by changing an orientation state of the liquid crystal layer in accordance with an applied voltage.

2. The liquid crystal display device of claim 1, wherein the at least one first protrusion is formed within each of the plurality of picture element regions.

3. The liquid crystal display device of claim 2, wherein the at least one first protrusion is plural in number, and the portion of the liquid crystal layer included in each of the plurality of picture element regions includes a plurality of first liquid crystal domains all placed in the radially-inclined orientation state under voltage application.

4. The liquid crystal display device of claim 2, wherein the second substrate has, on the surface thereof facing the liquid crystal layer, at least one second protrusion with an inclined side face correspondingly to each of the plurality of picture element regions,
   the portion of the liquid crystal layer included in each of the plurality of picture element regions includes, under voltage application, at least a part of a second liquid crystal domain placed in a radially-inclined orientation state about the at least one second protrusion, and
   inclination directions of liquid crystal molecules in the first liquid crystal domain are continuous with inclination directions of liquid crystal molecules in the second liquid crystal domain.

5. The liquid crystal display device of claim 4, wherein the at least one second protrusion is plural in number, and
   at least some of the plural second protrusions are formed out of each of the plurality of picture element regions.

6. The liquid crystal display device of claim 4, wherein a cross-section, taken along a surface of the second substrate, of the at least one second protrusion is in a shape having rotational symmetry.

7. The liquid crystal display device of claim 4, wherein the at least one second protrusion is plural in number, and
   at least some of the plural second protrusions are arranged so as to have rotational symmetry.

8. The liquid crystal display device of claim 4, wherein the inclined side face of the at least one second protrusion is inclined at an angle of 5 degrees through 85 degrees against the surface of the second substrate.

9. The liquid crystal display device of claim 2, wherein the second electrode has at least one opening,
   the portion of the liquid crystal layer included in each of the plurality of picture element regions includes, under voltage application, a second liquid crystal domain placed in a radially-inclined orientation state about the at least one opening, and
   inclination directions of liquid crystal molecules in the first liquid crystal domain are continuous with inclination directions of liquid crystal molecules in the second liquid crystal domain.

10. The liquid crystal display device of claim 9, wherein a shape of the at least one opening seen from a normal direction of the second substrate has rotational symmetry.

11. The liquid crystal display device of claim 9, wherein the at least one opening is plural in number, and
    at least some of the plural openings are arranged so as to have rotational symmetry.

12. The liquid crystal display device of claim 1, wherein a cross-section, taken along a surface of the first substrate, of the at least one first protrusion is in a shape having rotational symmetry.

13. The liquid crystal display device of claim 1, wherein the at least one first protrusion is plural in number, and
    at least some of the plural first protrusions are arranged so as to have rotational symmetry.

14. The liquid crystal display device of claim 1, wherein the inclined side face of the at least one first protrusion is inclined at an angle of 5 degrees through 85 degrees against the surface of the first substrate.

15. The liquid crystal display device of claim 1, wherein the first electrode includes a transparent electrode and a reflecting electrode,
   each of the plurality of picture element regions includes a transmission region for producing a display in a transmission mode and a reflection region for producing a display in a reflection mode, and
   the liquid crystal layer has a larger thickness in the transmission region than in the reflection region.

16. The liquid crystal display device of claim 1, wherein the first substrate further includes an active element provided correspondingly to each of the plurality of picture element regions,
   the first electrode corresponds to picture element electrodes respectively provided in the plurality of picture element regions to be switched by the active element, and
   the second electrode corresponds to at least one counter electrode opposing the picture element electrodes.

17. The liquid crystal display device of claim 1, wherein the second substrate further includes an active element provided correspondingly to each of the plurality of picture element regions,
   the second electrode corresponds to picture element electrodes respectively provided in the plurality of picture element regions to be switched by the active element, and
   the first electrode corresponds to at least one counter electrode opposing the picture element electrodes.

18. A liquid crystal display device comprising:
   a first substrate;
   a second substrate;
   a liquid crystal layer disposed between the first substrate and the second substrate; and
   a plurality of picture element regions each defined by a first electrode provided on a surface of the first substrate facing the liquid crystal layer and a second electrode provided on a surface of the second substrate facing the liquid crystal layer,
   wherein the first substrate has, on the surface thereof facing the liquid crystal layer, at least one first protrusion with an inclined side face correspondingly to each of the plurality of picture element regions,
   a portion of the liquid crystal layer included in each of the plurality of picture element regions is in a substantially vertical orientation state under application of no voltage, and includes at least a part of a first liquid crystal domain placed in a radially-inclined orientation state about the at least one first protrusion under voltage application, for producing a display by changing an orientation state of the liquid crystal layer in accordance with an applied voltage;
   wherein a cross-section, taken along a surface of the first substrate, of the at least one first protrusion is in a shape having rotational symmetry; and
   wherein the cross-section, taken along the surface of the first substrate, of the at least one first protrusion is in a substantially circular shape.

* * * * *